US012574542B2

(12) United States Patent
Zhang et al.

(10) Patent No.: US 12,574,542 B2
(45) Date of Patent: Mar. 10, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Kai Zhang, Los Angeles, CA (US); Li Zhang, Los Angeles, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/620,651

(22) Filed: Mar. 28, 2024

(65) Prior Publication Data

US 2024/0259586 A1      Aug. 1, 2024

Related U.S. Application Data

(63) Continuation of application No. PCT/CN2022/122269, filed on Sep. 28, 2022.

(30) Foreign Application Priority Data

Sep. 28, 2021      (WO) ............... PCT/CN2021/121499

(51) Int. Cl.
*H04N 19/52*          (2014.01)
*H04N 19/105*        (2014.01)
(Continued)

(52) U.S. Cl.
CPC ........... *H04N 19/52* (2014.11); *H04N 19/105* (2014.11); *H04N 19/107* (2014.11);
(Continued)

(58) Field of Classification Search
None
See application file for complete search history.

(56) References Cited

U.S. PATENT DOCUMENTS 10,397,603 B1 *    8/2019  Li ......................... H04N 19/105
2013/0016789 A1 *  1/2013  Lou ........................ H04N 19/70
375/240.18

(Continued)

FOREIGN PATENT DOCUMENTS

CN          110891176 A      3/2020

OTHER PUBLICATIONS

International Search Report in PCT/CN2022/122269, mailed on Dec. 21, 2022, 3 pages.
(Continued)

*Primary Examiner* — Lindsay J Uhl
(74) *Attorney, Agent, or Firm* — Astute IP Law Group

(57) ABSTRACT

Embodiments of the present disclosure provide a solution for video processing. A method for video processing is proposed. The method comprises: deriving, during a conversion between a target block of a video and a bitstream of the target block, a motion vector predictor for the target block from a parameter table that stores a set of affine parameters from at least one previously coded block, the target block being a non-affine coded block; and performing the conversion based on the motion vector predictor.

19 Claims, 21 Drawing Sheets

(51) Int. Cl.

| | |
|---|---|
| *H04N 19/107* | (2014.01) |
| *H04N 19/139* | (2014.01) |
| *H04N 19/159* | (2014.01) |
| *H04N 19/176* | (2014.01) |
| *H04N 19/463* | (2014.01) |

(52) U.S. Cl.
CPC ......... *H04N 19/139* (2014.11); *H04N 19/159* (2014.11); *H04N 19/176* (2014.11); *H04N 19/463* (2014.11)

(56) References Cited

U.S. PATENT DOCUMENTS

| | | |
|---|---|---|
| 2018/0270500 A1 | 9/2018 | Li et al. |
| 2019/0082191 A1 | 3/2019 | Chuang et al. |
| 2021/0211679 A1 | 7/2021 | Zhang et al. |
| 2021/0266584 A1 | 8/2021 | Zhang et al. |
| 2021/0400298 A1* | 12/2021 | Zhao .................... H04N 19/513 |

OTHER PUBLICATIONS

Zhao et al., "On Affine Motion Vectors", Joint Video Exploration Team (JVET) of ITU-T SG 16 WP 3 and ISO/IEC JTC 1/SC 29/WG 4th Meeting: Chengdu, CN, Document: JVET-D0151, Oct. 15-21, 2016, 4 pages.

* cited by examiner

Reference Picture               Current Picture

Reference Picture               Current Picture splitting from
top-left corner to
bottom-right corner splitting from
top-right corner to
bottom-left corner $$\frac{4}{8} \times P_1 + \frac{4}{8} \times P_2 \qquad \frac{7}{8} \times P_1 + \frac{1}{8} \times P_2$$

$$\frac{3}{8} \times P_1 + \frac{5}{8} \times P_2$$

Weight map for luma

Weight map for chroma

L0 reference                    L1 reference

The Buffer

Right Boundary

Bottom Boundary

2700

2710

DETERMINE AT LEAST ONE MOTION VECTOR PREDICTOR

2720

INSERT THE MOTION VECTOR INTO A CANDIDATE LIST IN AT LEAST ONE POSITION

2730

PERFORM THE CONVERSION BASED ON THE CANDIDATE LIST

METHOD, APPARATUS, AND MEDIUM FOR VIDEO PROCESSING

CROSS REFERENCE TO RELATED APPLICATIONS

This application is a continuation of International Application No. PCT/CN2022/122269, filed on Sep. 28, 2022, which claims the benefit of International Application No. PCT/CN2021/121499 filed on Sep. 28, 2021. The entire contents of these applications are hereby incorporated by reference in their entireties.

FIELD

Embodiments of the present disclosure relates generally to video coding techniques, and more particularly, to signaling of information related to a combined inter-intra prediction (CIIP) enhancement mode.

BACKGROUND

In nowadays, digital video capabilities are being applied in various aspects of people's lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally low, which is undesirable.

SUMMARY

Embodiments of the present disclosure provide a solution for video processing.

In a first aspect, a method for video processing is proposed. The method comprises: deriving, during a conversion between a target block of a video and a bitstream of the target block, a motion vector predictor for the target block from a parameter table that stores a set of affine parameters from at least one previously coded block, the target block being a non-affine coded block; and performing the conversion based on the motion vector predictor. Compared with the conventional solution, the proposed method can advantageously improve the coding efficiency and performance.

In a second aspect, another method for video processing is proposed. The method comprises: determining, during a conversion between a target block of a video and a bitstream of the target block, at least one motion vector predictor derived with an affine model for the target block; inserting the motion vector predictor into a candidate list in at least one position; and performing the conversion based on the candidate list. Compared with the conventional solution, the proposed method can advantageously improve the coding efficiency and performance.

In a third aspect, an apparatus for processing video data is proposed. The apparatus for processing video data comprises a processor and a non-transitory memory with instructions thereon. The instructions upon execution by the processor, cause the processor to perform a method in accordance with the first aspect.

In a fourth aspect, an apparatus for processing video data is proposed. The non-transitory computer-readable storage medium storing instructions that cause a processor to perform a method in accordance with the second aspect.

In a fifth aspect, a non-transitory computer-readable recording medium is proposed. The non-transitory computer-readable recording medium stores a bitstream of a video which is generated by a method performed by a video processing apparatus. The method comprises: deriving a motion vector predictor for a target block of the video from a parameter table that stores a set of affine parameters from at least one previously coded block, the target block being a non-affine coded block; and generating a bitstream of the target block based on the motion vector predictor.

In a sixth aspect, another method for video processing is proposed. The method comprises deriving a motion vector predictor for a target block of the video from a parameter table that stores a set of affine parameters from at least one previously coded block, the target block being a non-affine coded block; generating a bitstream of the target block based on the motion vector predictor; and storing the bitstream in a non-transitory computer-readable recording medium.

In a seventh aspect, another non-transitory computer-readable recording medium is proposed. The non-transitory computer-readable recording medium stores a bitstream of a video which is generated by a method performed by a video processing apparatus. The method comprises: determining at least one motion vector predictor derived with an affine model for a target block of the video; inserting the motion vector predictor into a candidate list in at least one position; and generating a bitstream of the target block based on the candidate list.

In an eighth aspect, another method for video processing is proposed. The method comprises determining at least one motion vector predictor derived with an affine model for a target block of the video; inserting the motion vector predictor into a candidate list in at least one position; generating a bitstream of the target block based on the candidate list; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIGS. 5a-5b illustrate simplified affine motion model, wherein FIG. 5a illustrates 4-parameter affine model and FIG. 5b illustrates 6-parameter affine model;

FIGS. 10*a*-10*b* illustrate an illustration of splitting a CU into two triangular prediction units (two splitting patterns), wherein FIG. 10*a* illustrates 135 degree partition type and FIG. 10*b* illustrates 45 degree splitting patterns;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
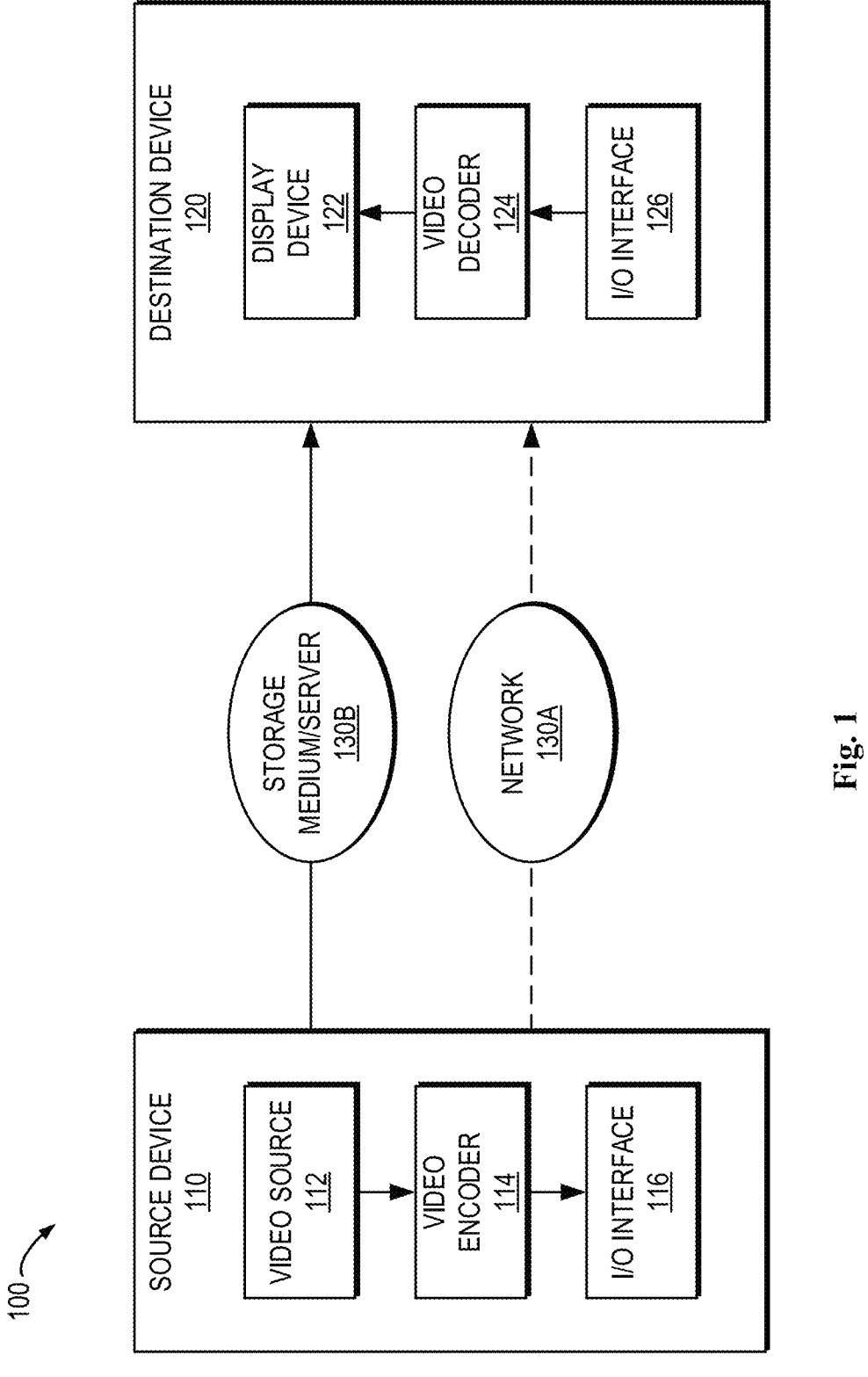
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
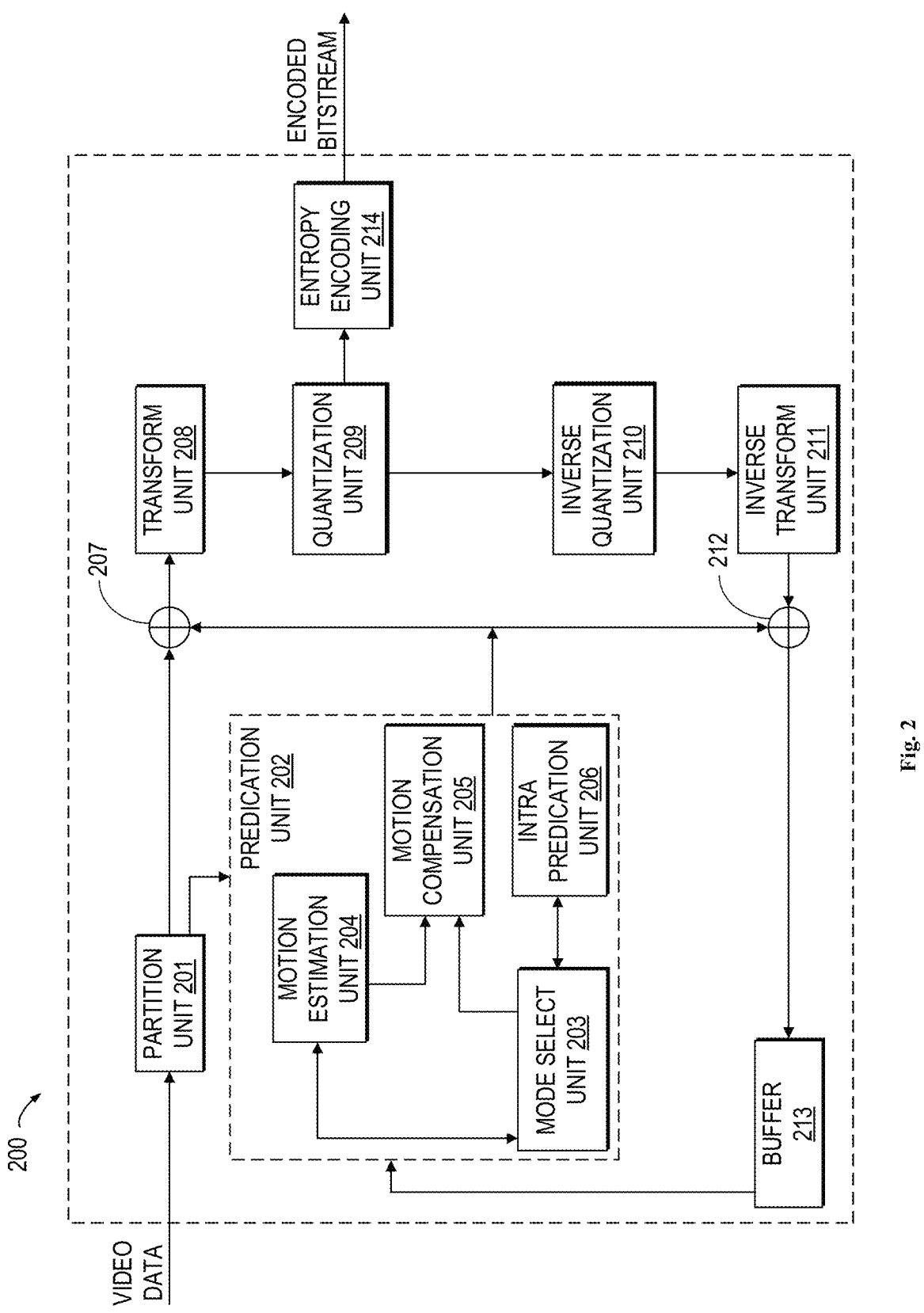
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
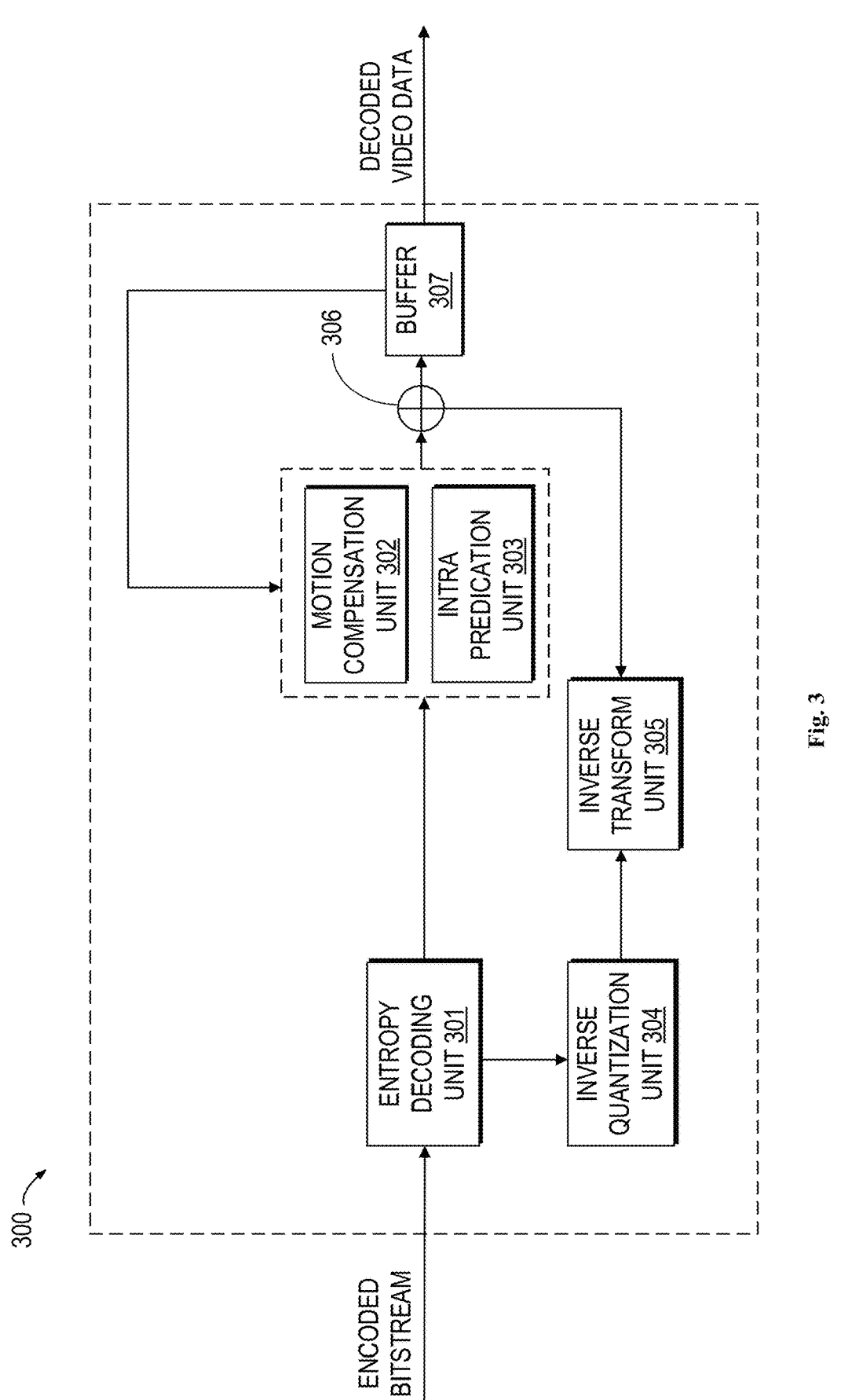
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

The present disclosure is related to video/image coding technologies. Specifically, it is related to affine prediction in video/image coding. It may be applied to the existing video coding standards like HEVC, and VVC. It may be also applicable to future video/image coding standards or video/image codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC (H.265/HEVC, https://www.itu.int/rec/T-REC-H.265) standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) (JEM-7.0: https://jvet.hhi.fraunhofer.de/svn/svn_HMJEMSoftware/tags/HM-16.6-JEM-7.0)(VTM-2.0.1: https://vcgit.hhi.fraunhofer.de/jvet/VVCSoftware_VTM/tags/VTM-2.0.1). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at: http://phenix.it-sudparis.eu/jvet/doc_end_user/documents/I1_Ljubljana/wg11/JVET-K1001-v7.zip The latest reference software of VVC, named VTM, could be found at: https://vcgit.hhi.fraunhofer.de/jvet/VVCSoftware_VTM/tags/VTM-2.1

Figure 4:
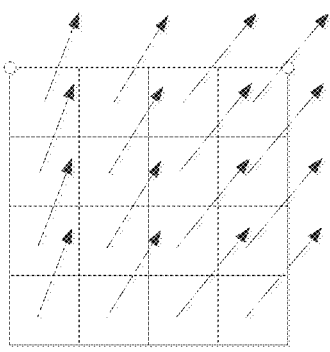
FIG. 4 illustrates sub-block based prediction.

Sub-block based prediction is first introduced into the video coding standard by HEVC Annex I (3D-HEVC) (H.265/HEVC, https://www.itu.int/rec/T-REC-H.265). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 4 demonstrates the concept of sub-block based prediction.

To explore the future video coding technologies beyond HEVC, Joint Video Exploration Team (JVET) was founded by VCEG and MPEG jointly in 2015. Since then, many new methods (J. Chen, E. Alshina, G. J. Sullivan, J.-R. Ohm, J. Boyce, "Algorithm description of Joint Exploration Test Model 7 (JEM7)," JVET-G1001, August 2017) have been adopted by JVET and put into the reference software named Joint Exploration Model (JEM) (JEM-7.0: https://jvet.hhi-.fraunhofer.de/svn/svn_HMJEMSoftware/tags/HM-16.6-JEM-7.0).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

2.1 Affine Prediction

Figure 5A:
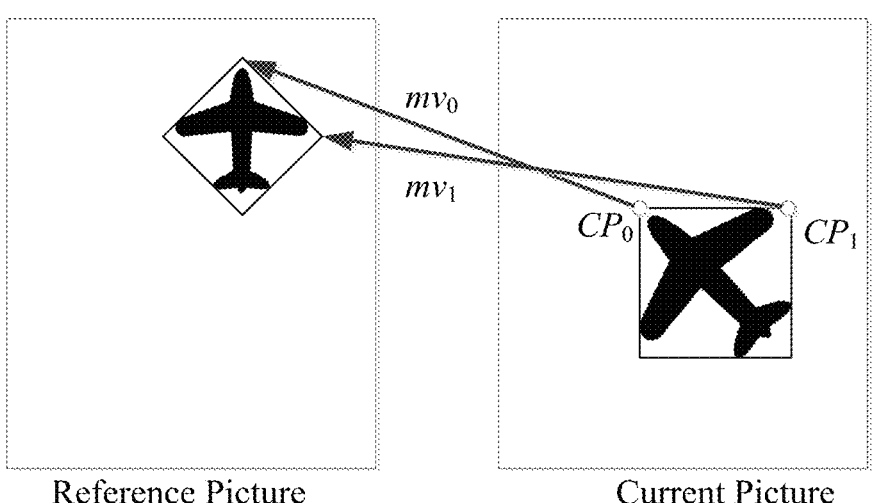
Figure 5B:
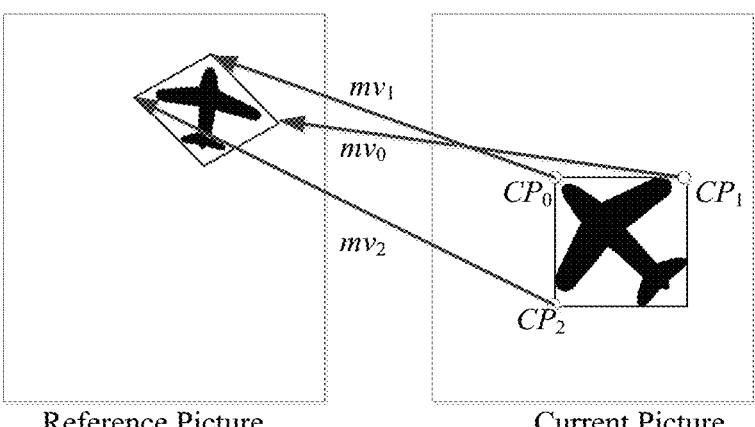

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown FIGS. 5a-5b, the affine motion field of the block is described by two (in the 4-parameter affine model) or three (in the 6-parameter affine model) control point motion vectors.

The motion vector field (MVF) of a block is described by the following equations with the 4-parameter affine model (wherein the 4-parameter are defined as the variables a, b, e and J) in equation (1) and 6-parameter affine model (wherein the 4-parameter are defined as the variables a, b, c, d, e and f) in equation (2) respectively:

$$\begin{cases} mv^h(x, y) = ax - by + e = \dfrac{\left(mv_1^h - mv_0^h\right)}{w}x - \dfrac{\left(mv_1^v - mv_0^v\right)}{w}y + mv_0^h \\ mv^v(x, y) = bx + ay + f = \dfrac{\left(mv_1^v - mv_0^v\right)}{w}x + \dfrac{\left(mv_1^h - mv_0^h\right)}{w}y + mv_0^v \end{cases} \quad (1)$$

$$\begin{cases} mv^h(x, y) = ax + cy + e = \dfrac{\left(mv_1^h - mv_0^h\right)}{w}x + \dfrac{\left(mv_2^h - mv_0^h\right)}{w}y + mv_0^h \\ mv^v(x, y) = bx + dy + f = \dfrac{\left(mv_1^v - mv_0^v\right)}{w}x + \dfrac{\left(mv_2^v - mv_0^v\right)}{h}y + mv_0^v \end{cases} \quad (2)$$

where $(mv_0^h, mv_0^h)$ is motion vector of the top-left corner control point, and $(mv_1^h, mv_1^h)$ is motion vector of the top-right corner control point and $(mv_2^h, mv_2^h)$ is motion vector of the bottom-left corner control point, all of the three motion vectors are called control point motion vectors (CPMV), (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, (1) and (2) are implemented as $$\begin{cases} iDMvHorX = \left(mv_1^h - mv_0^h\right) << (S - \log2(w)) \\ iDMvHorY = (mv_1^v - mv_0^v) << (S - \log2(w)) \end{cases} \quad (3)$$

For the 4-parameter affine model shown in (1):

$$\begin{cases} iDMvVerX = -iDMvHorY \\ iDMvVerY = iDMvHorX \end{cases} \quad (4)$$

For the 6-parameter affine model shown in (2):

$$\begin{cases} iDMvVerX = \left(mv_2^h - mv_0^h\right) << (S - \log2(h)) \\ iDMvVerY = (mv_2^v - mv_0^v) << (S - \log2(h)) \end{cases} \quad (5)$$

Finally, $$\begin{cases} mv^h(x, y) = \text{Normalize}(iDMvHorX \Box x + iDMvVerX \Box y + \left(mv_0^h << S\right), S) \quad (6) \\ mv^v(x, y) = \text{Normalize}(iDMvHorY \Box x + iDMvVerY \Box y + (mv_0^v << S), S) \end{cases}$$

$$\text{Normalize}(Z, S) = \begin{cases} (Z + \text{Off}) >> S & \text{if } Z \geq 0 \\ -((-Z + \text{Off}) >> S & \text{Otherwise} \end{cases} \quad (7)$$

$$\text{Off} = 1 << (S-1)$$

where S represents the calculation precision. e.g. in VVC, S=7. In VVC, the MV used in MC for a sub-block with the top-left sample at (xs, ys) is calculated by (6) with x=xs+2 and y=ys+2.

Figure 6:
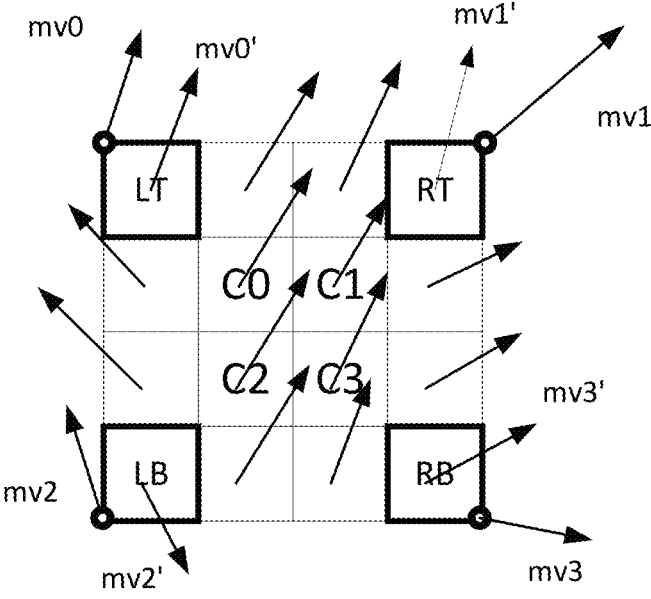
FIG. 6 illustrates affine MVF per sub-block.

To derive motion vector of each 4×4 sub-block, the motion vector of the center sample of each sub-block, as shown in FIG. 6, is calculated according to Eq. (1) or (2), and rounded to 1/16 fraction accuracy. Then the motion compensation interpolation filters are applied to generate the prediction of each sub-block with derived motion vector.

Figure 7A:
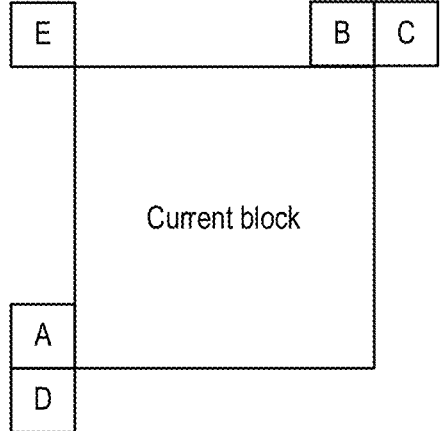
FIGS. 7a-7b illustrate candidates for AF_MERGE.
Figure 7B:
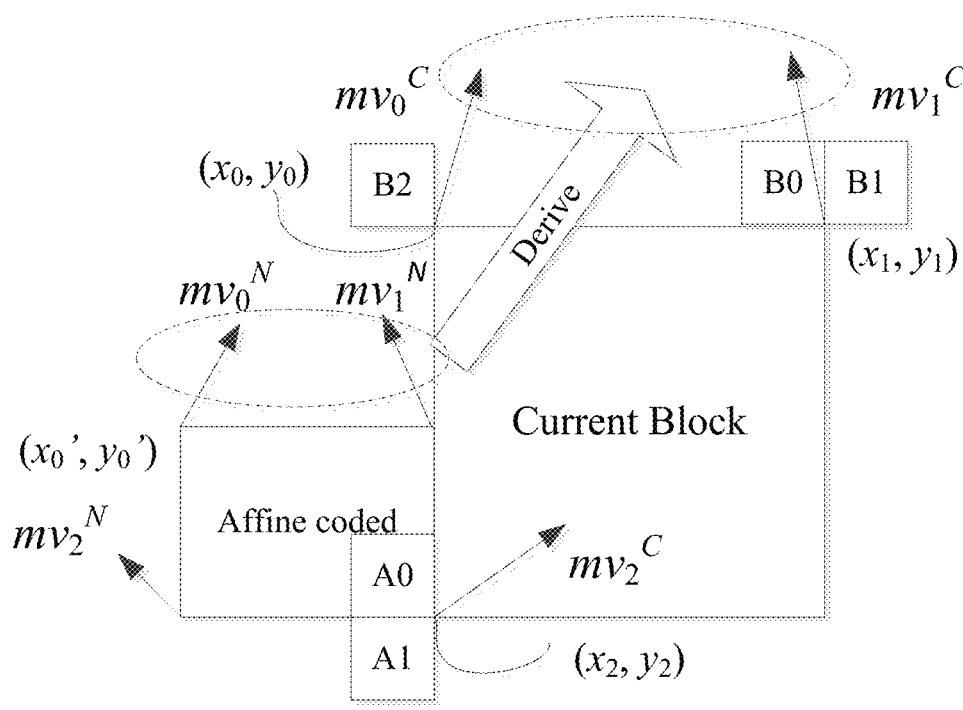

Affine model can be inherited from spatial neighbouring affine-coded block such as left, above, above right, left bottom and above left neighbouring block as shown in FIG. 7(a). For example, if the neighbour left bottom block A in FIG. 7(a) is coded in affine mode as denoted by A0 in FIG. 7(b), the Control Point (CP) motion vectors mv0N, mv1N and mv2N of the top left corner, above right corner and left bottom corner of the neighbouring CU/PU which contains the block A are fetched. And the motion vector mv0C, mv1C and mv2C (which is only used for the 6-parameter affine model) of the top left corner/top right/bottom left on the current CU/PU is calculated based on mv0N, mv1N and mv2N. It should be noted that in VTM-2.0, sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

It should be noted that when a CU is coded with affine merge mode, i.e., in AF_MERGE mode, it gets the first block coded with affine mode from the valid neighbour reconstructed blocks. And the selection order for the candidate block is from left, above, above right, left bottom to above left as shown FIG. 7(a).

The derived CP MVs mv0C, mv1C and mv2C of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2.2 Separate List of Affine Candidates for the AF_MERGE Mode.

Different from VTM wherein only one affine spatial neighboring block may be used to derive affine motion for a block, in JVET-K0186, it proposes to construct a separate list of affine candidates for the AF_MERGE mode.

1) Insert Inherited Affine Candidates into Candidate List

Inherited affine candidate means that the candidate is derived from the valid neighbor reconstructed block coded with affine mode.

Figure 8:
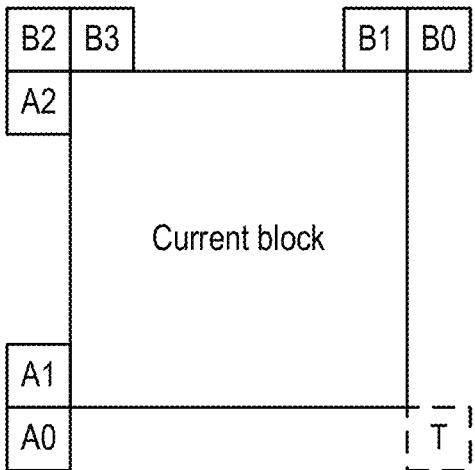
FIG. 8 illustrates candidates position for affine merge mode.

As shown in FIG. 8, the scan order for the candidate block is $A_1$, $B_1$, $B_0$, $A_0$ and $B_2$. When a block is selected (e.g., $A_1$), the two-step procedure is applied:

a) Firstly, use the three corner motion vectors of the CU covering the block to derive two/three control points of current block;

b) Based on the control points of current block to derive sub-block motion for each sub-block within current block.

2) Insert Constructed Affine Candidates

If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 8. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is available, $B_3$ is used. If both $B_2$ and $B_3$ are unavailable, $A_2$ is used. If all the three candidates are unavailable, the motion information of CP1 cannot be obtained.

For CP2, the checking priority is B1→B0;

For CP3, the checking priority is A1→A0;

For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}.

3) Insert Zero Motion Vectors

If the number of candidates in affine merge candidate list is less than MaxNumAffineCand, zero motion vectors are insert into the candidate list, until the list is full.

2.3 Affine Merge Candidate List 2.3.1 Affine Merge Mode

In the affine merge mode of VTM-2.0.1, only the first available affine neighbour can be used to derive motion information of affine merge mode. In JVET-L0366, a candidate list for affine merge mode is constructed by searching valid affine neighbours and combining the neighbor motion information of each control point.

The affine merge candidate list is constructed as following steps:

1) Insert Inherited Affine Candidates

Inherited affine candidate means that the candidate is derived from the affine motion model of its valid neighbor affine coded block. In the common base, as shown FIG. 9, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

Figure 9:
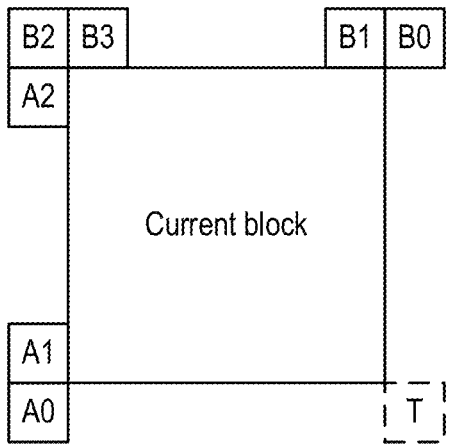
FIG. 9 illustrates candidates position for affine merge mode.

The motion information for the control points is derived firstly from the specified spatial neighbors and temporal neighbor shown in FIG. 9. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}.

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

2.3.2 Affine Merge Mode

It proposes the following simplifications for the affine merge mode in JVET-L0366:

1) The pruning process for inherited affine candidates is simplified by comparing the coding units covering the neighboring positions, instead of comparing the derived affine candidates in VTM-2.0.1. Up to 2 inherited affine candidates are inserted into affine merge list. The pruning process for constructed affine candidates is totally removed.

2) The MV scaling operation in constructed affine candidate is removed. If the reference indices of control points are different, the constructed motion model is discarded.

3) The number of constructed affine candidates is reduced from 10 to 6.

4) It is also proposed that other merge candidates with sub-block prediction such as ATMVP is also put into the affine merge candidate list. In that case, the affine merge candidate list may be renamed with some other names such as sub-block merge candidate list.

2.4 Control Point MV Offset for Affine Merge Mode

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

$$MV_{new(L0),i}=MV_{old(L0)}+MV_{offset(i)}$$

$$MV_{new(L1),i}=MV_{old(L1)}+MV_{offset(i)}.$$

In Bi-prediction with List 0 and List 1 on the opposite direction, the CPMV offsets are applied to the first candidate as follows:

$$MV_{new(L0),i} = MV_{old(L0)} + MV_{offset(i)}$$

$$MV_{new(L1),i} = MV_{old(L1)} - MV_{offset(i)}.$$

In this contribution, various offset directions with various offset magnitudes are used to generate new Affine merge candidates. Two implementations were tested:

(1) 16 new Affine merge candidates with 8 different offset directions with 2 different offset magnitudes are generated as shown in the following offsets set:

Offset set={(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}.

The Affine merge list is increased to 20 for this design. The number of potential Affine merge candidates is 31 in total.

(2) 4 new Affine merge candidates with 4 different offset directions with 1 offset magnitude are generated as shown in the following offsets set:

Offset set={(4, 0), (0, 4), (−4, 0), (0, −4)}.

The Affine merge list is kept to 5 as VTM2.0.1 does. Four temporal constructed Affine merge candidates are removed to keep the number of potential Affine merge candidates unchanged, i.e., 15 in total. Suppose the coordinates of CPMV1, CPMV2, CPMV3 and CPMV4 are (0, 0), (W, 0), (H, 0) and (W, H). Note that CPMV4 is derived from the temporal MV as shown in FIG. 9. The removed candidates are the following four temporal-related constructed Affine merge candidates: {CP2, CP3, CP4}, {CP1, CP4}, {CP2, CP4}, {CP3, CP4}.

2.5 Generalized Bi-Prediction Improvement

Generalized Bi-prediction improvement (GBi) proposed in JVET-L0646 is adopted into VTM-3.0.

GBi was proposed in JVET-C0047. JVET-K0248 (J. Chen, E. Alshina, G. J. Sullivan, J.-R. Ohm, J. Boyce, "Algorithm description of Joint Exploration Test Model 7 (JEM7)," JVET-G1001, August 2017) improved the gain-complexity trade-off for GBi and was adopted into BMS2.1. The BMS2.1 GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In BMS2.1 GBi, the predictor generation in bi-prediction mode is shown in Equation (1).

$$P_{GBi} = (w_0 * P_{L0} + w_1 * P_{L1} + RoundingOffset_{GBi}) >> shiftNum_{GBi},$$

where $P_{GBi}$ is the final predictor of GBi. $w_0$ and $w_1$ are the selected GBi weight pair and applied to the predictors of list 0 (L0) and list 1 (L1), respectively. RoundingOffset$_{GBi}$ and shiftNum$_{GBi}$ are used to normalize the final predictor in GBi. The supported $w_1$ weight set is {−¼, ⅜, ½, ⅝, 5/4}, in which the five weights correspond to one equal weight pair and four unequal weight pairs. The blending gain, i.e., sum of $w_1$ and $w_0$, is fixed to 1.0. Therefore, the corresponding $w_0$ weight set is {5/4, ⅝, ½, ⅜, −¼}. The weight pair selection is at CU-level. For non-low delay pictures, the weight set size is reduced from five to three, where the $w_1$ weight set is {⅜, ½, 5/8} and the $w_0$ weight set is {5/8, ½, ⅜}. The weight set size reduction for non-low delay pictures is applied to the BMS2.1 GBi and all the GBi tests in this contribution.

In this JVET-L0646, one combined solution based on JVET-L0197. and JVET-L0296. is proposed to further improve the GBi performance. Specifically, the following modifications are applied on top of the existing GBi design in the BMS2.1.

2.5.1 GBi Encoder Bug Fix

To reduce the GBi encoding time, in current encoder design, the encoder will store uni-prediction motion vectors estimated from GBi weight equal to ⅛, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to ⅛. Consequently, 4-parameter affine MVs may be overwritten by 6-parameter affine MVs after the encoding with GBi weight ⅛. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to ⅛, and reuse the corresponding affine MVs based on the affine model type for other GBi weights.

2.5.2 CU Size Constraint for GBi

In this method, GBi is disabled for small CUs. In inter prediction mode, if bi-prediction is used and the CU area is smaller than 128 luma samples, GBi is disabled without any signaling.

2.5.3 Merge Mode with GBi

With Merge mode, GBi index is not signaled. Instead it is inherited from the neighbouring block it is merged to. When TMVP candidate is selected, GBi is turned off in this block.

2.5.4 Affine Prediction with GBi

When the current block is coded with affine prediction, GBi can be used. For affine inter mode, GBi index is signaled. For Affine merge mode, GBi index is inherited from the neighbouring block it is merged to. If a constructed affine model is selected, GBi is turned off in this block.

2.6 Triangular Prediction Mode

Figure 10A:
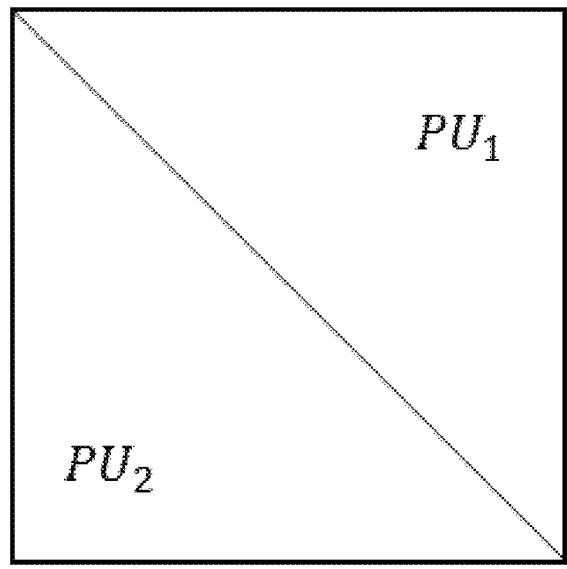
Figure 10B:
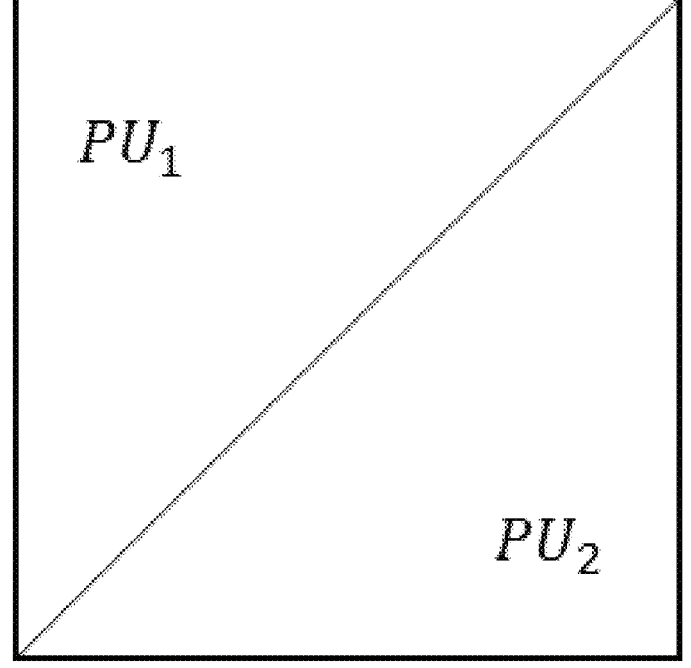

The concept of the triangular prediction mode (TPM) is to introduce a new triangular partition for motion compensated prediction. As shown in FIGS. 10a-10b, it splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.6.1 Uni-Prediction Candidate List for TPM

Figure 11:
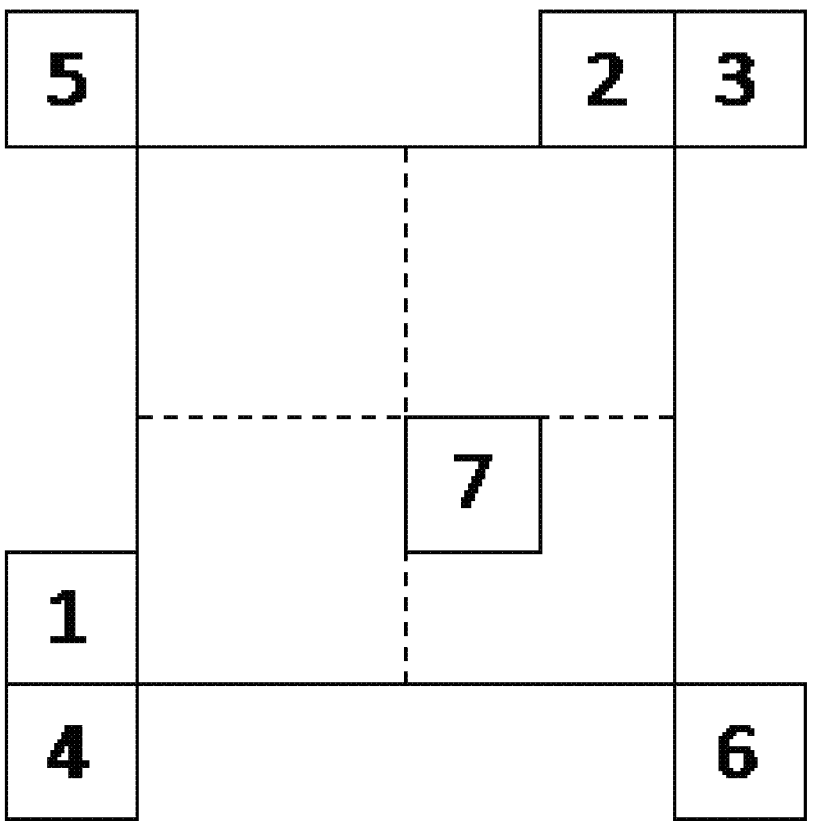
FIG. 11 illustrates position of the neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 11. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list are called TPM motion candidates.

More specifically, the following steps are involved:
1) Obtain motion candidates from $A_1$, $B_1$, $B_0$, $A_0$, $B_2$, Col and Col2 (corresponding to block 1-7 in FIG. 11) without any pruning operations.
2) Set variable numCurrMergeCand=0.
3) For each motion candidates derived from $A_1$, $B_1$, $B_0$, $A_0$, $B_2$, Col and Col2 and numCurrMergeCand is less than 5, if the motion candidate is uni-prediction (either from List 0 or List 1), it is added to the merge list with numCurrMergeCand increased by 1. Such added motion candidates is named 'originally uni-predicted candidate'.

Full Pruning is Applied.
4) For each motion candidates derived from $A_1$, $B_1$, $B_0$, $A_0$, $B_2$, Col and Col2 and numCurrMergeCand is less than 5, if the motion candidate is bi-prediction, the motion information from List 0 is added to the merge list (that is, modified to be uni-prediction from List 0) and numCurrMergeCand increased by 1. Such added motion candidates are named 'Truncated List0-predicted candidate'.

Full pruning is applied.
5) For each motion candidates derived from $A_1$, $B_1$, $B_0$, $A_0$, $B_2$, Col and Col2 and numCurrMergeCand is less than 5, if the motion candidate is bi-prediction, the motion information from List 1 is added to the merge list (that is, modified to be uni-prediction from List 1) and numCurrMergeCand increased by 1. Such added motion candidates are named 'Truncated List1-predicted candidate'.

Full pruning is applied.
6) For each motion candidates derived from $A_1$, $B_1$, $B_0$, $A_0$, $B_2$, Col and Col2 and numCurrMergeCand is less than 5, if the motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the merge list, that is averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the merge list, that is averaged uni-prediction from List 1 motion candidate and numCurrMergeCand increased by 1.

Full pruning is applied.
7) If numCurrMergeCand is less than 5, zero motion vector candidates are added.

2.6.1.1 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 12:
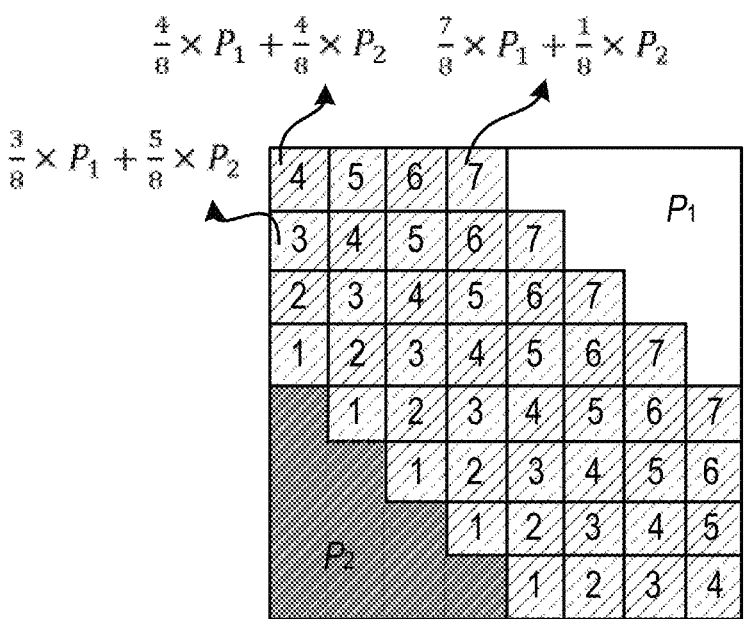
FIG. 12 illustrates an example of a CU applying the 1st weighting factor group.

Weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. FIG. 12 shows an example of a CU applying the $1^{st}$ weighting factor group.

2.6.1.2 Motion Vector Storage

Figure 13:
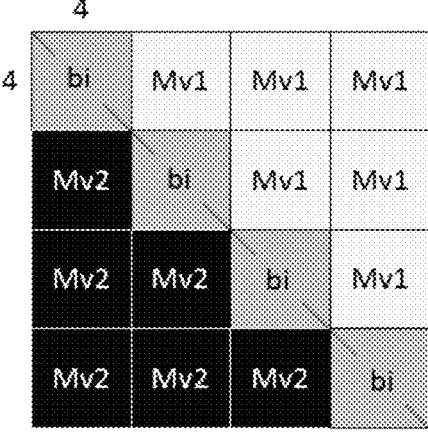
FIG. 13 illustrates an example of motion vector storage.
Figure 13:
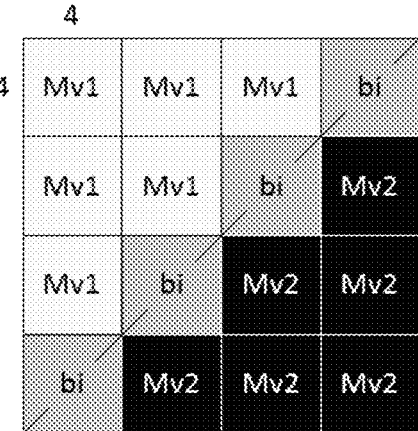

The motion vectors (Mv1 and Mv2 in FIG. 13) of the triangular prediction units are stored in 4×4 grids. For each 4×4 grid, either uni-prediction or bi-prediction motion vector is stored depending on the position of the 4×4 grid in the CU. As shown in FIG. 13, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction, If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.7 History-Based Motion Vector Prediction

Figure 14:
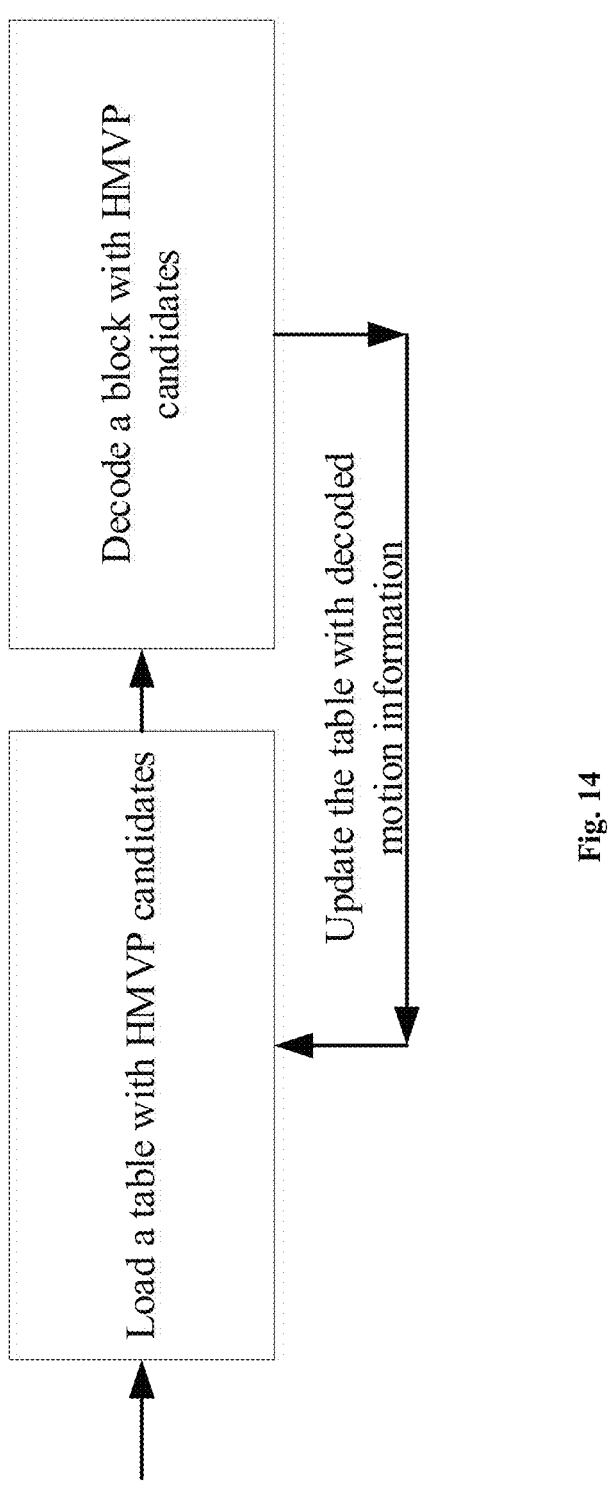
FIG. 14 illustrates decoding flow chart with the proposed HMVP method.
Figure 15:
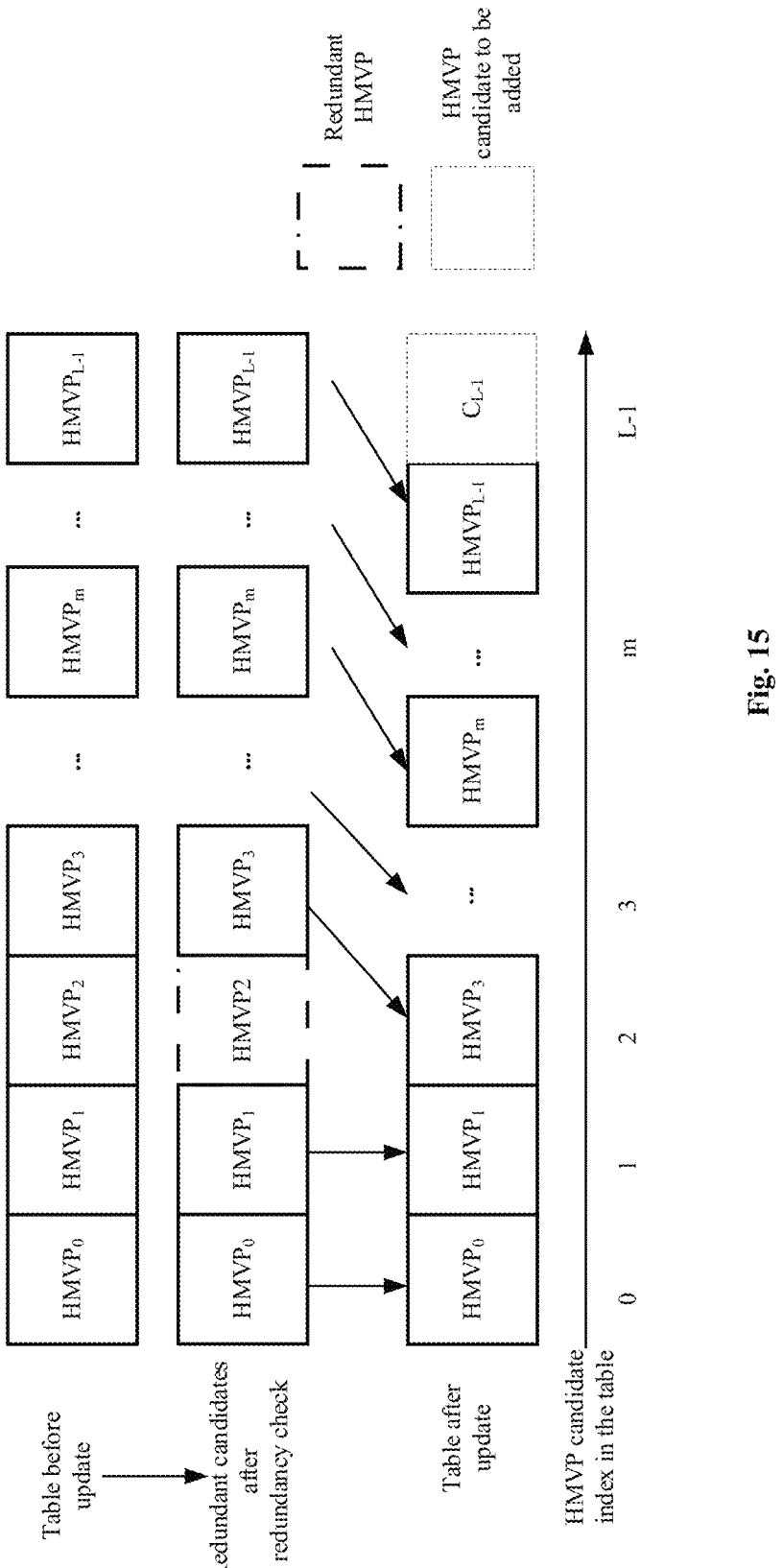
FIG. 15 illustrates example of updating the table in the proposed HMVP method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 14. FIG. 15 illustrates an example of updating the table in the proposed HMVP method.

In this contribution, the table size S is set to be 6, which indicates up to 6 HMVP candidates may be added to the table. When inserting a new motion candidate to the table, a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1. HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP). To reduce the number of pruning operations, three simplifications are introduced:

1) Number of HMPV candidates to be check denoted by L is set as follows:

$$L = (N <= 4)?M: (8 - N) \qquad (1)$$

wherein N indicates number of available non-sub block merge candidate and M indicates number of available HMVP candidates in the table.

2) In addition, once the total number of available merge candidates reaches the signaled maximally allowed merge candidates minus 1, the merge candidate list construction process from HMVP list is terminated.

3) Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In this contribution, K is set to 4 while the AMVP list size is kept unchanged, i.e., equal to 2.

2.8 Ultimate Motion Vector Expression (UMVE)

In this contribution, ultimate motion vector expression (UMVE) is presented. UMVE is also known as Merge with MVD (MMVD) in VVC. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

Figure 16:
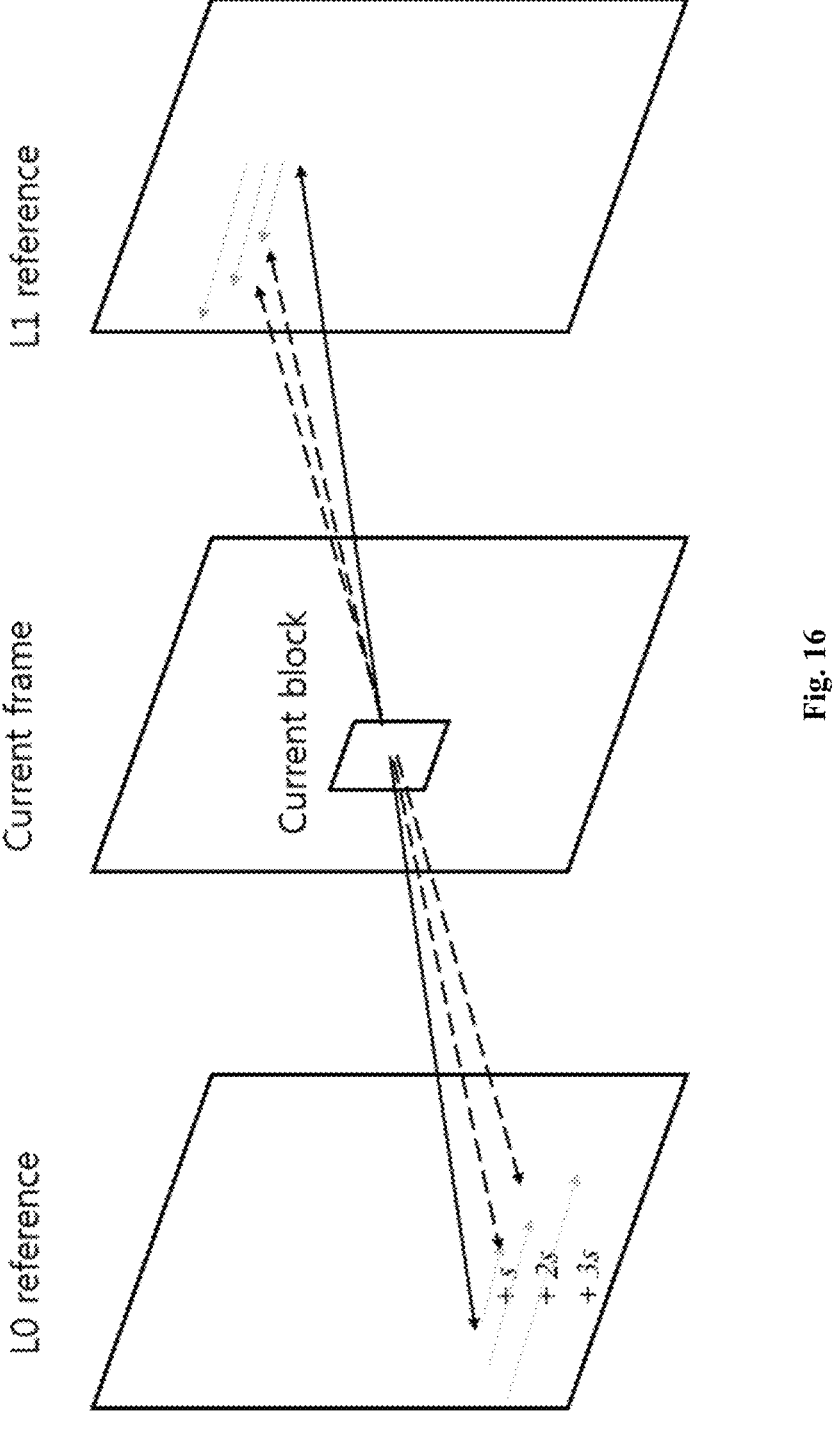
FIG. 16 illustrates UMVE Search Process.
Figure 17:
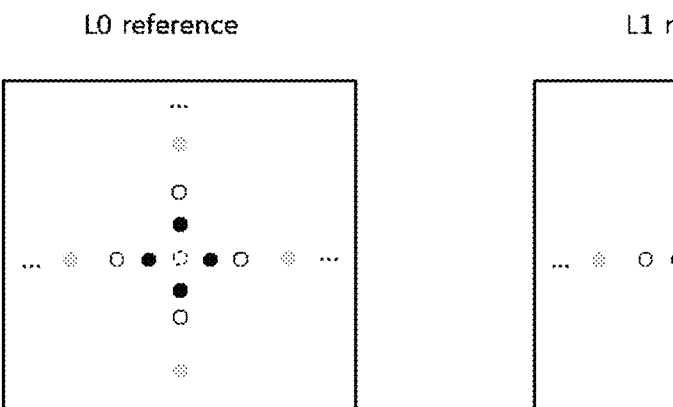
FIG. 17 illustrates UMVE Search Point.

UMVE provides a new motion vector expression with simplified signaling. The expression method includes starting point, motion magnitude, and motion direction. FIG. 16 shows an example of UMVE search process. FIG. 17 shows an example of UMVE search point.

This proposed technique uses a merge candidate list as it is. But only candidates which are default merge type (MRG_TYPE_DEFAULT_N) are considered for UMVE's expansion. Base candidate index defines the starting point. Base candidate index indicates the best candidate among candidates in the list as follows.

TABLE 1

| Base candidate IDX | | | | |
| --- | --- | --- | --- | --- |
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled. Distance index is motion magnitude information. Distance index indicates the pre-defined distance from the starting point information. Pre-defined distance is as follows.

TABLE 2

| Distance IDX | | | | | | | |
| --- | --- | --- | --- | --- | --- | --- | --- |
| Distance IDX | | | | | | | |
| 0 | 1 | 2 | 3 | 4 | 5 | 6 | 7 |
| Pixel distance ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
| --- | --- | --- | --- | --- |
| Direction IDX | 00 | 01 | 10 | 11 |
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.9 Inter-Intra Mode

With inter-intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$) (3, 5), and (w_intra$_4$, w_inter$_4$) (2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.10 Affine Merge Mode with Prediction Offsets

The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

Figure 18:
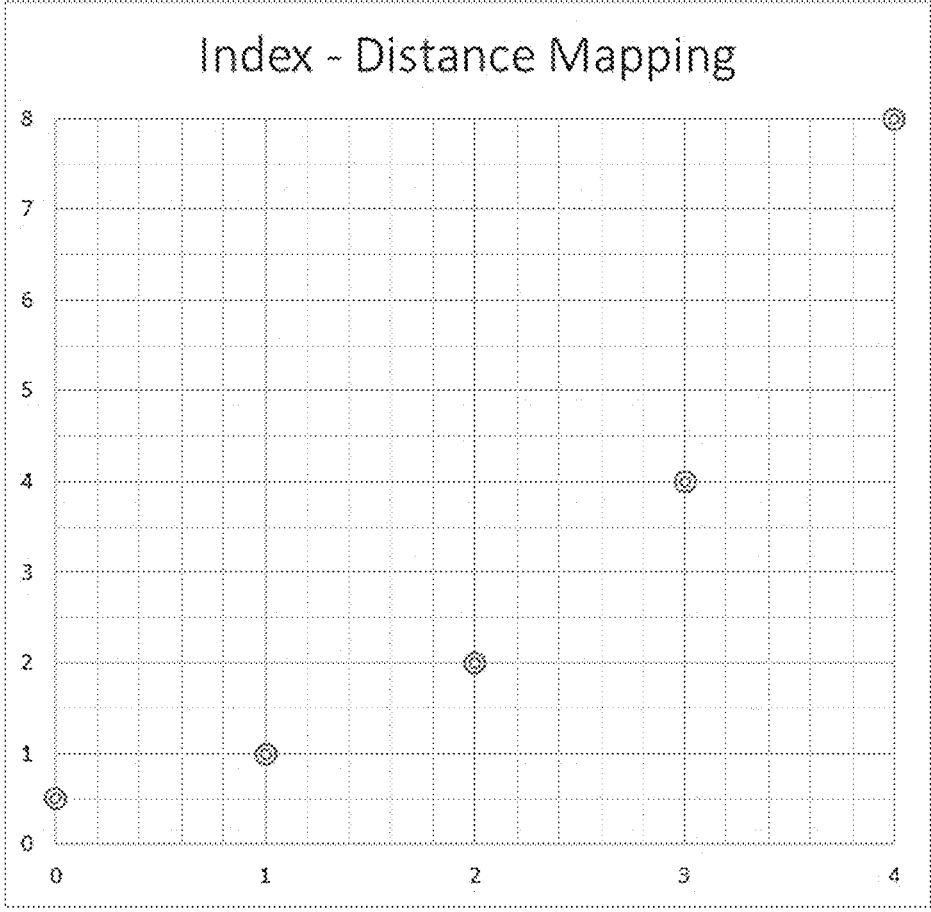
FIG. 18 illustrates distance index and distance offset mapping.

A distance offset table with size of 5 is used as shown in the table below. Distance index is signaled to indicate which distance offset to use. The mapping of distance index and distance offset values is shown in FIG. 18.

TABLE 4

| Distance offset table | | | | | |
|---|---|---|---|---|---|
| Distance IDX | 0 | 1 | 2 | 3 | 4 |
| Distance-offset | ½-pel | 1-pel | 2-pel | 4-pel | 8-pel |

The direction index can represent four directions as shown below, where only x or y direction may have an MV difference, but not in both directions.

TABLE 5

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

If the inter prediction is uni-prediction, the signaled distance offset is applied on the offset direction for each control point predictor. Results will be the MV value of each control point. For example, when base predictor is uni-prediction, and the motion vector values of a control point is MVP ($v_{px}$, $v_{py}$). When distance offset and direction index are signaled, the motion vectors of current block's corresponding control points will be calculated as below. $MV(v_x, v_y)$=MVP ($v_{px}$, $v_{py}$)+MV(x-dir-factor*distance-offset, y-dir-factor*distance-offset); If the inter prediction is bi-prediction, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is bi-prediction, and the motion vector values of a control point on L0 is $MVP_{L0}$ ($v_{0px}$, $v_{0py}$), and the motion vector of that control point on L1 is $MVP_{L1}$ ($v_{1px}$, $v_{1py}$). When distance offset and direction index are signaled, the motion vectors of current block's corresponding control points will be calculated as below.

$$MV_{L0}(v_{0x}, v_{0y}) = MVP_{L0}(v_{0px}, v_{0py}) +$$
$$MV(x\text{-}dir\text{-factor} * \text{distance-offset}, y\text{-}dir\text{-factor} * \text{distance-offset});$$

$$MV_{L1}(v_{0x}, v_{0y}) = MVP_{L1}(v_{0px}, v_{0py}) +$$
$$MV(-x\text{-}dir\text{-factor} * \text{distance-offset}, -y\text{-}dir\text{-factor} * \text{distance-offset});$$

A simplified method is proposed to reduce the signaling overhead by signaling the distance offset index and the offset direction index per block. The same offset will be applied to all available control points in the same way. In this method, the number of control points is determined by the base predictor's affine type, 3 control points for 6-parameter type, and 2 control points for 4-parameter type. The distance offset table and the offset direction tables are the same as in 2.1.

Since the signaling is done for all the control points of the block at once, the zero_MVD flag is not used in this method.

2.11 Representation of Affine Motion Data

It is proposed that the affine parameters instead of CPMVs are stored to predict the affine model of following coded blocks.

2.12 Merge List Design

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks.

Uni-Prediction TPM merge list size is fixed to be 5.

3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.12.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.12.2 Affine Merge Candidate List

In this contribution, the ATMVP merge candidate in the normal merge list is moved to the first position of the affine merge list. Such that all the merge candidates in the new list (i.e., sub-block based merge candidate list) are based on sub-block coding tools.

An affine merge candidate list is constructed with following steps:

Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

Insert Constructed Affine Candidates

If the number of candidates in affine merge candidate list is less than MaxNumAffineCand (set to 5), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 9. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}.

The available combination of motion information of CPs is only added to the affine merge list when the CPs have the same reference index.

4) Padding with Zero Motion Vectors

If the number of candidates in affine merge candidate list is less than 5, zero motion vectors with zero reference indices are insert into the candidate list, until the list is full.

2.12.3 Shared Merge List

It is proposed that it is proposed to share the same merging candidate list for all leaf CUs of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

2.13 History Affine Prediction

History-Based Affine Parameters Inheritance

1. The parameters a, b, c, d, e and f defined in Eq (2) for an affine-coded block may be stored in a buffer (the buffer may be a table, or lookup table, or a First-In-First-Out (FIFO) table, or a stack, or a queue, or a list, or a link, or an array, or any other storage with any data structure) or constrained FIFO table wherein each affine model is unique. In the following discussion, one entry in the buffer is denoted as H[i], where i is the index referring to the entry.

a. Alternatively, a, b, c and d defined in Eq (2) may be stored in the buffer; In this case, e and f are not stored any more.

b. Alternatively, a and b defined in Eq (1) may be stored in the buffer if it is coded with the 4-parameter affine mode;

c. Alternatively, a, b, e and f defined in Eq (1) may be stored in the buffer if it is coded with the 4-parameter affine mode;

d. The parameters a, b, c, d, e and f defined in Eq (2) are always stored in the buffer, but it is restricted that c=−b, d=a, if it is coded with 4-parameter affine mode.

e. The parameters a, b, c and d defined in Eq (2) are always stored in the buffer, but it is restricted that c=−b, d=a, if it is coded with 4-parameter affine mode.

f. Same number of parameters may be stored for 4-parameter and 6-parameter affine models, for example, a, b, c, d, e and f are stored. In another example, a, b, c and d are stored.

g. Alternatively, different number of parameters may be store for 4-parameter and 6-parameter affine models, and affine model type (i.e., 4-parameter or 6-parameter) may be store as well.

h. Which parameters to be stored in the buffer may depend on the affine modes, inter or merge mode, block size, picture type, etc. al.

i. Side information associated with the affine parameters may also be stored in the buffer together with the affine parameters, such as inter prediction direction (list 0 or list 1, or Bi), and reference index for list 0 and/or list 1. In this disclosure, the associated side information may also be included when talking about a set of affine parameters stored in the buffer.

i. If the affined-coded block is bi-predicted, then the set of affine parameters to be stored include the parameters used for list 0 as well as the parameters used for list 1.

(a) The parameters for the two reference lists (List0 and List1) are both stored.

(b) In one example, the parameters for the two reference lists are stored independently (in two different buffers);

(c) Alternatively, the parameters for the two reference lists can be stored with prediction from one to the other.

j. As an alternative storing method, CPMVs {$MV_0$, $MV_1$} or {$MV_0$, $MV_1$, $MV_2$} of an affine-coded block are stored in the buffer instead of the parameters. The parameters for coding a new block can be calculated from $\{MV_0, MV_1\}$ or $\{MV_0, MV_1, MV_2\}$ when needed.

i. The width of the affine coded block may be stored in the buffer with the CPMVs.

ii. The height of the affine coded block may be stored in the buffer with the CPMVs.

iii. The top-left coordinate of the affine coded block may be stored in the buffer with the CPMVs.

k. In one example, the base MV ($mv_0{}^h$, $mv_0{}^v$) in Eq (1) is stored with parameters a and b.

i. In one example, the coordinate of the position where the base MV locates at is also stored with the parameters a and b.

l. In one example, the base MV ($mv_0{}^h$, $mv_0{}^v$) in Eq (2) is stored with parameters a, b, c and d.

i. In one example, the coordinate of the position where the base MV locates at is also stored with the parameters a, b c and d.

m. In one example, a set of stored parameters and their base MV should refer to the same reference picture if they refer to the same reference picture list.

n. The buffer used to store the coded/decoded affine related information, such as CPMVs, affine parameters, base point position coordinates, block width and height, is also called "affine HMVP buffer" in this document.

2. In one example, the parameters to be stored in the buffer can be calculated as below a. $\quad a = \dfrac{\left(mv_1^h - mv_0^h\right)}{w}.$ b. $\quad b = \dfrac{\left(mv_1^v - mv_0^v\right)}{w}.$ c. $\quad c = \dfrac{\left(mv_2^h - mv_0^h\right)}{h}.$ d. $\quad d = \dfrac{\left(mv_2^v - mv_0^v\right)}{h}.$ e. c=−b for 4-parameter affine prediction.

f. d=a for 4-parameter affine prediction.

g. $\quad e = mv_0^h.$ h. $\quad f = mv_0^v.$ i. (e, f)=(mvx, mvy), where (mvx, mvy) can be any MV used for coding one block. 3. It is proposed to calculate affine model parameters without division operations. Suppose the width and height of the current block noted as w and h are equal to $2^{WB}$ and $2^{HB}$. P is an integer number defining the calculation precision, e.g., P is set to 7.

a. $\quad a = SignShift(P \cdot (mv_1^h - mv_0^h), WB).$ b. $\quad b = SignShift(P \cdot (mv_1^v - mv_0^v), WB).$ -continued c. $\quad c = SignShift(P \cdot (mv_2^h - mv_0^h), HB).$ d. $\quad d = SignShift(P \cdot (mv_2^v - mv_0^v), HB).$ 4. The affine model parameters may be further clipped before being stored in the buffer.

a. In one example, suppose a parameter x (e.g. x=a orb or c or d) is stored with Kbits, then x=Clip3(−$2^{K-1}$, $2^{K-1}$, x).

b. For example, a=Clip(−128, 127, a), then a is stored as a 8 bit signed integer.

5. The affine model parameters may be clipped before being used for coding/decoding affine-coded blocks (such as, to derive MVs for sub-blocks).

a. In one example, a=Clip3(Min_a, Max_a, a), b=Clip3 (Min_b, Max_b, b), c=Clip3(Min_c, Max_c, c), d=Clip3(Min_d, Max_d, d) wherein Min_a/b/c/d and Max_a/b/c/d are called clipping boundaries.

b. In one example, the clipping boundaries may depend on the precision (e.g., bit-depth) of affine parameters.

c. In one example, the clipping boundaries may depend on width and height of the block.

d. In one example, the clipping boundaries may be signaled such as in VPS/SPS/PPS/picture header/ slice header/tile group header.

e. In one example, the clipping boundaries may depend on the profile or/and level of a standard.

6. The affine model parameters of each affine-coded block may be stored in the buffer after decoding or encoding that block.

a. Whether to store the affine model parameters of an affine-coded block may depend on the coded affine mode (e.g., affine AMVP, or affine merge), number of affine-coded blocks, positions of the affine-coded block, block dimension etc. al.

b. In one example, the affine model parameters of the every Kth affine-coded block are stored in the buffer after decoding or encoding every K affine-coded blocks. That is, the affine model parameters of every first, second, . . . . (K−1)th affine-coded blocks are not stored in the buffer.

i. K is a number such as 2 or 4.

ii. K may be signaled from the encoder to the decoder in VPS/SPS/PPS/Slice header/tile group head/tile.

7. The buffer for storing the affine parameters may have a maximum capacity.

a. The buffer may at most store M sets of affine parameters, i.e., for H[i], i>=0 and i<M.

i. M is an integer such as 8 or 16.

ii. M may be signaled from the encoder to the decoder in VPS/SPS/PPS/Slice header/tile group head/tile/CTU line/CTU.

iii. M may be different for different standard profiles/ levels/tiers.

8. When the buffer for affine parameter storage is not full, (i.e., the number of stored sets of affine parameters S is smaller than the maximum capacity M), and a new set of affine parameters need to be stored into the buffer, H[S−1] is used to store the new parameters and then S=S+1.

9. When the buffer is full (i.e., the number of stored sets of affine parameters S is equal to the maximum capacity M), and a new set of affine parameters needs to be stored into the buffer, one or some strategies as below can be done:

a. The new set of affine parameters cannot be stored into the buffer;

b. One entry already in the buffer is removed and the new set of affine parameters is stored into the buffer.

i. In one example, the earliest entry stored in the buffer, e.g. H[0] is removed from the buffer.

ii. In one example, the last entry stored in the buffer, e.g. H[M−1] is removed from the buffer.

iii. In one example, any entry stored in the buffer, e.g. H[T] is removed from the buffer, T>=0 and T<M.

iv. If H[T] is removed, the new set of affine parameters is stored as H[T].

v. If H[T] is removed, all entries after H[T] are moving forward. For example, H[X]=H[X+1] for X from T to M−1 in an ascending order. Then the new set of affine parameters is put to the last entry in the buffer, e.g. H[M−1];

vi. If H[T] is removed, all entries before H[T] are moving backward. For example, H[X]=H[X−1] for X from T to 1 in a descending order. Then the new set of affine parameters is put to the first entry in the buffer, e.g. H[0];

10. When a new set of affine parameters needs to be stored into the buffer, it may be compared to all or some sets of affine parameters already in the buffer. If it is judged to be same or similar to at least one set of affine parameters already in the buffer, it should not be stored into the buffer. This procedure is known as "pruning".

a. For one reference picture list (one prediction direction), the affine parameters {a, b, c, d} or {a, b, c, d, e, f} and affine parameters {a', b', c', d'} or {a', b', c', d', e', f'} are considered to be same or similar if i. a==a' in one example.

ii. b==b' in one example.

iii. c==c' in one example.

iv. d==d' in one example.

v. a==a' and b==b' in one example.

vi. c==c' and d==d' in one example.

vii. a==a' and b==b' and c==c' in one example.

viii. a==a' and b==b' and c==c' and d=d' in one example.

ix. |a−a'|<delta0 in one example.

x. |b−b'|<delta0 in one example.

xi. |c−c'|<delta0 in one example.

xii. |d−d'|<delta0 in one example.

xiii. |a−a'|<delta0 and |b−b'|<delta1 in one example.

xiv. |c−c'|<delta0 and |d−d'|<delta1 in one example.

xv. |a−a'|<delta0 and |b−b'|<delta1 and |c−c'|<delta2 in one example.

xvi. |a−a'|<delta0 and |b−b'|<delta1 and |c−c'|<delta2 and |d−d'|<delta3 in one example.

xvii. Variables (e.g., delta0, delta1, delta2, delta3) may be a predefined number, or it may depend on coding information such as block width/height. It may be different for different standard profiles/levels/tiers. It may be signaled from the encoder to the decoder in VPS/SPS/PPS/Slice header/tile group head/tile/CTU line/CTU.

b. Two sets of affine parameters are considered not to be the same or similar if i. They are associated with different inter prediction direction (list 0 or list 1, or Bi), ii. They are associated with different reference indices for list 0 when list 0 is one prediction direction in use.

iii. They are associated with different reference indices for list 1 when list 1 is one prediction direction in use.

iv. They have different number of affine parameters or they use different affine models.

c. If two sets of affine parameters are both associated from bi-prediction, they are judged to be identical (or similar) if parameters for list 0 are judged to be identical (or similar) and parameters for list 1 are also judged to be identical (or similar).

d. A new set of affine parameters may be compared to each set of affine parameters already in the buffer.

i. Alternatively, the new set of affine parameters is only compared to some sets of affine parameters already in the buffer. For example, it is compared to the first W entries, e.g. H[0] . . . H[W−1]. In another example, it is compared to the last W entries, e.g. H[M−W], H[M−1]. In another example, it is compared to one entry in each W entries, e.g. H[0], H[W], H[2*W].

e. If one entry in the buffer, denoted as H[T] is found identical or similar to the new set of affine parameters needs to be stored into the buffer, then i. H[T] is removed, then the new set of affine parameters is stored as H[T].

ii. H[T] is removed, then all entries after H[T] are moving forward. For example, H[X]=H[X+1] for X from T to M−1 in an ascending order. Then the new set of affine parameters is put to the last entry in the buffer, e.g. H[M−1].

iii. H[T] is removed then all entries before H[T] are moving backward. For example, H[X]=H[X−1] for X from T to 1 in a descending order. Then the new set of affine parameters is put to the first entry in the buffer, e.g. H[0].

11. The buffer storing the affine parameters may be refreshed.

a. The buffer is emptied when being refreshed.

b. The buffer is emptied when being refreshed, then one or more default affine parameters are put into the buffer when being refreshed.

i. The default affine parameters can be different for different sequences;

ii. The default affine parameters can be different for different pictures;

iii. The default affine parameters can be different for different slices;

iv. The default affine parameters can be different for different tiles;

v. The default affine parameters can be different for different CTU (a.k.a LCU) lines;

vi. The default affine parameters can be different for different CTUs;

vii. The default affine parameters can be signaled from the encoder to the decoder in VPS/SPS/PPS/Slice header/tile group head/tile/CTU line/CTU.

c. The buffer is refreshed when i. starting coding/decoding the first block of a picture;

ii. starting coding/decoding the first block of a slice;

iii. starting coding/decoding the first block of a tile;

iv. starting coding/decoding the first block of a CTU (a.k.a LCU) line;

v. starting coding/decoding the first block of a CTU;

12. The affine model parameters stored in the buffer may be used to derive the affine prediction of a current block.

a. In one example, the parameters stored in the buffer may be utilized for motion vector prediction or motion vector coding of current block.

b. In one example, the parameters stored in the buffer may be used to derive the control point MVs (CPMVs) of the current affine-coded block.

c. In one example, the parameters stored in the buffer may be used to derive the MVs used in motion compensation for sub-blocks of the current affine-coded block.

d. In one example, the parameters stored in the buffer may be used to derive the prediction for CPMVs of the current affine-coded block. This prediction for CPMVs can be used to predict the CPMVs of the current block when CPMVs need to be coded.

i. In one example, if current block is coded with 4-parameter affine model, then, higher priority is assigned to 4-parameter affine model and lower priority is assigned to 6-parameter affine model.

ii. In one example, if current block is coded with 6-parameter affine model, then, higher priority is assigned to 6-parameter affine model and lower priority is assigned to 4-parameter affine model.

Figure 19:
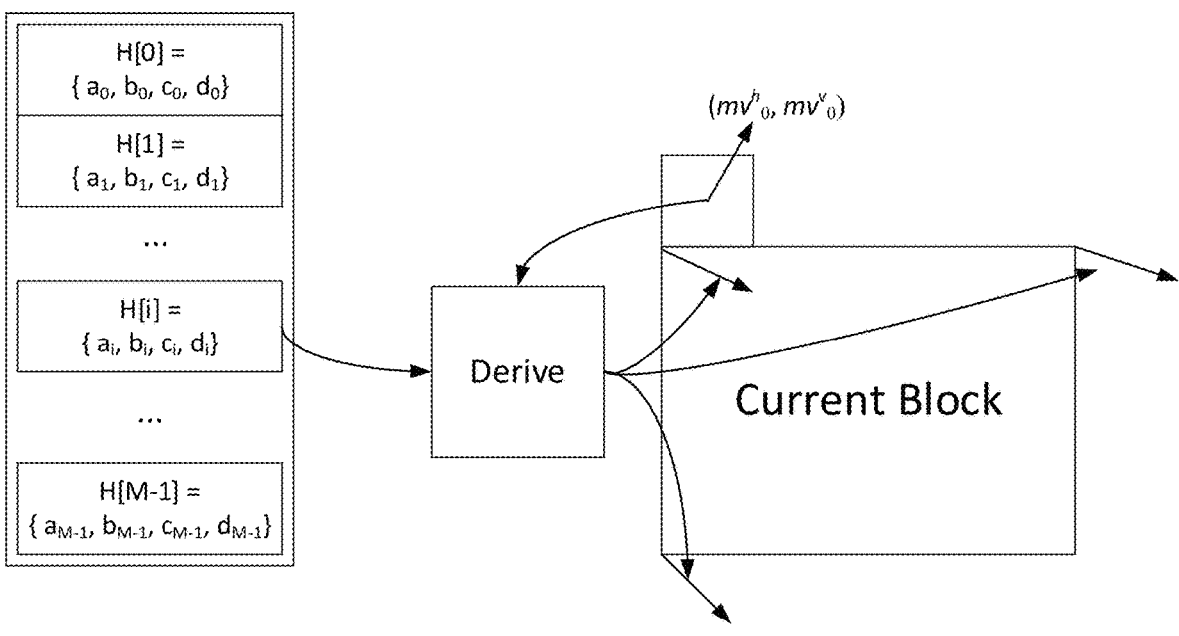
FIG. 19 illustrates an example of deriving CPMVs from the MV of a neighbouring block and a set of parameters stored in the buffer.

13. The motion information of a neighbouring M×N unit block (e.g. 4×4 block in VTM) and a set of affine parameters stored in the buffer may be used together to derive the affine model of the current block. For example, they can be used to derive the CPMVs or the MVs of sub-blocks used in motion compensation. FIG. 19 shows an example of deriving CPMVs from the MV of a neighbouring block and a set of parameters stored in the buffer.

a. Suppose the MV stored in the unit block is ($mv^h_0$, $mv^v_0$) and the coordinate of the position for which the MV ($mv^h(x,y)$, $mv^v(x,y)$) is derived is denoted as (x, y). Suppose the coordinate of the top-left corner of the current block is (x0', y0'), the width and height of the current block is w and h, then i. To derive a CPMV, (x, y) can be (x0', y0'), or (x0'+w, y0'), or (x0', y0'+h), or (x0'+w, y0'+h).

ii. To derive a MV for a sub-block of the current block, (x, y) can be the center of the sub-block. Suppose (x00, y00) is the top-left position of a sub-block, the sub-block size is M×N, then $$xm = x00 + M/2, \; ym = y00 + N/2; \qquad (a)$$

$$xm = x00 + M/2 - 1, \; ym = y00 + N/2 - 1; \qquad (b)$$

$$xm = x00 + M/2 - 1, \; ym = y00 + N/2; \qquad (c)$$

$$xm = x00 + M/2, \; ym = y00 + N/2 - 1; \qquad (d)$$

iii. In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the parameters in the buffer come from a block coded with the 4-parameter affine mode.

iv. In one example, $$\begin{cases} mv^h(x, y) = ax + cy + mv^h_0 \\ mv^v(x, y) = bx + dy + mv^v_0 \end{cases}$$

if the parameters in the buffer come from a block coded with the 6-parameter affine mode.

v. In one example, $$\begin{cases} mv^h(x, y) = ax + cy + mv^h_0 \\ mv^v(x, y) = bx + dy + mv^v_0 \end{cases}$$

no matter the parameters in the buffer come from a block coded with the 4-parameter affine mode or the 6-parameter affine mode.

b. In one example, CPMVs of the current block are derived from the motion vector and parameters stored in the buffer, and these CPMVs serves as MVPs for the signaled CPMVs of the current block.

c. In one example, CPMVs of the current block are derived from the motion vector and parameters stored in the buffer, and these CPMVs are used to derive the MVs of each sub-block used for motion compensation.

d. In one example, the MVs of each sub-block used for motion compensation are derived from the motion vector and parameters stored in a neighbouring block, if the current block is affine merge coded.

e. In one example, the motion vector of a neighbouring unit block and the set of parameters used to derive the CPMVs or the MVs of sub-blocks used in motion compensation for the current block should follow some or all constrains as below:

i. They are associated with the same inter prediction direction (list 0 or list 1, or Bi).

ii. They are associated with the same reference indices for list 0 when list 0 is one prediction direction in use.

iii. They are associated with the same reference indices for list 1 when list 1 is one prediction direction in use.

14. The affine model of the current block derived from a set of affine parameters stored in the buffer may be used to generate an affine merge candidate.

a. In one example, the side information such as inter-prediction direction and reference indices for list 0/list 1 associated with the stored parameters is inherited by the generated affine merge candidate.

b. The affine merge candidate derived from a set of affine parameters stored in the buffer can be inserted into the affine merge candidate list after the affine merge candidates inherited from neighbouring blocks, before the constructed affine merge candidates;

c. The affine merge candidate derived from a set of affine parameters stored in the buffer can be inserted into the affine merge candidate list after the constructed affine merge candidates, before the padding candidates.

d. The affine merge candidate derived from a set of affine parameters stored in the buffer can be inserted into the affine merge list after the constructed affine merge candidates not using temporal motion prediction (block T in FIG. 9), before the constructed affine merge candidates using temporal motion prediction (block T in FIG. 9);

e. The affine merge candidate derived from a set of affine parameters stored in the buffer can be inserted into the affine merge candidate list, and they can be interleaved with the constructed affine merge candidates, or/and padding candidates.

15. The affine parameters stored in the buffer can be used to generate affine AMVP candidates.

a. In one example, the stored parameters used to generate affine AMVP candidates should refer to the same reference picture as the target reference picture of an affine AMVP coded block.

i. In one example, the reference picture list associated with the stored parameters should be the same as the target reference picture list.

ii. In one example, the reference index associated with the stored parameters should be the same as the target reference index.

b. The affine AMVP candidate derived from a set of affine parameters stored in the buffer can be inserted into the affine AMVP candidate list after the affine AMVP candidates inherited from neighbouring blocks, before the constructed affine AMVP candidates;

c. The affine AMVP candidate derived from a set of affine parameters stored in the buffer can be inserted into the affine AMVP candidate list after the constructed affine AMVP candidates, before the HEVC based affine AMVP candidates.

d. The affine AMVP candidate derived from a set of affine parameters stored in the buffer can be inserted into the affine AMVP candidate list after the HEVC based affine AMVP candidates, before the padding affine AMVP candidates.

e. The affine AMVP candidate derived from a set of affine parameters stored in the buffer can be inserted into the affine AMVP list after the constructed affine AMVP candidates not using temporal motion prediction (block T in FIG. 9), before the constructed affine AMVP candidates using temporal motion prediction (block T in FIG. 9);

f. In one example, if current block is coded with 4-parameter affine model, then, higher priority is assigned to 4-parameter affine model and lower priority is assigned to 6-parameter affine model.

g. In one example, if current block is coded with 6-parameter affine model, then, higher priority is assigned to 6-parameter affine model and lower priority is assigned to 4-parameter affine model.

16. How many sets of affine model parameters in the buffer to be added to the candidate list (denoted by N) may be pre-defined.

a. N may be signaled in from the encoder to the decoder in VPS/SPS/PPS/Slice header/tile group head/tile.

b. N may be dependent on block dimension, coded mode information (e.g. AMVP/Merge), etc. al.

c. N may be dependent on the standard profiles/levels/tiers.

d. N may depend on the available candidates in the list.

i. N may depend on the available candidates of a certain type (e.g., inherited affine motion candidates).

17. How to select partial of all sets of affine model parameters (e.g., N as in bullet 15) in the buffer to be inserted into the candidate list may be pre-defined.

a. In one example, the latest several sets (e.g., the last N entries) in the buffer.

b. It may be dependent on the index of sets of affine model parameters in the buffer.

18. When multiple sets of affine model parameters need to be inserted to the candidate list, they may be added in the ascending order of indices.

a. Alternatively, they may be added in the descending order of indices.

b. Alternatively, the rule to decide the inserting order is depend on the number of available candidates in the candidate list before adding those from the buffer.

19. A set of affine parameters stored in the buffer, and their associated base MVs and the position where the base MV locates at, may be used together to derive the affine model of the current block. For example, they can be used to derive the CPMVs or the MVs of sub-blocks used in motion compensation.

a. Suppose the associated base MV is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is $w$ and $h$, then i. To derive a CPMV, $(x, y)$ can be $(x0', y0')$, or $(x0'+w, y0')$, or $(x0', y0'+h)$, or $(x0'+w, y0'+h)$.

ii. To derive a MV for a sub-block of the current block, $(x, y)$ can be the center of the sub-block.

iii. Suppose $(xm, ym)$ is the stored coordinate of the position (base position) where the base MV locates at.

iv. In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the parameters in the buffer come from a block coded with the 4-parameter affine mode.

v. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

if the parameters in the buffer come from a block coded with the 6-parameter affine mode.

vi. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

no matter the parameters in the buffer come from a block coded with the 4-parameter affine mode or the 6-parameter affine mode.

b. In one example, CPMVs of the current block are derived from the motion vector and parameters stored in the buffer, and these CPMVs serves as MVPs for the signaled CPMVs of the current block.

c. In one example, CPMVs of the current block are derived from the associated base MV and parameters stored in the buffer, and these CPMVs are used to derive the MVs of each sub-block used for motion compensation.

d. In one example, the MVs of each sub-block used for motion compensation are derived from the associated base MV and parameters stored in a neighbouring block, if the current block is affine merge coded.

20. The motion information of a spatial neighbouring/non-adjacent M×N unit block (e.g. 4×4 block in VTM) and a set of affine parameters stored in the buffer may be used together to derive the affine model of the current block. For example, they can be used to derive the CPMVs or the MVs of sub-blocks used in motion compensation.

a. Suppose the MV stored in the unit block is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is w and h, then i. To derive a CPMV, $(x, y)$ can be $(x0', y0')$, or $(x0'+w, y0')$, or $(x0', y0'+h)$, or $(x0'+w, y0'+h)$.

ii. To derive a MV for a sub-block of the current block, $(x, y)$ can be the center of the sub-block.

iii. Suppose $(x00, y00)$ is the top-left position of the spatial neighbouring M×N unit block, then the base position $(xm, ym)$ can be derived as:

$$xm = x00 + M/2, \; ym = y00 + N/2; \tag{a}$$

$$xm = x00 + M/2 - 1, \; ym = y00 + N/2 - 1; \tag{b}$$

$$xm = x00 + M/2 - 1, \; ym = y00 + N/2; \tag{c}$$

$$xm = x00 + M/2, \; ym = y00 + N/2 - 1; \tag{d}$$

iv. In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the parameters in the buffer come from a block coded with the 4-parameter affine mode.

v. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

if the parameters in the buffer come from a block coded with the 6-parameter affine mode.

vi. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

no matter the parameters in the buffer come from a block coded with the 4-parameter affine mode or the 6-parameter affine mode.

b. In one example, CPMVs of the current block are derived from the motion vector of a spatial neighbouring unit block and parameters stored in the buffer, and these CPMVs serves as MVPs for the signaled CPMVs of the current block.

c. In one example, CPMVs of the current block are derived from the motion vector of a spatial neighbouring unit block and parameters stored in the buffer, and these CPMVs are used to derive the MVs of each sub-block used for motion compensation.

d. In one example, the MVs of each sub-block used for motion compensation are derived from the motion vector of a spatial neighbouring unit block and parameters stored in a neighbouring block, if the current block is affine merge coded.

e. In one example, the motion vector of a spatial neighbouring unit block and the set of parameters used to derive the CPMVs or the MVs of sub-blocks used in motion compensation for the current block should follow some or all constrains as below:

i. They are associated with the same inter prediction direction (list 0 or list 1, or Bi).

ii. They are associated with the same reference indices for list 0 when list 0 is one prediction direction in use.

iii. They are associated with the same reference indices for list 1 when list 1 is one prediction direction in use.

f. In one example, if the MV of the spatial neighbouring M×N unit block and the stored affine parameters referring to different reference pictures, the MV of the spatial neighbouring M×N unit block is scaled to refer to the same reference picture as the stored affine parameters to derive the affine model of the current block.

Figure 20:
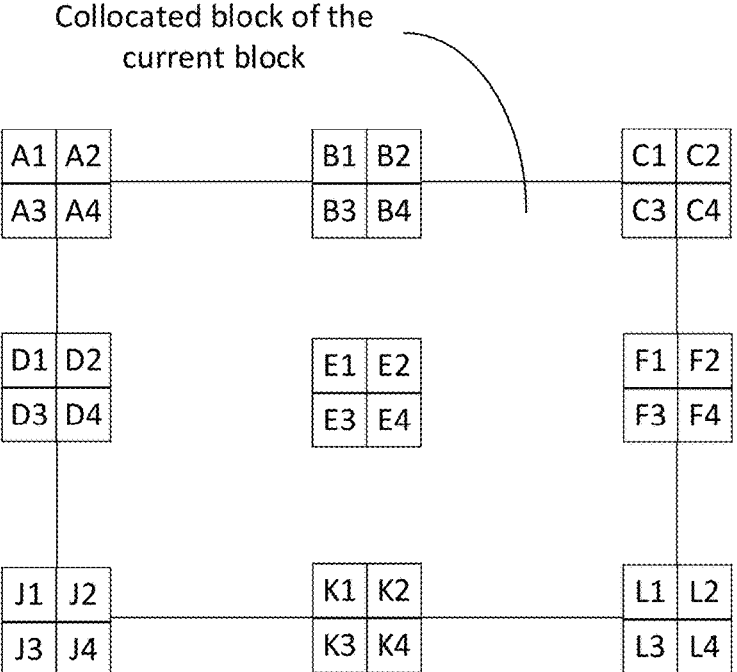
FIG. 20 illustrates examples of possible positions of the collocated unit block.
Figure 22:
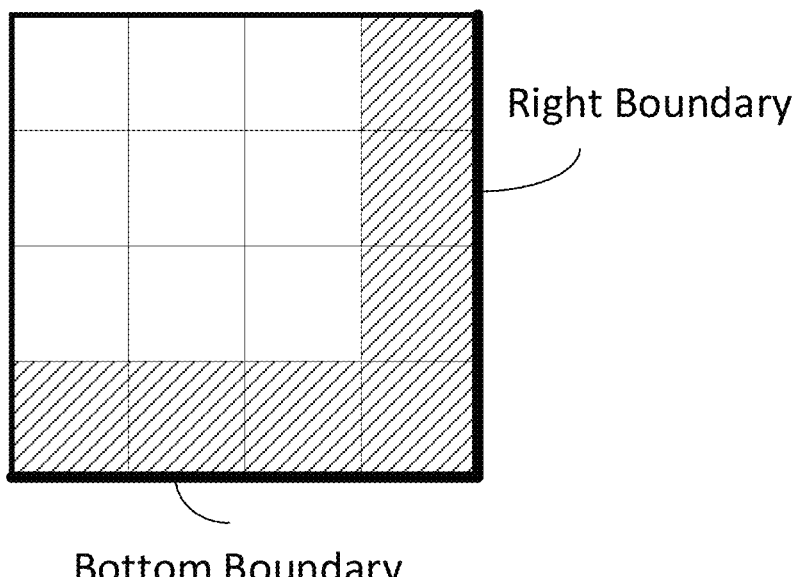
FIG. 22 illustrates sub-blocks at right and bottom boundary are shaded.

21. It is proposed that temporal motion vector prediction (TMVP) can be used together with the affine parameters stored in the buffer. For example, they can be used to derive the CPMVs or the MVs of sub-blocks used in motion compensation. FIG. 20 shows examples of possible positions of the collocated unit blocks.

a. The motion information of a collocated M×N unit block (e.g. 4×4 block in VTM) in the collocated picture and a set of affine parameters stored in the buffer may be used together to derive the affine model of the current block. For example, they can be used to derive the CPMVs or the MVs of sub-blocks used in motion compensation.

i. FIG. 22 shows examples of possible positions of the collocated unit block. (A1~A4, B1~B4, . . . F1~F4, J1~J4, K1~K4, and L1~L4.

b. Suppose the MV stored in the collocated unit block is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is w and h, then i. To derive a CPMV, $(x, y)$ can be $(x0', y0')$, or $(x0'+w, y0')$, or $(x0', y0'+h)$, or $(x0'+w, y0'+h)$.

ii. To derive a MV for a sub-block of the current block, $(x, y)$ can be the center of the sub-block.

iii. Suppose $(x00, y00)$ is the top-left position of the collocated M×N unit block, then the base position $(xm, ym)$ can be derived as:

$$xm = x00 + M/2, \; ym = y00 + N/2; \tag{a}$$

$$xm = x00 + M/2 - 1, \; ym = y00 + N/2 - 1; \tag{b}$$

$$xm = x00 + M/2 - 1, \; ym = y00 + N/2; \tag{c}$$

$$xm = x00 + M/2, \; ym = y00 + N/2 - 1. \tag{d}$$

iv. In one example, $$\begin{cases} mv^h(x, y) = a(x - xm) - b(y - ym) + mv_0^h \\ mv^v(x, y) = b(x - xm) + a(y - ym) + mv_0^v \end{cases}$$

if the parameters in the buffer come from a block coded with the 4-parameter affine mode.

v. In one example, $$\begin{cases} mv^h(x, y) = ax + cy + mv_0^h \\ mv^v(x, y) = bx + dy + mv_0^v \end{cases}$$

if the parameters in the buffer come from a block coded with the 6-parameter affine mode.

vi. In one example, $$\begin{cases} mv^h(x, y) = ax + cy + mv_0^h \\ mv^v(x, y) = bx + dy + mv_0^v \end{cases}$$

no matter the parameters in the buffer come from a block coded with the 4-parameter affine mode or the 6-parameter affine mode.

c. In one example, CPMVs of the current block are derived from the motion vector of a temporal neighbouring block and parameters stored in the buffer, and these CPMVs serves as MVPs for the signaled CPMVs of the current block.

d. In one example, CPMVs of the current block are derived from the motion vector of a temporal neighbouring block and parameters stored in the buffer, and these CPMVs are used to derive the MVs of each sub-block used for motion compensation.

e. In one example, the MVs of each sub-block used for motion compensation are derived from the motion vector of a temporal neighbouring block and parameters stored in a neighbouring block, if the current block is affine merge coded.

f. In one example, the motion vector of a temporal neighbouring unit block and the set of parameters used to derive the CPMVs or the MVs of sub-blocks used in motion compensation for the current block should follow some or all constrains as below:

i. They are associated with the same inter prediction direction (list 0 or list 1, or Bi).

ii. They are associated with the same reference indices for list 0 when list 0 is one prediction direction in use.

iii. They are associated with the same reference indices for list 1 when list 1 is one prediction direction in use.

g. In one example, if the MV of the temporal neighbouring M×N unit block and the stored affine parameters referring to different reference pictures, the MV of the spatial temporal M×N unit block is scaled to refer to the same reference picture as the stored affine parameters to derive the affine model of the current block.

i. For example, if the POC of the collocated picture is POCx; the POC of the reference picture the MV of the temporal neighbouring M×N unit block refers to is POCy; the POC of the current picture is POCz; the POC of the reference picture the stored affine parameters refer to is POCw, then $(mv^h_0, mv^v_0)$ is scaled as $$mv^h0 = mv^h0 \times (POCw - POCz) / (POCy - POCx)$$

and $$mv^v0 = mv^v0 \times (POCw - POCz) / (POCy - POCx).$$

22. The affine merge candidates derived from parameters stored in the buffer and one or multiple spatial neighbouring/non-adjacent unit blocks can be put into the affine merge candidate list.

a. In one example, these candidates are put right after the inherited affine merge candidates.

b. In one example, these candidates are put right after the first constructed affine merge candidate.

c. In one example, these candidates are put right after the first affine merge candidate constructed from spatial neighbouring blocks.

d. In one example, these candidates are put right after all the constructed affine merge candidates.

e. In one example, these candidates are put right before all the zero affine merge candidates.

f. In one example, a spatial neighbouring unit block is not used to derive an affine merge candidate with the parameters stored in the buffer, if another affine merge candidate is inherited from the spatial neighbouring unit block.

g. In one example, a spatial neighbouring unit block can be used to derive an affine merge candidate with only one set of the parameters stored in the buffer. In other words, if a spatial neighbouring unit block and set of the parameters stored in the buffer has derive an affine merge candidate, it cannot be used to derive another affine merge candidate with another set of parameters stored in the buffer.

h. In one example, at most N affine merge candidates derived from parameters stored in the buffer and a spatial neighbouring unit block can be put into the affine merge candidate list. N is an integer such as 3.

i. In one example, the GBI index of the current block is inherited from the GBI index of the spatial neighbouring block if it chooses the affine merge candidates derived from parameters stored in the buffer and a spatial neighbouring unit block.

j. In one example, affine merge candidates derived from parameters stored in the buffer and spatial neighbouring blocks are put into the affine merge candidate list in order.

i. For example, a two-level nested looping method are used to search available affine merge candidates derived from parameters stored in the buffer and spatial neighbouring blocks and put them into the affine merge candidate list.

(a) In the first level loop, each set of parameters stored in the buffer are visited in order. They can be visited from the beginning of the table to the end, or from the end of the table to the beginning, or in any other predefined or adaptive order.

a. In an example, some sets of parameters stored in the buffer are skipped in the first loop. For example, the first N or the last N sets in the table are skipped. Alternatively, H[k]s are skipped if k % S==0. Alternatively, H[k]s are skipped if k % S !=0.

(b) For each set of parameters stored in the buffer, a second level loop is applied. In the second level loop, each spatial neighboring block is visited in order. For example, blocks A1, B1, B0, A0, and B2 as shown in FIG. 9 are visited in order. In a pseudo code implementation, the nested loops can be described as:

```
for( int i = 0; i < sizeof(H[i]); i++ )
    {
        for( int j = 0; j < Num_Neighbours; j++)// N[j]
represents a spatial neighbouring block
        {
            //Try to derive an affine merge candidate with H[i]
and N[j];
        }
    }.
``` a. In one example, there may be only one spatial neighbouring block included in the second loop. For example, only A1 is included.

b. With a set of parameters given in the first level loop and a spatial neighbouring block given in the second level loop, an affine merge candidate generated and put into the affine merge candidate list if all or some of the following conditions are satisfied.

i. The spatial neighbouring block is available;

ii. The spatial neighbouring block is inter-coded;

iii. The spatial neighbouring block is not out of the current CTU-row.

iv. Inter-prediction (list 0, list1, or bi) of the set of parameters and that of the spatial neighbouring block are the same;

v. Reference Index for list 0 of the set of parameters and that of the spatial neighbouring block are the same;

vi. Reference Index for list 1 of the set of parameters and that of the spatial neighbouring block are the same;

vii. The POC of the reference picture for list 0 of the set of parameters is the same to the POC of one of the reference pictures of the spatial neighbouring block.

viii. The POC of the reference picture for list 1 of the set of parameters is the same to the POC of one of the reference pictures of the spatial neighbouring block.

c. In one example, if a neighbouring block has been used to derive an inherited affine merge candidate, then it is skipped in the second loop, not to be used to derive an affine merge candidate with stored affine parameters.

d. In one example, if a neighbouring block has been used to derive an affine merge candidate with a set of stored affine parameters, then it is skipped in the second loop, not to be used to derive an affine merge candidate with another set of stored affine parameters.

e. In one example, if a neighbouring block is used to derive an affine merge candidate, then all other neighbouring blocks after that neighbouring block are skipped and the second loop is broken and go back to the first loop. The next set of parameters is visited in the first loop.

23. The affine merge candidates derived from parameters stored in the buffer and one or multiple temporal unit block can be put into the affine merge candidate list.

a. In one example, these candidates are put right after the inherited affine merge candidates.

b. In one example, these candidates are put right after the first constructed affine merge candidate.

c. In one example, these candidates are put right after the first affine merge candidate constructed from spatial neighbouring blocks.

d. In one example, these candidates are put right after all the constructed affine merge candidates.

e. In one example, these candidates are put right after all affine merge candidates derived from parameters stored in the buffer and a spatial neighbouring unit block.

f. In one example, these candidates are put right before all the zero affine merge candidates.

g. In one example, at most N affine merge candidates derived from parameters stored in the buffer and a temporal neighbouring unit block can be put into the affine merge candidate list. N is an integer such as 3.

h. In one example, the GBI index of the current block is inherited from the GBI index of the temporal neighbouring block if it chooses the affine merge candidates derived from parameters stored in the buffer and a temporal neighbouring unit block.

i. In one example, affine merge candidates derived from parameters stored in the buffer and temporal neighbouring blocks are put into the affine merge candidate list in order.

i. For example, a two-level nested looping method are used to search available affine merge candidates derived from parameters stored in the buffer and temporal neighbouring blocks and put them into the affine merge candidate list.

(a) In the first level loop, each set of parameters stored in the buffer are visited in order. They can be visited from the beginning of the table to the end, or from the end of the table to the beginning, or in any other predefined or adaptive order.

a. In an example, some sets of parameters stored in the buffer are skipped in the first loop. For example, the first N or the last N sets in the table are skipped. Alternatively, H[k]s are skipped if k % S==0. Alternatively, H[k]s are skipped if k % S !=0.

(b) For each set of parameters stored in the buffer, a second level loop is applied. In the second level loop, each temporal neighboring block is visited in order. For example, blocks L4 and E4 as shown in FIG. 20 are visited in order. In a pseudo code implementation, the nested loops can be described as:

```
for( int i = 0; i < sizeof(H[i]); i++ )
    {
        for( int j = 0; j < Num_Neighbours; j++)// N[j]
represents a temporal neighbouring block
        {
            //Try to derive an affine merge candidate with H[i]
and N[j];
        }
    }.
``` a. In one example, there may be only one temporal neighbouring block included in the second loop. For example, only L4 is included.

b. With a set of parameters given in the first level loop and a neighbouring block given in the second level loop, an affine merge candidate generated and put into the affine merge candidate list if all or some of the following conditions are satisfied.

i. The neighbouring block is available;

ii. The neighbouring block is inter-coded;

iii. The neighbouring block is not out of the current CTU-row.

iv. Inter-prediction (list 0, list1, or bi) of the set of parameters and that of the neighbouring block are the same;

v. Reference Index for list 0 of the set of parameters and that of the neighbouring block are the same;

vi. Reference Index for list 1 of the set of parameters and that of the neighbouring block are the same;

vii. The POC of the reference picture for list 0 of the set of parameters is the same to the POC of one of the reference pictures of the neighbouring block.

viii. The POC of the reference picture for list 1 of the set of parameters is the same to the POC of one of the reference pictures of the neighbouring block.

c. In one example, if a neighbouring block has been used to derive an inherited affine merge candidate, then it is skipped in the second loop, not to be used to derive an affine merge candidate with stored affine parameters.

d. In one example, if a neighbouring block has been used to derive an affine merge candidate with a set of stored affine parameters, then it is skipped in the second loop, not to be used to derive an affine merge candidate with another set of stored affine parameters.

e. In one example, if a neighbouring block is used to derive an affine merge candidate, then all other neighbouring blocks after that neighbouring block are skipped and the second loop is broken and go back to the first loop. The next set of parameters is visited in the first loop.

24. The affine AMVP candidates derived from parameters stored in the buffer and one or multiple spatial neighbouring/non-adjacent unit block can be put into the affine AMVP candidate list.

a. In one example, these candidates are put right after the inherited affine AMVP candidates.

b. In one example, these candidates are put right after the first constructed AMVP merge candidate.

c. In one example, these candidates are put right after the first affine AMVP candidate constructed from spatial neighbouring blocks.

d. In one example, these candidates are put right after all the constructed affine AMVP candidates.

e. In one example, these candidates are put right after the first translational affine AMVP candidate.

f. In one example, these candidates are put right after all translational affine AMVP candidates.

g. In one example, these candidates are put right before all the zero affine AMVP candidates.

h. In one example, a spatial neighbouring unit block is not used to derive an affine AMVP candidate with the parameters stored in the buffer, if another affine AMVP candidate is inherited from the spatial neighbouring unit block.

i. In one example, a spatial neighbouring unit block can be used to derive an affine AMVP candidate with only one set of the parameters stored in the buffer. In other words, if a spatial neighbouring unit block and set of the parameters stored in the buffer has derive an affine AMVP candidate, it cannot be used to derive another affine AMVP candidate with another set of parameters stored in the buffer.

j. In one example, at most N affine AMVP candidates derived from parameters stored in the buffer and a spatial neighbouring unit block can be put into the affine AMVP candidate list. N is an integer such as 1.

k. In one example, affine AMVP candidates derived from parameters stored in the buffer and spatial neighbouring blocks are put into the affine AMVP candidate list in order.

i. For example, a two-level nested looping method are used to search available affine AMVP candidates derived from parameters stored in the buffer and spatial neighbouring blocks and put them into the affine AMVP candidate list.

(a) In the first level loop, each set of parameters stored in the buffer are visited in order. They can be visited from the beginning of the table to the end, or from the end of the table to the beginning, or in any other predefined or adaptive order.

a. In an example, some sets of parameters stored in the buffer are skipped in the first loop. For example, the first N or the last N sets in the table are skipped. Alternatively, H[k]s are skipped if k % S==0. Alternatively, H[k]s are skipped if k % S !=0.

(b) For each set of parameters stored in the buffer, a second level loop is applied. In the second level loop, each spatial neighboring block is visited in order. For example, blocks A1, B1, B0, A0, and B2 as shown in FIG. 9 are visited in order. In a pseudo code implementation, the nested loops can be described as:

```
for( int i = 0; i < sizeof(H[i]); i++ )
{
    for( int j = 0; j < Num_Neighbours; j++)// N[j]
represents a spatial neighbouring block
    {
        //Try to derive an affine AMVP candidate with H[i]
and N[j];
    }
}.
``` a. In one example, there may be only one spatial neighbouring block included in the second loop. For example, only A1 is included.

b. With a set of parameters given in the first level loop and a spatial neighbouring block given in the second level loop, an affine AMVP candidate generated and put into the affine AMVP candidate list if all or some of the following conditions are satisfied.

i. The spatial neighbouring block is available;

ii. The spatial neighbouring block is inter-coded;

iii. The spatial neighbouring block is not out of the current CTU-row.

iv. Reference Index for list 0 of the set of parameters and that of the spatial neighbouring block are the same;

v. Reference Index for list 1 of the set of parameters and that of the spatial neighbouring block are the same;

vi. Reference Index for list 0 of the set of parameters is equal to the AMVP signaled reference index for list 0.

vii. Reference Index for list 1 of the set of parameters is equal to the AMVP signaled reference index for list 1.

viii. Reference Index for list 0 of the spatial neighbouring block is equal to the AMVP signaled reference index for list 0.

ix. Reference Index for list 1 of the spatial neighbouring block is equal to the AMVP signaled reference index for list 1.

x. The POC of the reference picture for list 0 of the set of parameters is the same to the POC of one of the reference pictures of the spatial neighbouring block.

xi. The POC of the reference picture for list 1 of the set of parameters is the same to the POC of one of the reference pictures of the spatial neighbouring block.

xii. The POC of the AMVP signaled reference picture for list 0 is the same to the POC of one of the reference pictures of the spatial neighbouring block.

xiii. The POC of the AMVP signaled reference picture for list 0 is the same to the POC of one of the reference pictures of the set of parameters.

c. In one example, if a neighbouring block has been used to derive an inherited affine AMVP candidate, then it is skipped in the second loop, not to be used to derive an affine AMVP candidate with stored affine parameters.

d. In one example, if a neighbouring block has been used to derive an affine AMVP candidate with a set of stored affine parameters, then it is skipped in the second loop, not to be used to derive an affine AMVP candidate with another set of stored affine parameters.

e. In one example, if a neighbouring block is used to derive an affine AMVP candidate, then all other neighbouring blocks after that neighbouring block are skipped and the second loop is broken and go back to the first loop. The next set of parameters is visited in the first loop.

25. The affine AMVP candidates derived from parameters stored in the buffer and one or multiple temporal unit block can be put into the affine AMVP candidate list.

a. In one example, these candidates are put right after the inherited affine AMVP candidates.

b. In one example, these candidates are put right after the first constructed AMVP merge candidate.

c. In one example, these candidates are put right after the first affine AMVP candidate constructed from spatial neighbouring blocks.

d. In one example, these candidates are put right after all the constructed affine AMVP candidates.

e. In one example, these candidates are put right after the first translational affine AMVP candidate.

f. In one example, these candidates are put right after all translational affine AMVP candidates.

g. In one example, these candidates are put right before all the zero affine AMVP candidates.

h. In one example, these candidates are put right after all affine AMVP candidates derived from parameters stored in the buffer and a spatial neighbouring unit block.

i. In one example, at most N affine AMVP candidates derived from parameters stored in the buffer and a temporal neighbouring unit block can be put into the affine merge candidate list. N is an integer such as 1.

j. In one example, affine AMVP candidates derived from parameters stored in the buffer and temporal neighbouring blocks are put into the affine AMVP candidate list in order.

i. For example, a two-level nested looping method are used to search available affine AMVP candidates derived from parameters stored in the buffer and temporal neighbouring blocks and put them into the affine AMVP candidate list.

(a) In the first level loop, each set of parameters stored in the buffer are visited in order. They can be visited from the beginning of the table to the end, or from the end of the table to the beginning, or in any other predefined or adaptive order.

a. In an example, some sets of parameters stored in the buffer are skipped in the first loop. For example, the first N or the last N sets in the table are skipped. Alternatively, H[k]s are skipped if k % S==0. Alternatively, H[k]s are skipped if k % S !=0.

(b) For each set of parameters stored in the buffer, a second level loop is applied. In the second level loop, each temporal neighboring block is visited in order. For example, blocks A1, B1, B0, A0, and B2 as shown in FIG. 9 are visited in order. In a pseudo code implementation, the nested loops can be described as:

```
for( int i = 0; i < sizeof(H[i]); i++ )
{
    for( int j = 0; j < Num_Neighbours; j++)// N[j]
represents a temporal neighbouring block
    {
        //Try to derive an affine AMVP candidate with H[i]
and N[j];
    }
}.
``` a. In one example, there may be only one temporal neighbouring block included in the second loop. For example, only A1 is included.

b. With a set of parameters given in the first level loop and a temporal neighbouring block given in the second level loop, an affine AMVP candidate generated and put into the affine AMVP candidate list if all or some of the following conditions are satisfied.

i. The temporal neighbouring block is available;

ii. The temporal neighbouring block is inter-coded;

iii. The temporal neighbouring block is not out of the current CTU-row.

iv. Reference Index for list 0 of the set of parameters and that of the temporal neighbouring block are the same;

v. Reference Index for list 1 of the set of parameters and that of the temporal neighbouring block are the same;

vi. Reference Index for list 0 of the set of parameters is equal to the AMVP signaled reference index for list 0.

vii. Reference Index for list 1 of the set of parameters is equal to the AMVP signaled reference index for list 1.

viii. Reference Index for list 0 of the temporal neighbouring block is equal to the AMVP signaled reference index for list 0.

ix. Reference Index for list 1 of the temporal neighbouring block is equal to the AMVP signaled reference index for list 1.

x. The POC of the reference picture for list 0 of the set of parameters is the same to the POC of one of the reference pictures of the temporal neighbouring block.

xi. The POC of the reference picture for list 1 of the set of parameters is the same to the POC of one of the reference pictures of the temporal neighbouring block.

xii. The POC of the AMVP signaled reference picture for list 0 is the same to the POC of one of the reference pictures of the temporal neighbouring block.

xiii. The POC of the AMVP signaled reference picture for list 0 is the same to the POC of one of the reference pictures of the set of parameters.

c. In one example, if a neighbouring block has been used to derive an inherited affine AMVP candidate, then it is skipped in the second loop, not to be used to derive an affine AMVP candidate with stored affine parameters.

d. In one example, if a neighbouring block has been used to derive an affine AMVP candidate with a set of stored affine parameters, then it is skipped in the second loop, not to be used to derive an affine AMVP candidate with another set of stored affine parameters.

e. In one example, if a neighbouring block is used to derive an affine AMVP candidate, then all other neighbouring blocks after that neighbouring block are skipped and the second loop is broken and go back to the first loop. The next set of parameters is visited in the first loop.

26. It is proposed to use affine merge candidates derived from the affine HMVP buffer are put into the affine merge list/sub-block merge list and inherited affine merge candidates may be removed from the list.

a. In one example, the affine merge candidates derived from the affine HMVP buffer are put into the affine merge list/sub-block merge list and inherited affine merge candidates are excluded from the list.

b. In an alternative example, affine merge candidates derived from the affine HMVP buffer are put into the affine merge list/sub-block merge list and affine merge candidates inherited from a block in the current CTU row are removed from the list.

i. For example, affine merge candidates derived from the affine HMVP buffer are put into the affine merge list/sub-block merge list after affine merge candidates which are inherited from a block in a CTU row different to the current CTU row.

c. Alternatively, whether to add inherited affine merge candidates may depend on the affine HMVP buffer.

i. In one example, affine merge candidates derived from the affine HMVP buffer may be inserted to the candidate list before inherited affine merge candidates.

ii. In one example, when the affine HMVP buffer is empty, inherited affine merge candidates may be added; otherwise (if the affine HMVP buffer is not empty), inherited affine merge candidates may be excluded.

d. Alternatively, whether to apply proposed methods may depend on the block dimensions.

27. It is proposed to use affine AMVP candidates derived from the affine HMVP buffer are put into the affine AMVP list and inherited affine AMVP candidates may be removed from the list.

a. In one example, the affine AMVP candidates derived from the affine HMVP buffer are put into the affine AMVP list and inherited affine AMVP candidates are excluded from the list.

b. In an alternative example, affine AMVP candidates derived from stored in the affine HMVP buffer are put into the affine AMVP list and affine AMVP candidates inherited from a block in the current CTU row are removed from the list.

i. For example, affine AMVP candidates derived from the affine HMVP buffer are put into the affine AMVP list after affine AMVP candidates which are inherited from a block in a CTU row different to the current CTU row.

c. Alternatively, whether to add inherited affine AMVP candidates may depend on the affine HMVP buffer.

d. Alternatively, whether to apply proposed methods may depend on the block dimensions.

28. In one example, the size of affine merge candidate list is increased by N (e.g. N=1) if affine merge candidates derived from parameters stored in the buffer can be put into the list.

29. In one example, the size of affine AMVP candidate list is increased by N (e.g. N=1) if affine AMVP candidates derived from parameters stored in the buffer can be put into the list.

30. Virtual affine models may be derived from multiple existing affine models stored in the buffer. Suppose the buffer has included several affine models, the i-th candidate is denoted by Candi with parameters as (ai, bi, ci, di, ei, fi).

a. In one example, parameters of Candi and Candj may be combined to form a virtual affine model by taking some parameters from Candi and remaining parameters from Candj. One example of the virtual affine model is (ai, bi, cj, dj, ei, fi).

b. In one example, parameters of Candi and Candj may be jointly used to generate a virtual affine model with a function, such as averaging. One example of the virtual affine model is ((ai+aj)/2, (bi+bj)/2, (ci+cj)/2, (di+dj)/2, (ei+ej)/2, (fi+fj)/2).

c. Virtual affine models may be used in a similar way as the stored affine model, such as with bullets mentioned above.

31. It is proposed that the affine merge candidates inherited from spatial neighbouring blocks are not put into the sub-block based merge candidate list and the disclosed history-based affine merge candidates are put into the sub-block based merge candidate list.
   a. In one example, the disclosed history-based affine merge candidates are put into the sub-block based merge candidate list just after the ATMVP candidate.
   b. In one example, the disclosed history-based affine merge candidates are put into the sub-block based merge candidate list before the constructed affine merge candidates.
   c. It is proposed that whether the affine merge candidates inherited from a spatial neighbouring block is put into the sub-block based merge candidate list or not, may depend on the position of the spatial neighbouring block.
      i. In one example, the affine merge candidate inherited from a spatial neighbouring block is put into the sub-block based merge candidate list if the spatial neighbouring block is in the same CTU or CTU row as the current block; Otherwise, it is not put into.
      ii. Alternatively, the affine merge candidate inherited from a spatial neighbouring blocks is put into the sub-block based merge candidate list if the spatial neighbouring block is not in the same CTU or CTU row as the current block; Otherwise, it is not put into.
32. It is proposed that the affine AMVP candidates inherited from spatial neighbouring blocks are not put into the affine MVP candidate list and the disclosed history-based affine MVP candidates are put into affine MVP candidate list.
   a. In one example, the disclosed history-based affine MVP candidates are put first into the affine MVP candidate list.
   b. It is proposed that whether the affine AMVP candidate inherited from a spatial neighbouring block is put into the affine MVP candidate list or not, may depend on the position of the spatial neighbouring block.
      i. In one example, the affine AMVP candidate inherited from a spatial neighbouring block is put into the affine MVP candidate list if the spatial neighbouring block is in the same CTU or CTU row as the current block; Otherwise, it is not put into. Alternatively, the affine AMVP candidate inherited from a spatial neighbouring block is put into the affine MVP candidate list if the spatial neighbouring block is not in the same CTU or CTU row as the current block; Otherwise, it is not put into.
33. More than one affine HMVP buffers are used to store affine parameters or CPMVs in different categories.
   a. For example, two buffers are used to store affine parameters in reference list 0 and reference list 1, respectively.
      i. In one example, after decoding an affine coded CU, the CPMVs or parameters for reference list 0 are used to update the HMVP buffer for reference list 0.
      ii. In one example, after decoding an affine coded CU, the CPMVs or parameters for reference list 1 are used to update the HMVP buffer for reference list 1.

iii. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference list X is combined with the affine parameters stored in the buffer referring to reference list X. X=0 or 1.
      iv. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference list X is combined with the affine parameters stored in the buffer referring to reference list X. X=0 or 1.
   b. For example, N (e.g. N=6) buffers are used to store affine parameters referring to different reference indices in different reference lists. In the following discussion, "reference K" means the reference index of the reference picture is K.
      i. In one example, after decoding an affine coded CU, the CPMVs or parameters referring to reference K in list X are used to update the HMVP buffer for reference K in list X. X=0 or 1. K may be 0, 1, 2, etc.
      ii. In one example, after decoding an affine coded CU, the CPMVs or parameters referring to reference K, where K>=L, in list X are used to update the HMVP buffer for reference L in list X. X=0 or 1. M may be 1, 2, 3, etc.
      iii. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference K in list X is combined with the affine parameters stored in the buffer referring to reference K in list X. X=0 or 1. K may be 0, 1, 2, etc.
      iv. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference K in list X is combined with the affine parameters stored in the buffer referring to reference K in list X. X=0 or 1. K may be 0, 1, 2, etc.
      v. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference K, where K>=L, in list X is combined with the affine parameters stored in the buffer referring to reference L in list X. X=0 or 1. L may be 1, 2, 3, etc.
      vi. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference K, where K>=L, in list X is combined with the affine parameters stored in the buffer referring to reference L in list X. X=0 or 1. L may be 1, 2, 3 etc.

c. The size of each affine HMVP buffer for a category may be different.

i. In one example, the size may depend on the reference picture index. For example, the size of the affine HMVP buffer for reference 0 is 3, the size of the affine HMVP buffer for reference 1 is 2, and the size of the affine HMVP buffer for reference 2 is 1.

34. Whether to and/or how to update the affine HMVP buffers may depend on the coding mode and/or other coding information of the current CU.

a. For example, if a CU is coded with affine merge mode and the merge candidate is derived from the affine HMVP buffer, then the HMVP buffer is not updated after decoding this CU.

i. Alternatively, the affine HMVP buffer is updated by removing the associated affine parameters to the last entry of the affine HMVP buffer.

b. In one example, whenever one block is coded with affine mode, the affine HMVP buffer may be updated.

c. In one example, when one block is coded with affine merge mode and the block uses the shared merge list, updating of the affine HMVP buffer is skipped.

35. In one example, an affine HMVP buffer may be divided into M (M>1) sub-buffers: $HB^0$, $HB^1$, . . . $HB^{M-1}$.

a. Alternatively, multiple affine HMVP buffers (i.e., multiple affine HMVP tables) may be allocated, each of them may correspond to one sub-buffer $HB^i$ mentioned above.

b. In one example, operations on one sub-buffer (e.g., the sub-buffer updating process, usage of the sub-buffer) may not affect the other sub-buffers.

c. In one example, M is pre-defined, such as 10.

d. In one example, the first MO buffers are related to the storage of affine parameters for reference picture list X and the remaining (M-MO) buffers are related to the storage of affine parameters for reference picture list Y wherein Y=1−X and X being 0 or 1.

i. Alternatively, affine parameters for reference picture list X may be stored in interleaved way with those affine parameters for reference picture list Y.

ii. In one example, affine parameters for reference picture list X may be stored in $HB^i$ with i being an odd value and affine parameters for reference picture list X may be stored in $HB^j$ with j being an even value.

e. In one example, M may be signaled from the encoder to the decoder, such as at video level (e.g. VPS), sequence level (e.g. SPS), picture level (e.g. PPS or picture header), slice level (e.g. slice header), tile group level (e.g. tile group header).

f. In one example, M may depend on the number of reference pictures.

i. For example, M may depend on the number of reference pictures in reference list 0;

ii. For example, M may depend on the number of reference pictures in reference list 1;

g. In one example, each sub-buffer may have the same number of maximum allowed number of entries, denoted as N. For example, N=1 or N=2;

h. In one example, each sub-buffer may have a different number of maximum allowed number of entries. For example, sub-buffer $HB^K$ may have $N^K$ allowed number of entries at most. For different K, $N^K$ may be different.

i. When a set of affine parameters is used to update the HMVP buffer, one sub-buffer with a sub-buffer index SI may be selected, and then the set of affine parameters may be used to update the corresponding sub-buffer $HB^{SI}$.

i. In one example, the selection of sub-buffer may be based on the coded information of the block on which the set of affine parameters is applied.

(a) In one example, the coded information may include the reference list index (or prediction direction) and/or the reference index associated with the set of affine parameters.

(b) For example, suppose the reference list index and reference index of the set of affine parameters are denoted as X (e.g., X being 0 or 1) and RIDX, then the selected sub-buffer index SI may be calculated as SI=f(X, RIDX), where f is a function.

a. In one example, SI=X*MaxR0+min(RIDX, MaxRX−1), where MaxR0 and MaxR1 are integers, e.g. MaxR0=MaxR1=5.

b. Alternatively, SI=2*min(RIDX, MaxRX−1)+X.

c. In one example, X can only be 0 or 1 and RIDX must be greater than or equal to 0.

d. In one example, MaxR0 and MaxR1 may be different.

e. In one example, MaxR0/MaxR1 may depend on the temporal layer index, slice/tile group/picture type, low delay check flag, etc. al.

f. In one example, MaxR0 may depend on the total number of reference pictures in reference list 0.

g. In one example, MaxR1 may depend on the total number of reference pictures in reference list 1.

h. In one example, MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).

j. When a set of affine parameters is used to update a sub-buffer $HB^{SI}$, it may be regarded as updating a regular affine HMVP buffer, and the methods to update affine HMVP buffers disclosed in this document may be applied to update a sub-buffer.

k. A spatial or temporal adjacent or non-adjacent neighbouring block (it may also be referred as "a neighbouring block" for simplification) may be used combining with one or multiple sets of affine parameters stored in one or multiple HMVP affine sub-buffers.

36. In one example, the maximum allowed size for an affine HMVP buffer and/or an affine HMVP sub-buffer may be equal to 1.

a. In one example, there is no need to recorder a counter to record the number of sets of affine parameters stored in the affine HMVP buffer or the affine HMVP sub-buffer.

37. Whether to and/or how to conduct operations on the affine HMVP buffer or the affine HMVP sub-buffer may depend on whether all the affine parameters of a set are zero.

a. In one example, when the affine HMVP buffer or the affine HMVP sub-buffer is refreshed, all affine parameters stored in the buffer or sub-buffer are set to be zero.

i. The affine HMVP buffer or the affine HMVP sub-buffer may be refreshed before coding/decoding each picture and/or slice and/or tile group and/or CTU row and/or CTU and/or CU.

b. In one example, when a set of affine parameters is used to update the affine HMVP buffer or the affine HMVP sub-buffer, the buffer or sub-buffer is not updated if all the affine parameters in the set are equal to zero.

c. In one example, when parameters of a set of affine parameters stored in the affine HMVP buffer or the affine HMVP sub-buffer are all zero, the set of affine parameters cannot be used to generate an affine merge candidate or affine AMVP candidate.

i. For example, the set of affine parameters cannot be used to generate an affine merge candidate or affine AMVP candidate, combining with a neighbouring block.

ii. For example, when parameters of a set of affine parameters stored in an entry of an affine HMVP buffer or an affine HMVP sub-buffer are all zero, the entry is marked as "invalid" or "unavailable".

iii. For example, when parameters of sets of affine parameters stored in all entries of an affine HMVP buffer or an affine HMVP sub-buffer are all zero, the affine HMVP buffer or the affine HMVP sub-buffer is marked as "invalid" or "unavailable", and/or the counter of the buffer or sub-buffer is set to be zero.

38. When a spatial or temporal adjacent or non-adjacent neighbouring block (it may also be referred as "a neighbouring block" for simplification) is used to generate an affine merge candidate by combining affine parameters stored in the affine HMVP buffer, only affine parameters stored in one or several related sub-buffers may be accessed.

a. For example, the related sub-buffers can be determined by the coding information of the neighbouring block. For example, the coding information may include the reference lists and/or the reference indices of the neighbouring block.

b. For example, one or multiple sets of affine parameters stored in the related sub-buffers can be used to generate the affine merge candidate combining with a neighbouring block.

i. For example, the set of affine parameters stored as the first entry in a related sub-buffer can be used.

ii. For example, the set of affine parameters stored as the last entry in a related sub-buffer can be used.

c. For example, one related sub-buffer $HB^{S0}$ is determined for the MV of the neighbouring block referring to reference list 0.

d. For example, one related sub-buffer $HB^{S1}$ is determined for the MV of the neighbouring block referring to reference list 1.

i. $HB^{S0}$ and $HB^{S1}$ may be different.

e. For a MV of the neighbouring block referring to a reference picture with the reference index RIDX in reference list LX, the related sub-buffer index SI is calculated as $SI=g(LX, RIDX)$, where g is a function.

i. For example, function g is the same as function f in bullet 35.d.

ii. In one example, $SI=LX*MaxR0+min(RIDX, MaxRX-1)$, where MaxR0 and MaxR1 are integers, e.g. MaxR0=MaxR1=5.

(a) In one example, LX can only be 0 or 1 and RIDX must be greater than or equal to 0.

(b) MaxR0 and MaxR1 may be different.

(c) MaxR0 may depend on the total number of reference pictures in reference list 0.

(d) MaxR1 may depend on the total number of reference pictures in reference list 1.

(e) MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).

f. In one example, when the neighbouring block is inter-coded with uni-prediction referring to a reference picture with the reference index RIDX in reference list LX, then an affine merge candidate can be generated from this neighbouring block combining with a set of affine parameters stored in the related affine HMVP sub-buffer, if there is at least one entry available in the sub-buffer, and/or the counter of the sub-buffer is not equal to 0.

i. The generated affine merge candidate should also be uni-predicted, referring to a reference picture with the reference index RIDX in reference list LX.

g. In one example, when the neighbouring block is inter-coded with bi-prediction referring to a reference picture with the reference index RIDX0 in reference list 0 and reference index RIDX1 in reference list 1, then an affine merge candidate can be generated from this neighbouring block combining with one or multiple sets of affine parameters stored in the one or multiple related affine HMVP sub-buffers.

i. In one example, the generated affine merge candidate should also be bi-predicted, referring to a reference picture with the reference index RID0 in reference list 0 and reference index RID1 in reference list 1.

(a) The bi-predicted affine merge candidate can only be generated when there is at least one entry available in the sub-buffer related to reference index RID0 in reference list 0 (and/or the counter of the sub-buffer is not equal to 0), and there is at least one entry available in the sub-buffer related to reference index RID1 in reference list 1 (and/or the counter of the sub-buffer is not equal to 0).

(b) In one example, no affine merge candidate can be generated from neighbouring block combining with affine parameters stored in affine HMVP buffers and/or sub-buffers, if the condition below cannot be satisfied.

a. There is at least one entry available in the sub-buffer related to reference index RID0 in reference list 0 (and/or the counter of the sub-buffer is not equal to 0), and there is at least one entry available in the sub-buffer related to reference index RID1 in reference list 1 (and/or the counter of the sub-buffer is not equal to 0).

ii. In an alternative example, the generated affine merge candidate can also be uni-predicted, referring to a reference picture with the reference index RID0 in reference list 0, or reference index RID1 in reference list 1.

(a) The generated affine merge candidate is uni-predicted referring to a reference picture with the reference index RID0 in reference list 0, if there is at least one entry available in the sub-buffer related to reference index RID0 in reference list 0 (and/or the counter of the sub-buffer is not equal to 0), and there is no entry available in the sub-buffer related to reference index RID1 in reference list 1 (and/or the counter of the sub-buffer is equal to 0).

(b) The generated affine merge candidate is uni-predicted referring to a reference picture with the reference index RID1 in reference list 1, if there is at least one entry available in the sub-buffer related to reference index RID1 in reference list 1 (and/or the counter of the sub-buffer is not equal to 0), and there is no entry available in the sub-buffer related to reference index RID0 in reference list 0 (and/or the counter of the sub-buffer is equal to 0).

h. In one example, all methods disclosed in this document can be used to generate an affine merge candidate by combining affine parameters stored in one or several related sub-buffers.

39. When a spatial or temporal adjacent or non-adjacent neighbouring block (it may also be referred as "a neighbouring block" for simplification) is used to generate an affine AMVP candidate by combining affine parameters stored in the affine HMVP buffer, only affine parameters stored in one or several related sub-buffers may be accessed.

a. For example, the related sub-buffers can be determined by the coding information of the neighbouring block. For example, the coding information may include the reference lists and/or the reference indices of the neighbouring block.

b. For example, one or multiple sets of affine parameters stored in the related sub-buffers can be used to generate the affine AMVP candidate combining with a neighbouring block.

i. For example, the set of affine parameters stored as the first entry in a related sub-buffer can be used.

ii. For example, the set of affine parameters stored as the last entry in a related sub-buffer can be used.

c. For a target reference picture with the target reference index RIDX in target reference list LX, the related sub-buffer index SI is calculated as SI=h(LX, RIDX), where g is a function.

i. For example, function g is the same as function f in bullet 35.d.

ii. For example, function g is the same as function g in bullet 38.

iii. In one example, SI=LX*MaxR0+min(RIDX, MaxRX−1), where MaxR0 and MaxR1 are integers, e.g. MaxR0=MaxR1=5.

(a) In one example, LX can only be 0 or 1 and RIDX must be greater than or equal to 0.

(b) MaxR0 and MaxR1 may be different.

(c) MaxR0 may depend on the total number of reference pictures in reference list 0.

(d) MaxR1 may depend on the total number of reference pictures in reference list 1.

(e) MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).

d. In one example, no affine AMVP candidate can be generated from affine parameters stored in affine HMVP buffer/sub-buffers if there is no entry available in the sub-buffer related to target reference index RIDX in the target reference list LX (and/or the counter of the sub-buffer is equal to 0).

e. In one example, when the neighbouring block is inter-coded and have a MV referring to the target reference index RIDX in target reference list LX, then the MV is used to generate the affine AMVP candidate combining with the affine parameters stored in the related sub-buffer.

f. In one example, when the neighbouring block is inter-coded and does not have a MV referring to the target reference index RIDX in target reference list LX, then no affine AMVP candidate can be generated from the neighbouring block.

i. Alternatively, when the neighbouring block is inter-coded and does not have a MV referring to the target reference index RIDX in target reference list LX, the neighbouring block will be checked to determine whether it has a second MV referring to a second reference picture in reference list 1-LX, and the second reference has the same POC as the target reference picture.

(a) If it has a second MV referring to a second reference picture in reference list 1-LX, and the second reference has the same POC as the target reference picture, the second MV is used to generate the affine AMVP candidate combining with the affine parameters stored in the related sub-buffer. Otherwise, no affine AMVP candidate can be generated from the neighbouring block.

g. In one example, all methods disclosed in this document can be applied to generate an affine merge/AMVP candidate by combining affine parameters stored in one or several related sub-buffers.

40. A neighbouring block cannot be used combining with affine parameters stored in affine HMVP buffers or affine HMVP sub-buffers to generate an affine merge/AMVP candidate, if it is coded with the Intra Block Copy (IBC) mode.

41. A spatial neighbouring block cannot be used combining with affine parameters stored in affine HMVP buffer/sub-buffer to generate affine merge/AMVP candidate, if it is used to generate an inheritance merge/AMVP candidate.

42. The spatial and/or temporal neighbouring/non-adjacent blocks may be divided into K groups (e.g., K=2) and how to combine parameters in affine HMVP buffer/sub-buffer with the motion information of spatial and/or temporal neighbouring/non-adjacent blocks for coding the current block may be based on the group.

a. The affine merge candidates generated from affine parameters stored in the affine HMVP buffer/sub-buffer combining with spatial neighbouring blocks in different groups may be put at different positions into the affine merge candidate list;

b. The affine AMVP candidates generated from affine parameters stored in the affine HMVP buffer/sub-buffer combining with spatial neighbouring blocks in different groups may be put at different positions into the affine AMVP candidate list;

c. In one example, spatial neighbouring blocks may be divided into groups based on their coded information.

i. For example, a neighbouring block may be put into a certain group based on whether it is affine-coded.

ii. For example, a neighbouring block may be put into a certain group based on whether it is affine-coded and with AMVP mode.

iii. For example, a neighbouring block may be put into a certain group based on whether it is affine-coded and with merge mode.

d. In one example, spatial neighbouring blocks may be divided into groups based on their positions.

e. In one example, not all the neighbouring blocks are put into the K groups.

f. In one example, the spatial neighbouring blocks are divided into two groups as below:

i. The first encountered affine-coded left neighbouring block may be put into group X.

(a) Left neighbouring blocks are checked in order, e.g. block A0, block A1 as shown in FIG. 8.

(b) In one example, the first encountered affine-coded left neighbouring block is not put into group X if it is used to generate an inheritance merge/AMVP candidate.

ii. The first encountered affine-coded above neighbouring block is put into group X.

(a) Above neighbouring blocks are checked in order. E.g. block B0, block B1, and block B2 as shown in FIG. 8.

(b) In one example, the first encountered inter-coded and affine-coded above neighbouring block is not put into group X if it is used to generate an inheritance merge/AMVP candidate.

iii. Other inter-coded neighbouring blocks may be put into group Y wherein Y is unequal to X.

g. In one example, the affine merge candidates generated from affine parameters stored in the affine HMVP buffer/sub-buffer combining with spatial neighbouring blocks in group X may be put into the affine merge candidate list before the K-th constructed affine merge candidate. E.g. K may be 1 or 2.

h. In one example, the affine merge candidates generated from affine parameters stored in the affine HMVP buffer/sub-buffer combining with spatial neighbouring blocks in group Y may be put into the affine merge candidate list after the K-th constructed affine merge candidate. E.g. K may be 1 or 2.

i. In one example, the affine AMVP candidates generated from affine parameters stored in the affine HMVP buffer/sub-buffer combining with spatial neighbouring blocks in group X may be put into the affine AMVP candidate list before the K-th constructed affine merge candidate. E.g. K may be 1 or 2.

j. In one example, the affine AMVP candidates generated from affine parameters stored in the affine HMVP buffer/sub-buffer combining with spatial neighbouring blocks in group Y may be put into the affine AMVP candidate list after the K-th constructed affine merge candidate. E.g. K may be 1 or 2.

k. In one example, the affine AMVP candidates generated from affine parameters stored in the affine HMVP buffer/sub-buffer combining with spatial neighbouring blocks in group X may be put into the affine AMVP candidate list before the zero candidates.

Figure 21:
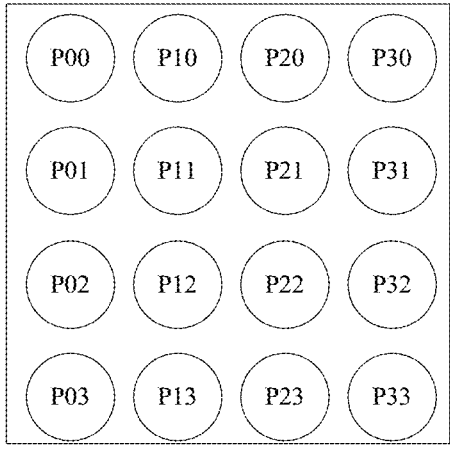
FIG. 21 illustrates positions in a 4×4 basic block.

43. The base position $(xm, ym)$ in bullet 20 may be any position inside the basic neighbouring block (e.g. 4×4 basic block) as shown in FIG. 21 which shows positions in a 4×4 basic block.

a. For example, $(xm, ym)$ may be P22 in FIG. 21.

b. Suppose the coordinate of top-left sample of the current block is $(xPos00, yPos00)$, the coordinate of top-right sample of the current block is $(xPos10, yPos00)$, the coordinate of top-right sample of the current block is $(xPos00, yPos01)$, then in FIG. 8:

i. $(xm, ym)$ for adjacent neighbouring basic block A1 is $(xPos00-2, yPos01-1)$;

ii. $(xm, ym)$ for adjacent neighbouring basic block A0 is $(xPos00-2, yPos01+3)$;

iii. $(xm, ym)$ for adjacent neighbouring basic block B1 is $(xPos10-1, yPos00-2)$;

iv. $(xm, ym)$ for adjacent neighbouring basic block B0 is $(xPos10+3, yPos00-2)$;

v. $(xm, ym)$ for adjacent neighbouring basic block B2 is $(xPos00-2, yPos00-2)$;

2.14 Non-Affine Motion Derivation Based on Affine Motion

1. It is proposed to update the motion information of affine coded blocks after motion compensation, and the updated motion information is stored and used for motion prediction for subsequent coded/decoded blocks.

a. In one example, the updated motion information is used for motion prediction for subsequent coded/decoded blocks in different pictures.

b. In one example, the filtering process (e.g., deblocking filter) is dependent on the updated motion information.

c. The updating process may be invoked under further conditions, e.g., only for the right and/or bottom affine sub-blocks of one CTU. In this case, the filtering process may depend on the un-updated motion information and the update motion information may be used for subsequent coded/decoded blocks in current slice/tile or other pictures.

2. In one example, the MV stored in a sub-block located at the right boundary and/or the bottom boundary may be different to the MV used in MC for the sub-block. FIG. 22 shows an example, where sub-blocks located at the right boundary and the bottom boundary are shaded.

a. In one example, the stored MV in a sub-block located at the right boundary and/or the bottom boundary can be used as MV prediction or candidate for the subsequent coded/decoded blocks in current or different frames.

b. In one example, the stored MV in a sub-block located at the right boundary and/or the bottom boundary may be derived with the affine model with a representative point outside the sub-block.

c. In one example, two sets of MV are stored for the right boundary and/or bottom boundary, one set of MV is used for deblocking, temporal motion prediction and the other set is used for motion prediction of following PU/CUs in the current picture.

Figure 23A:
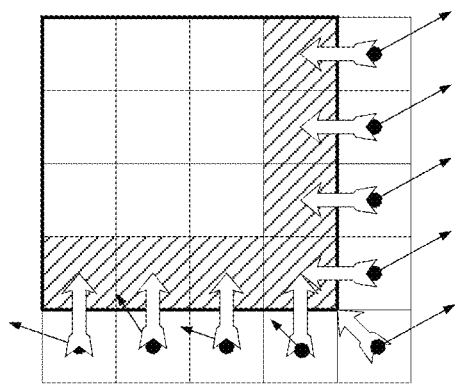
FIGS. 23*a*-23*d* illustrate possible positions to derive the MV stored in sub-blocks at right boundary and bottom boundary.
Figure 23B:
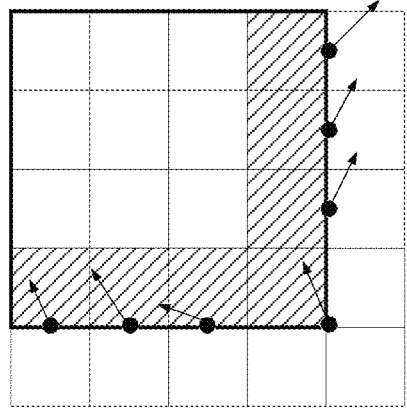
Figure 23C:
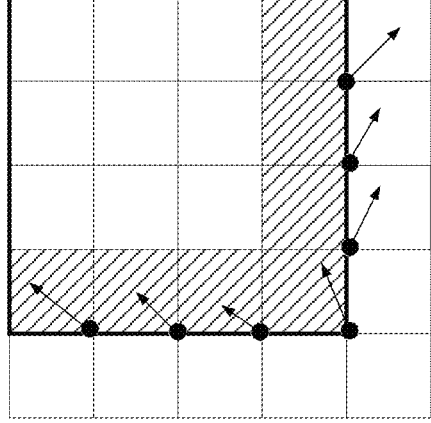
Figure 23D:
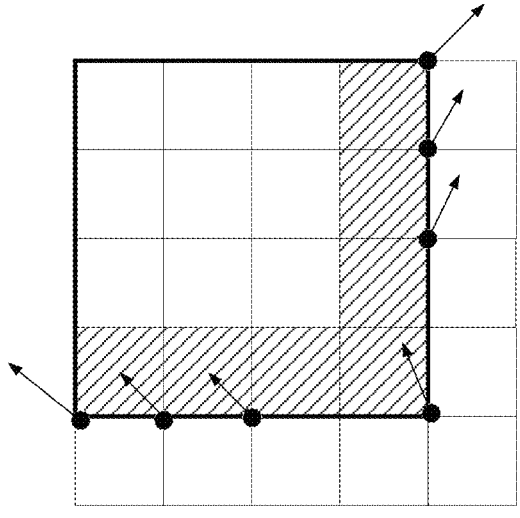

3. Suppose the coordinate of the top-left corner of the current block is (x0, y0), the coordinate of the top-left corner of a sub-block is (x', y'), the size of a sub-block is M×N, and the MV stored in a sub-block is denoted as (MVx, MVy). (MVx, MVy) is calculated with Eq (1) with the 4-parameter affine model or Eq (2) with the 6-parameter affine model with the representative point (x, y) set to (xp−x0, yp−y0) and (xp, yp) may be defined as follows:

a. xp=x'+M+M/2, yp=y'+N/2 if the sub-block is at the right boundary; such an example is depicted in FIG. 23(a).

b. xp=x'+M/2, yp=y'+N+N/2 if the sub-block is at the bottom boundary, such an example is depicted in FIG. 23(a);

c. For the bottom-right corner, the representative point (x, y) may be defined as:

i. In one example, xp=x'+M+M/2, yp=y'+N/2 if the sub-block is at the bottom-right corner;

ii. In one example, xp=x'+M/2, yp=y'+N+N/2 if the sub-block is at the bottom-right corner;

iii. In one example, xp=x'+M+M/2, yp=y'+N+N/2 if the sub-block is at the sub-right corner;

d. xp=x'+M, yp=y'+N/2 if the sub-block is at the right boundary; such an example is depicted in FIG. 23(b);

e. xp=x'+M/2, yp=y'+N if the sub-block is at the bottom boundary; such an example is depicted in FIG. 23(b);

f. xp=x'+M, yp=y'+N if the sub-block is at the bottom right corner. such an example is depicted in FIG. 23(b);

g. xp=x'+M, yp=y'+N if the sub-block is at the right boundary or the bottom boundary. such an example is depicted in FIG. 23(c);

h. xp=x', yp=y'+N if the sub-block is at the bottom boundary. such an example is depicted in FIG. 23(d);

i. xp=x'+M, yp=y' if the sub-block is at the right boundary; such an example is depicted in FIG. 23(d);

j. xp=x'+M, yp=y'+N if the sub-block is at the bottom right corner. such an example is depicted in FIG. 23(d).

4. In one example, some sub-blocks at the bottom boundary or right boundary are exceptional when deriving its stored MV.

a. For the top-right corner (block RT as shown in FIG. 6), it always stores the MV at the top-right corner (mv1 as shown in FIG. 6).

b. For the bottom-left corner (block LB as shown in FIG. 6), it always stores the MV at the bottom-left corner (mv2 as shown in FIG. 6).

i. Alternatively, for the bottom-left corner, it stores the MV only when mv2 is a signaled MV.

c. For the bottom-right corner (block RB as shown in FIG. 6), it always stores the MV at the bottom-right corner (mv3 as shown in FIG. 6).

Figure 24:
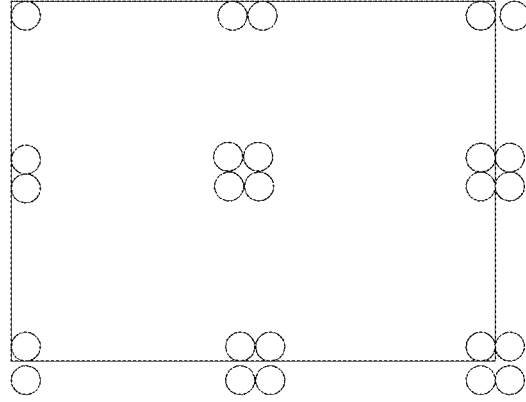
FIG. 24 illustrates possible positions to derive the MV prediction.

5. In one example, a MV prediction (may include one MV or two MVs for both inter-prediction directions) can be derived for the current non-affine coded block from a neighbouring affine coded block based on the affine model.

a. For example, the MV prediction can be used as a MVP candidate in the MVP candidate list when the current block is coded with inter-mode.

b. For example, the MV prediction can be used as a merge candidate in the MVP candidate list when the current block is coded with merge mode.

c. Suppose the coordinate of the top-left corner of the neighbouring affine-coded block is (x0, y0), the CP MVs of the neighbouring affine coded block are $mv_0=(mv_0^h,mv_0^v)$ for the top-left corner, mv, = $(mv_1^h,mv_1^v)$ for the top-right corner and $mv_2=(mv_2^h, mv_2^v)$ for the bottom-right corner. The width and height of the neighbouring affine coded block are w and h. The coordinate of the top-left corner of the current block is (x',y') and the coordinate of an arbitrary point in the current block is (x", y"). The width and height of the current block is M and N.

i. In one example, the MV prediction is calculated as $(mv^h(x, y)$ $mv^v(x, y))$ from Eq (1) with x=x"−x0, y=y"−y0 if the neighbouring affine coded block utilizes the 4-parameter affine model;

ii. In one example, the MV prediction is calculated as $(mv^h(x, y)$ $mv^v(x, y))$ from Eq (2) with x=x"−x0, y=y"−y0 if the neighbouring affine coded block utilizes the 6-parameter affine model;

iii. Some possible position of (x", y") are: (shown in FIG. 24)

$$(x', y') \tag{a}$$

$$(x' + M/2, y') \tag{b}$$

$$(x' + M/2 + 1, y') \tag{c}$$

$$(x' + M - 1, y') \tag{d}$$

$$(x' + M, y') \tag{e}$$

$$(x', y' + N/2) \tag{f}$$

$$(x' + M/2, y' + N/2) \tag{g}$$

$$(x' + M/2 + 1, y' + N/2) \tag{h}$$

$$(x' + M - 1, y' + N/2) \tag{i}$$

$$(x' + M, y' + N/2) \tag{j}$$

$$(x', y' + N/2 + 1) \tag{k}$$

$$(x' + M/2, y' + N/2 + 1) \tag{l}$$

$$(x' + M/2 + 1, y' + N/2 + 1) \tag{m}$$

$$(x' + M - 1, y' + N/2 + 1) \tag{n}$$

$$(x' + M, y' + N/2 + 1) \tag{o}$$

$$(x', y' + N - 1) \tag{p}$$

$$(x' + M/2, y' + N - 1) \tag{q}$$

$$(x' + M/2 + 1, y' + N - 1) \tag{r}$$

$$(x' + M - 1, y' + N - 1) \tag{s}$$

$$(x' + M, y' + N - 1) \tag{t}$$

$$(x', y + N) \tag{u}$$

$$(x' + M/2, y' + N) \tag{v}$$

$$(x' + M/2 + 1, y' + N) \tag{w}$$

$$(x' + M - 1, y' + N) \tag{x}$$

$$(x' + M, y' + N) \tag{y}$$

6. If a neighbouring basic-unit block S (e.g., it is a 4×4 block in VVC) belongs to an affine coded block T (For example, the basic-unit block A0 in FIG. 7(b) belongs to an affine coded block), the following ways may be applied to get motion prediction candidates:

a. In one example, when basic-unit block S is accessed by the MVP list construction procedure and/or the merge candidate list construction procedure, the MV stored in S is not fetched. Instead, the derived MV prediction from the affine coded block T for the current block is fetched.

b. In one example, the basic-unit block S is accessed twice by the MVP list construction procedure and/or the merge candidate list construction procedure. In one access, the MV stored in S is fetched. In another access, the derived MV prediction from the affine coded block T for the current block is fetched as an extra MVP candidate or merge candidate.

7. If a neighbouring basic-unit block S (e.g., it is a 4×4 block in VVC) belongs to an affine coded block T, the extra MVP candidate or merge candidate which is derived from the affine coded block T for the current block can be added to the MVP candidate list or merge candidate list at the position:

a. In one example, after the candidate fetched from block S;

b. In one example, before the candidate fetched from block S;

c. In one example, after all normal spatial candidates but before the temporal candidates;

d. In one example, after the temporal candidates;

e. In one example, the position could be adaptively changed from block to block.

8. In one example, the total number of extra candidates derived from the affine coded block cannot exceed a fixed number such as 1 or 2.

a. Alternatively, the fixed number may be further dependent on coded information, e.g., size of candidate list, total number of available motion candidates before adding these extra candidates, block size, block type, coded mode (AMVP or merge), slice type, etc. al.

9. In one example, the extra candidates derived from the affine coded block may be pruned with other candidates. A derived candidate is not added into the list if it is identical to another candidate already in the list.

a. In one example, if a neighbouring basic-unit block S (it is a 4×4 block in VVC) belongs to an affine coded block T, the extra candidate derived from the affine coded block T is compared with the MV fetched from S.

b. In one example, derived candidates are compared with other derived candidates.

10. In one example, whether to and how to apply the MV prediction derived for the current non-affine coded block from a neighbouring affine coded block may depend on the dimensions of the current block (Suppose the current block size is W×H).

a. For example, it is not applied if W>=T and H>=T, where T is an integer such as 8;

b. For example, it is not applied if W>=T or H>=T, where T is an integer such as 8;

c. For example, it is not applied if W<=T and H<=T, where T is an integer such as 8;

d. For example, it is not applied if W<=T or H<=T, where T is an integer such as 8;

General Applications Related to Affine Motion

11. Selection of the presentative point may be shifted instead of always being equal to (M/2, N/2) relative to top-left sample of one sub-block with size equal to M×N.

a. In one example, the presentative point may be set to ((M>>1)−0.5, (N>>1)−0.5).

b. In one example, the presentative point may be set to ((M>>1)−0.5, (N>>1)).

c. In one example, the presentative point may be set to ((M>>1), (N>>1)−0.5).

d. In one example, the presentative point may be set to ((M>>1)+0.5, (N>>1)).

e. In one example, the presentative point may be set to ((M>>1), (N>>1)+0.5).

f. In one example, the presentative point may be set to ((M>>1)+0.5, (N>>1)+0.5).

g. In one example, when the coordinate of the left-top corner of a sub-block relative to the top-left sample of the current block is (xs, ys), the coordinate of the representative point is defined to be (xs+1.5, ys+1.5).

i. In one embodiment, Eq (6) is rewritten to derive the MVs for the new representative point as:

$$\begin{cases} mv^h(x, y) = \text{Normalize}(iDMvHorX \square (2xs + 3) + iDMvVerX \square (2ys + 3) + \\ \qquad\qquad (mv_0^h \ll (S + 1)), S + 1) \\ mv^v(x, y) = \text{Normalize}(iDMvHorY \square (2xs + 3) + iDMvVerY \square (2ys + 3) + \\ \qquad\qquad (mv_0^v \ll (S + 1)), S + 1) \end{cases}$$

ii. Similarly, an additional offset (0.5, 0.5) or (−0.5, −0.5) or (0, 0.5), or (0.5, 0), or (−0.5, 0), or (0, −0.5) may be added to those representative points.

12. It is proposed to align the stored motion information with that used in motion compensation.

a. In one example, the currently stored mvi in FIG. 3 is replaced by mvi' wherein i being (0, and/or 1, and/or 2, and/or 3).

13. It is proposed that a motion candidate (e.g., a MVP candidate for AMVP mode, or a merge candidate) fetched from an affine coded block should be used in a different way from that fetched from a non-affine coded block.

a. For example, a motion candidate fetched from affine coded block may not be put into the motion candidate list or the merge candidate list;

b. For example, a motion candidate fetched from affine coded block may be put into the motion candidate list or the merge candidate list with a lower priority, e.g. it should be put at a more posterior position.

c. The order of merging candidates may be adaptively changed based on whether the motion candidate is fetched from an affine coded block.

14. The affine MVP candidate list size or affine merge candidate list size for an affine coded block may be adaptive.

a. In one example, the affine MVP candidate list size or affine merge candidate list size for an affine coded block may be adaptive based on the size of the current block.

i. For example, the affine MVP candidate list size or affine merge candidate list size for an affine coded block may be larger if the block is larger.

b. In one example, the affine MVP candidate list size or affine merge candidate list size for an affine coded block may be adaptive based on the coding modes of the spatial or temporal neighbouring blocks.

For example, the affine MVP candidate list size or affine merge candidate list size for an affine coded block may be larger if there are more spatial neighbouring blocks are affine-coded.

3. Problems

How to use the stored affine parameters to derive affine/non-affine merge/AMVP candidates is still not clear in details.

4. Embodiments of the Present Disclosure

In this document, it proposes methods to control the bandwidth required by affine prediction in a more flexible way. It also proposes to harmonize affine prediction with other coding tools.

The detailed embodiments s below should be considered as examples to explain general concepts. These embodiments should not be interpreted in a narrow way. Furthermore, these embodiments can be combined in any manner. Combination between the present disclosure and other disclosure is also applicable.

In the discussions below, suppose the coordinate of the top-left corner/top-right corner/bottom-left corner/bottom-right corner of a neighboring block (e.g., above or left neighbouring CU) of current block are (LTNx,LTNy)/(RTNx, RTNy)/(LBNx, LBNy)/(RBNx, RBNy), respectively; the coordinate of the top-left corner/top-right corner/bottom-left corner/bottom-right corner of the currernt CU are (LTCx,LTCy)/(RTCx, RTCy)/(LBCx, LBCy)/(RBCx, RBCy), respectively; the width and height of the affine coded above or left neighbouring CU are w' and h', respectively; the width and height of the affine coded current CU are w and h, respectively.

The CPMVs of the top-left corner, the top-right corner and the bottom-left corner are denoted as MV0=(MV0x, MV0y), MV1=(MV1x, MV1y) and MV2=(MV2x, MV2y), respectively.

In the following discussion, SignShift(x,n) may be defined as $$SignShift(x, n) = \begin{cases} (x + offsset0) \gg n & \text{if } x \geq 0 \\ -((-x + offset1) \gg n) & \text{if } x < 0 \end{cases}.$$

In one example, offset0 and offset1 are set to be (1<<(n−1)). In another example, they are set to be 0.

Shift may be defined as $$Shift(x,n)=(x+offsset)\gg n,$$

In one example, offset is set to be (1<<(n−1)). In another example, it is set to be 0.

Clip3(min, max, x) may be defined as $$Clip3(Min, Max, x) = \begin{cases} Min & \text{if } x < Min \\ Max & \text{if } x > Max \\ x & \text{Otherwise} \end{cases}.$$

It also should be noted that, the term "affine merge candidate list" may be renamed (e.g. "sub-block merge candidate list") when other kinds of sub-block merge candidate such as ATMVP candidate is also put into the list or other kinds of merge list which may include at least one affine merge candidate.

The proposed methods may be also applicable to other kinds of motion candidate list, such as affine AMVP candidate list.

A MV predictor derived with affine models from a neighbouring block as described in section 2.14 may be named as a neighbor-affine-derived (NAD) candidate.

1. In one example, a MV predictor (may include one MV or two MVs for both inter-prediction directions) can be derived for the current non-affine coded block from a history-based affine parameter table/list or other methods which store affine parameters from previously coded blocks. Such a MV predictor may be named as a history-affine-derived (HAD) candidate.

a. For example, the MV predictor can be used as a MVP candidate in the MVP candidate list when the current block is coded with translational inter-mode.

i. Alternatively, furthermore, the MV predictor may be also applicable to certain inter modes, but not for others, e.g., it could be applied to inter mode without hypothesis prediction.

ii. Alternatively, furthermore, the MV predictor may be used to derive an AMVP based additional hypothesis for multiple hypothesis prediction mode.

b. For example, the MV predictor can be used as a merge candidate in the MVP candidate list when the current block is coded with merge mode.

i. Alternatively, furthermore, the MV predictor may be also applicable to certain merge modes, but not for others, e.g., it could be applied to regular merge mode, but not to MMVD/CIIP.

ii. Alternatively, furthermore, a piece of motion information of the MV predictor (such as L0-MV or L1-MV, but not both) may be applicable to a certain merge mode, e.g., it could be applied to GPM mode and its variance.

iii. Alternatively, furthermore, the MV predictor may be used to derive a MERGE based additional hypothesis for multiple hypothesis prediction mode.

c. An inter-coded neighbouring block which may be a unit block can be used to derive the MV predictor.

i. Suppose the coordinate of a position (e.g. the top-left corner or the center) of the neighbouring block is (x0, y0). The coordinate of the top-left corner of the current block is (x',y') and the coordinate of an arbitrary point in the current block is (x", y"). The width and height of the current block is M and N.

(a) In one example, the MV predictor is calculated as $(mv^h(x\ y), mv^v(x,\ y))$ from Eq (1) with x=x"−x0, y=y"−y0 with a 4-parameter affine model retrieved from the history-based affine table;

(b) In one example, the MV predictor is calculated as $(mv^h(x\ y), mv^v(x,\ y))$ from Eq (2) with x=x"−x0, y=y"−y0 if with a 6-parameter affine model retrieved from the history-based affine table;

ii. Some possible position of (x", y") are: (shown in FIG. 24)

$$(x', y'), \qquad (a)$$

$$(x' + M/2, y'), \qquad (b)$$

$$(x' + M/2 + 1, y'), \qquad (c)$$

$$(x' + M - 1, y'), \qquad (d)$$

$$(x' + M, y'), \qquad (e)$$

$$(x', y' + N/2), \qquad (f)$$

-continued $$(x' + M/2, y' + N/2), \qquad \text{(g)}$$

$$(x' + M/2 + 1, y' + N/2), \qquad \text{(h)}$$

$$(x' + M - 1, y' + N/2), \qquad \text{(i)}$$

$$(x' + M, y' + N/2), \qquad \text{(j)}$$

$$(x', y' + N/2 + 1), \qquad \text{(k)}$$

$$(x' + M/2, y' + N/2 + 1), \qquad \text{(l)}$$

$$(x' + M/2 + 1, y' + N/2 + 1), \qquad \text{(m)}$$

$$(x' + M - 1, y' + N/2 + 1), \qquad \text{(n)}$$

$$(x' + M, y' + N/2 + 1), \qquad \text{(o)}$$

$$(x', y' + N - 1), \qquad \text{(p)}$$

$$(x' + M/2, y' + N - 1), \qquad \text{(q)}$$

$$(x' + M/2 + 1, y' + N - 1), \qquad \text{(r)}$$

$$(x' + M - 1, y' + N - 1), \qquad \text{(s)}$$

$$(x' + M, y' + N - 1), \qquad \text{(t)}$$

$$(x', y + N), \qquad \text{(u)}$$

$$(x' + M/2, y' + N), \qquad \text{(v)}$$

$$(x' + M/2 + 1, y' + N), \qquad \text{(w)}$$

$$(x' + M - 1, y' + N), \qquad \text{(x)}$$

$$(x' + M, y' + N), \qquad \text{(y)}$$

d. Whether to apply the MV predictor may be determined on-the-fly or dependent on the coded information, such as block dimension, coded methods, etc. al.

2. In one example, HAD or NAD merge candidate(s) may be put into the merge candidate list in one or multiple positions.

a. In one example, the merge candidate list may be a merge candidate list used for regular merge mode, and/or a variance of merge mode such as TM, CIIP, GEO, MMVD, etc.

b. In one example, the merge candidate list may be a merge based additional hypothesis motion candidate list for multiple hypothesis prediction.

c. In one example, the merge candidate list may be a constructed/virtual candidate list (such as AMVP-MERGE list, true bi-prediction merge list) which contains at least one merge candidate.

d. An HAD or NAD merge candidate may be in a pruning process with other merge candidates.

e. The total number of HAD or NAD merge candidate(s) must be no greater than N (e.g. N=O, N=1, . . . ). If N=0, HAD or NAD merge candidates cannot be used.

i. N may be signaled from encoder to decoder.

ii. N may be derived based on coding information such as dimensions W×H of the current block.

(a) E.g. N=0 if W>Tw||H>Th. E.g. Tw=Th=16.

(b) E.g. N=0 if W>Tw && H>Th. E.g. Tw=Th=16.

f. In one example, a first set of one or more HAD or NAD merge candidates may be put into the merge candidate list before the k-th (k=0, 1, 2 . . . or corresponding to the last one) spatial merge candidate.

g. In one example, a second set of one or more HAD or NAD merge candidates may be put into the merge candidate list after the k-th (k=0, 1, 2 . . . or corresponding to the last one) spatial merge candidate.

h. In one example, a third set of one or more HAD or NAD merge candidates may be put into the merge candidate list before the TMVP merge candidate.

i. In one example, a fourth set of one or more HAD or NAD merge candidates may be put into the merge candidate list after the TMVP merge candidate.

j. In one example, a fifth set of one or more HAD or NAD merge candidates may be put into the merge candidate list before the k-th (k=0, 1, 2 . . . or corresponding to the last one) non-adjacent merge candidate.

k. In one example, a sixth set of one or more HAD or NAD merge candidates may be put into the merge candidate list after the k-th (k=0, 1, 2 . . . or corresponding to the last one) non-adjacent merge candidate.

l. In one example, a seventh set of one or more HAD or NAD merge candidates may be put into the merge candidate list before the k-th (k=0, 1, 2 . . . or corresponding to the last one) HMVP merge candidate.

m. In one example, a third set of one or more HAD or NAD merge candidates may be put into the merge candidate list after k-th (k=0, 1, 2 . . . or corresponding to the last one) merge candidate.

n. In one example, a third set of one or more HAD or NAD merge candidates may be put into the merge candidate list before the k-th (k=0, 1, 2 . . . or corresponding to the last one) zero merge candidate.

o. In one example, a specific set of HAD or NAD candidates may only be derived using base MVs from an affine-coded neighbouring block.

p. In one example, a specific set of HAD or NAD candidates may only be derived using base MVs from a non-affine-coded inter-coded neighbouring block.

q. In one example, a specific set of HAD candidates may only be derived using the most recent affine models stored in a affine HMVP table or sub-table.

r. In one example, a specific set of HAD candidates may only be derived using the non-most recent affine models stored in an affine HMVP table or sub-table.

3. In one example, HAD AMVP candidate(s) may be put into the AMVP candidate list in one or multiple positions.

a. In one example, the AMVP candidate list may be a AMVP candidate list used for regular AMVP mode, and/or a variance of AMVP mode.

b. In one example, the AMVP candidate list may be a AMVP based additional hypothesis motion candidate list for multiple hypothesis prediction.

c. In one example, the AMVP candidate list may be a constructed/virtual candidate list (such as AMVP-MERGE list, true bi-prediction AMVP list) which contains at least one AMVP candidate.

d. An HAD or NAD AMVP candidate may be in a pruning process with other AMVP candidates.

e. The total number of HAD or NAD merge candidate(s) must be no greater than N (e.g. N=0, N=1, . . . ). If N=0, HAD or NAD merge candidates cannot be used.

i. N may be signaled from encoder to decoder.

ii. N may be derived based on coding information such as dimensions W×H of the current block.

(a) E.g. N=0 if W>Tw||H>Th. E.g. Tw=Th=16.

(b) E.g. N=0 if W>Tw && H>Th. E.g. Tw=Th=16.

f. In one example, a first set of one or more HAD or NAD AMVP candidates may be put into the AMVP candidate list before the k-th (k=0, 1, 2 . . . or corresponding to the last one) spatial AMVP candidate.

g. In one example, a second set of one or more HAD or NAD AMVP candidates may be put into the AMVP candidate list after the k-th (k=0, 1, 2 . . . or corresponding to the last one) spatial AMVP candidate.

h. In one example, a third set of one or more HAD or NAD AMVP candidates may be put into the AMVP candidate list before the TMVP AMVP candidate.

i. In one example, a fourth set of one or more HAD or NAD AMVP candidates may be put into the AMVP candidate list after the TMVP AMVP candidate.

j. In one example, a fifth set of one or more HAD or NAD AMVP candidates may be put into the AMVP candidate list before the k-th (k=0, 1, 2 . . . or corresponding to the last one) non-adjacent AMVP candidate.

k. In one example, a sixth set of one or more HAD or NAD AMVP candidates may be put into the AMVP candidate list after the k-th (k=0, 1, 2 . . . or corresponding to the last one) non-adjacent AMVP candidate.

l. In one example, a seventh set of one or more HAD or NAD AMVP candidates may be put into the AMVP candidate list before the k-th (k=0, 1, 2 . . . or corresponding to the last one) HMVP AMVP candidate.

m. In one example, a eighth set of one or more HAD or NAD AMVP candidates may be put into the AMVP candidate list after the k-th (k=0, 1, 2 . . . or corresponding to the last one) AMVP candidate.

n. In one example, a nineth set of one or more HAD or NAD AMVP candidates may be put into the AMVP candidate list before the k-th (k=0, 1, 2 . . . or corresponding to the last one) zero AMVP candidate.

o. In one example, a specific set of HAD or NAD candidates may only be derived using base MVs from an affine-coded neighbouring block.

p. In one example, a specific set of HAD or NAD candidates may only be derived using base MVs from a non-affine-coded inter-coded neighbouring block.

q. In one example, a specific set of HAD candidates may only be derived using the most recent affine models stored in a affine HMVP table or sub-table.

r. In one example, a specific set of HAD candidates may only be derived using the non-most recent affine models stored in an affine HMVP table or sub-table.

4. Whether to and/or how to use HAD or NAD candidates which may be inserted into a merge/AMVP list such as subblock-based merge list, regular merge list or may depend on coding information, which may comprise:

a. dimensions W×H of the current block.

i. E.g. NO HAD or NAD candidate is used if W>Tw|| H>Th. E.g. Tw=Th=16 or Tw=Th=8.

ii. E.g. NO HAD or NAD candidate is used if W>Tw && H>Th. E.g. Tw=Th=16 or Tw=Th=8.

b. Temporal layer TL of the current picture.

i. E.g. NO HAD or NAD candidate is used if TL>K. E.g. K=2.

ii. E.g. NO HAD or NAD candidate is used if TL<K. E.g. K=2.

c. Whether all the reference pictures are before the current picture in the displaying order.

i. E.g. NO HAD or NAD candidate is used if all the reference pictures are before the current picture in the displaying order.

d. Whether all the reference pictures are before the current picture in the displaying order.

i. E.g. NO HAD or NAD candidate is used if all the reference pictures are before the current picture in the displaying order.

e. A syntax element indicating whether MVD of reference list 1 is always 0, such as ph_mvd_l1_zero_flag.

i. E.g. NO HAD or NAD candidate is used if the syntax element is equal to a specific value such as 1.

f. The number of reference lists.

i. E.g. NO HAD or NAD candidate is used if the number of reference lists is equal to a specific value such as 1.

g. The number of reference lists.

i. E.g. NO HAD or NAD candidate is used if the number of reference lists is equal to a specific value such as 1.

h. The POC of at least one reference picture.

i. E.g. NO HAD or NAD candidate is used if the POC of reference picture 0 in reference list 0 is in a range of [POCcur−k1, POCcur+k2], wherein POCcur is the POC of the current picture. E.g. k1=k2=1.

5. Embodiments

A history-parameter table (HPT) is established. An entry of HPT stores a set of affine parameters: a, b, c and d, each of which is represented by a 16-bit signed integer. Entries in HPT is categoried by reference list and reference index. At most five reference indices are supported for each reference list is supported in HPT. In a formular way, the category of HPT (denoted as HPTCat) is calculated as HPTCat (RefList, RefIdx)=5×RefList+min(RefIdx, 4), wherein RefList and RefIdx represents a reference picture list (0 or 1) and the corresponding reference index, respectively. For each category, at most two entries can be stored. So there are twenty entries totally in HPT. At the beginning of each CTU row, the number of entries for each category is initialized as zero. After decoding an affine-coded CU with reference list $RefList_{cur}$ and $RefIdx_{cur}$, the affine parameters are utilized to update entries in the category HPTCat($RefList_{cur}$, $RefIdx_{cur}$).

Figure 27:
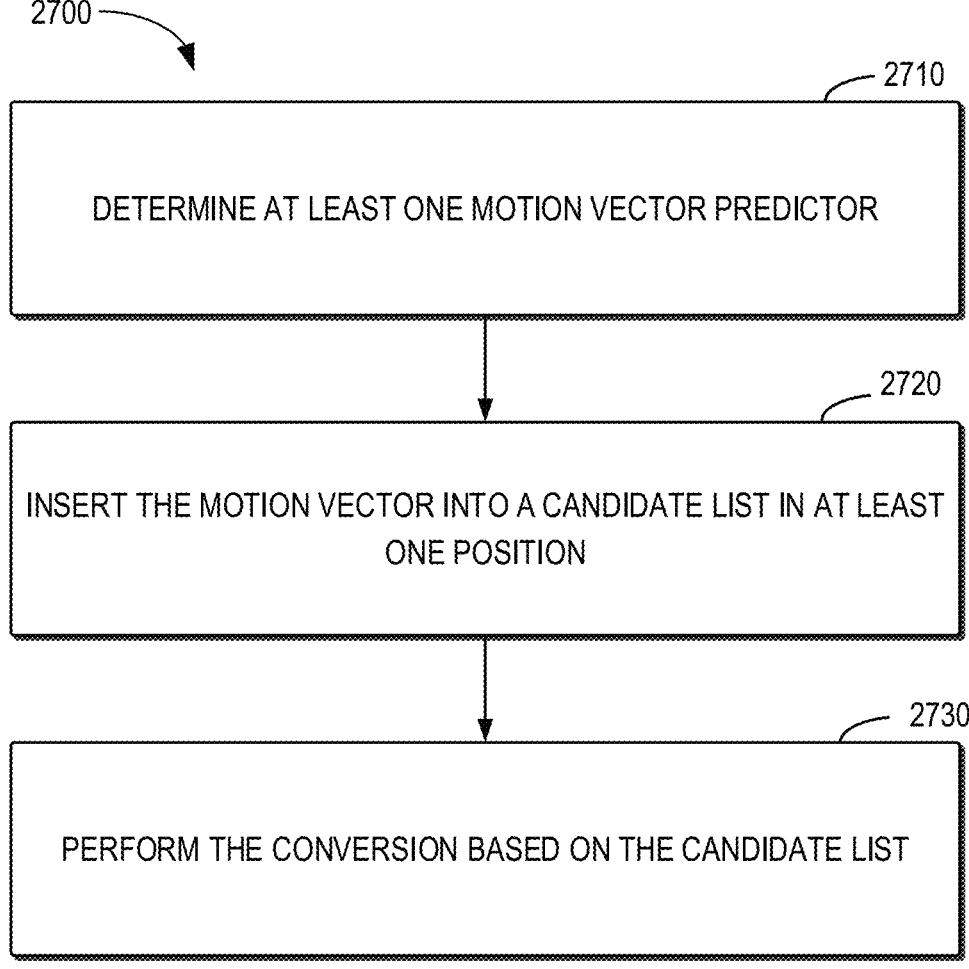
FIG. 27 illustrates a flow chart of a method according to example embodiments of the present disclosure.

A history-parameter-based affine candidate (HPAC) is derived from a neighbouring 4×4 block denoted as A0, A1, B0, B1 or B2 in FIG. 27 and a set of affine parameters stored in a corresponding entry in HPT. the MV of a neighbouring 4×4 block served as the base MV. In a formulating way, the MV of the current block at position (x, y) is calculated as:

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases},$$

where ($\text{mv}^h_{base}$, $\text{mv}^v_{base}$) represents the MV of the neighbouring 4×4 block, ($x_{base}$, $y_{base}$) represents the center position of the neighbouring 4×4 block. (x, y) can be the center of the current block to obtain a MV for the current block.

Figure 25:
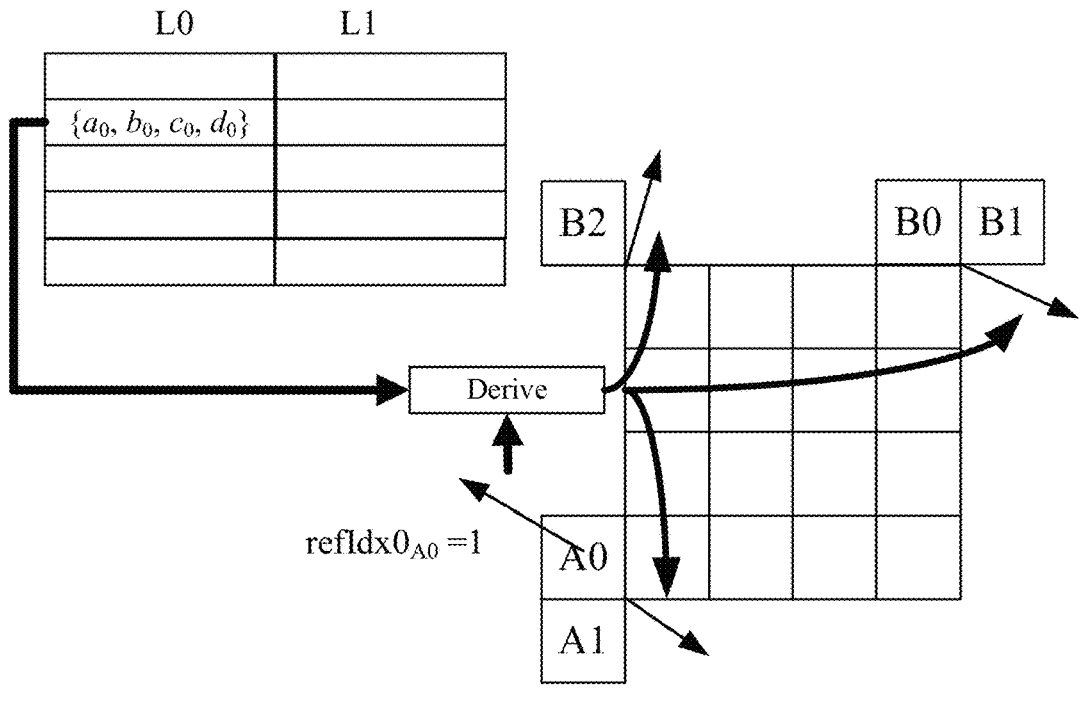
FIG. 25 illustrates an example of HPAC.

FIG. 25 shows an example of how to derive an HPAC from block A0. The affine parameters {a0, b0, c0, d0} are directly copied from one entry of category HPTIdx(RefListA0, refIdx0A0) in HPT. The affine parameters from HPT, with the center position of A0 as the base position, and the MV of block A0 as the base MV, are used together to derive MVs located at the center of the current block, as regular merge candidates.

As used herein, the terms "video unit" or "coding unit" or "block" used herein may refer to one or more of: a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block(PB), a transform block (TB), a block, a sub-block of a block, a sub-region within the block, or a region that comprises more than one sample or pixel.

In this present disclosure, regarding "a block coded with mode N", the term "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, MMVD, BCW, HMVP, SbTMVP, and etc.).

It is noted that the terminologies mentioned below are not limited to the specific ones defined in existing standards. Any variance of the coding tool is also applicable.

Figure 26:
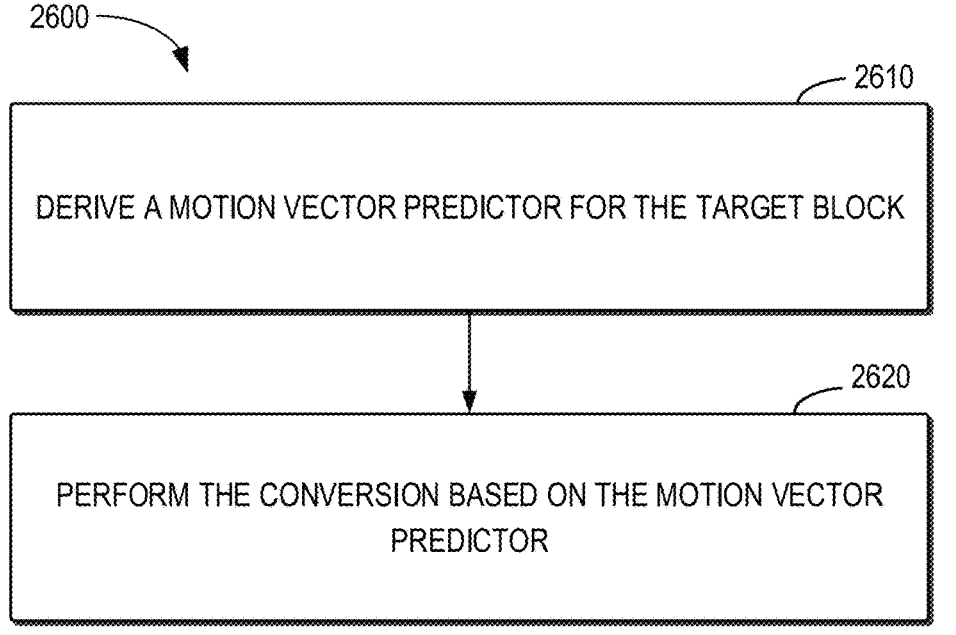
FIG. 26 illustrates a flow chart of a method according to example embodiments of the present disclosure.

FIG. 26 illustrates a flowchart of a method 2600 for video processing in accordance with some embodiments of the present disclosure. The method 2600 may be implemented during a conversion between a block and a bitstream of the block.

At block 2610, during a conversion between a target block of a video and a bitstream of the target block, a motion vector predictor for the target block from a parameter table that stores a set of affine parameters from at least one previously coded block is derived. The target block is a non-affine coded block. In some embodiments, the motion vector predictor may comprise one motion vector or two motion vectors for both inter-prediction directions. In some embodiments, the parameter table may comprise a history-based affine parameter table or a history-based affine parameter list. In some embodiments, the motion vector predictor may be a history-affine-derived (HAD) candidate. For example, in one example, a MV predictor (may include one MV or two MVs for both inter-prediction directions) can be derived for the current non-affine coded block from a history-based affine parameter table/list or other methods which store affine parameters from previously coded blocks. Such a MV predictor may be named as a history-affine-derived (HAD) candidate.

At block 2620, the conversion is performed based on the motion vector predictor. In some embodiments, the conversion may comprise ending the target block into the bitstream. Alternatively, the conversion may comprise decoding the target block from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, if the target block is coded with a translational inter-mode, the motion vector predictor may be used as a motion vector prediction (MVP) candidate in a MVP candidate list. In some embodiments, the motion vector predictor mat be applicable to a target inter mode. For example, the target inter mode may be without hypothesis prediction. In one example, the MV predictor may be also applicable to certain inter modes, but not for others, e.g., it could be applied to inter mode without hypothesis prediction. In some embodiments, the motion vector predictor may be used to derive an advanced motion vector prediction (AMVP) based additional hypothesis for a multiple hypothesis prediction mode.

In some embodiments, if the target block is coded with a merge mode, the motion vector predictor may be used as a merge candidate in a MVP candidate list. In some embodiments, the motion vector predictor may be applicable to a target merge mode. For example, the target merge mode may be a regular merge mode. In some embodiments, the target merge mode may not be a merge with motion vector difference (MMVD) mode or a combination of intra and inter predication (CIIP) mode. In one example, the MV predictor may be also applicable to certain merge modes, but not for others, e.g., it could be applied to regular merge mode, but not to MMVD/CIIP.

In some embodiments, a part of motion information of the motion vector predictor may be applicable to a target merge mode. In some embodiments, the target merge mode may comprise at least one of: a geometric partition mode (GPM) mode or a variance of the GPM mode. In one example, a piece of motion information of the MV predictor (such as L0-MV or L1-MV, but not both) may be applicable to a certain merge mode, e.g., it could be applied to GPM mode and its variance. In some embodiments, the motion vector predictor may be used to derive a merge based additional hypothesis for a multiple hypothesis prediction mode.

In some embodiments, the motion vector predictor may be derived based on an inter-coded neighboring block. For example, in some embodiments, a first coordinate of a first position of the inter-coded neighboring block may be represented as (x0, y0), a second coordinate of a second position of the target block may be represented as (x', y'), a third coordinate of an arbitrary point in the target block may be represents (x", y"), a width of the target block may be represented as M and a height of the target block may be represented as N.

In one example, the motion vector predictor may be calculated as ($\text{mv}^h$(x y), $\text{mv}^v$(x, y)) from $$\begin{cases} mv^h(x, y) = ax - by + e = \dfrac{(mv_1^h - mv_0^h)}{w}x - \dfrac{(mv_1^v - mv_0^v)}{w}y + mv_0^h \\[2ex] mv^v(x, y) = bx - ay + f = \dfrac{(mv_1^v - mv_0^v)}{w}x + \dfrac{(mv_1^h - mv_0^h)}{w}y + mv_0^v \end{cases}.$$

In this case, x may be equal to (x"−x0), y may be equal to (y"−y0) with a 4-parameter affine model retrieved from the parameter table.

In one example, the motion vector predictor may be calculated as ($\text{mv}^h$(x y), $\text{mv}^v$(x, y)) from $$\begin{cases} mv^h(x, y) = ax - cy + e = \dfrac{(mv_1^h - mv_0^h)}{w}x + \dfrac{(mv_2^h - mv_0^h)}{h}y + mv_0^h \\[2ex] mv^v(x, y) = bx - dy + f = \dfrac{(mv_1^v - mv_0^v)}{w}x + \dfrac{(mv_2^v - mv_0^v)}{h}y + mv_0^v \end{cases}.$$

In this case, x may be equal to (x″−x0), y may be equal to (y″−y0) with a 6-parameter affine model retrieved from the parameter table.

In some embodiments, the third coordinate may be based on at least one of: the second coordinate, the width or the height. For example, the third coordinate (x″, y″) may be one of: (x', y'), (x'+M/2, y'), (x'+M/2+1, y'), (x'+M−1, y'), (x'+M, y'), (x', y'+N/2), (x'+M/2, y'+N/2), (x'+M/2+1, y'+N/2), (x'+M−1, y'+N/2), (x'+M, y'+N/2), (x', y'+N/2+1), (x'+M/2, y'+N/2+1), (x'+M/2+1, y'+N/2+1), (x'+M−1, y'+N/2+1), (x'+M, y'+N/2+1), (x', y'+N−1), (x'+M/2, y'+N−1), (x'+M/2+1, y'+N−1), (x'+M−1, y'+N−1), (x'+M, y'+N−1), (x', y'+N), (x'+M/2, y'+N), (x'+M/2+1, y'+N), (x'+M−1, y'+N), or (x'+M, y'+N).

In some embodiments, whether to apply the motion vector predictor may be determined dynamically. In other words, whether to apply the MV predictor may be determined on-the-fly. Alternatively, whether to apply the motion vector predictor may be determined based on coding information of the target block. For example, the coding information may comprise one or more of: block dimension or coded methods.

In some embodiments, an indication of whether to and/or how to derive a motion vector predictor for the target block from the parameter table may be indicated at one of the followings: sequence level, group of pictures level, picture level, slice level, or tile group level.

In some embodiments, an indication of whether to and/or how to derive a motion vector predictor for the target block from the parameter table may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to derive a motion vector predictor for the target block from the parameter table may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to derive a motion vector predictor for the target block from the parameter table may be determined based on coded information of the target block. The coded information may include at least one of: a block size, a colour format, a single and/or dual tree partitioning, a colour component, a slice type, or a picture type.

In some embodiments, a motion vector predictor for the target block is derived from a parameter table that stores a set of affine parameters from at least one previously coded block. The target block is a non-affine coded block. A bitstream of the video unit is generated based on the motion vector predictor.

In some embodiments, a motion vector predictor for the target block is derived from a parameter table that stores a set of affine parameters from at least one previously coded block. The target block is a non-affine coded block. A bitstream of the video unit is generated based on the motion vector predictor. The bitstream is stored in a non-transitory computer-readable recording medium.

FIG. 27 illustrates a flowchart of a method 2700 for video processing in accordance with some embodiments of the present disclosure. The method 2700 may be implemented during a conversion between a block and a bitstream of the block.

As shown in FIG. 27, at block 2710, during a conversion between a target block of a video and a bitstream of the target block, at least one motion vector predictor derived with an affine model for the target block is determined. In some embodiments, the at least one motion vector predictor may be a history-affine-derived (HAD) merge candidate. Alternatively, the at least one motion vector predictor may be a neighbor-affine-derived (NAD) merge candidate. In some embodiments, the at least one motion vector predictor may be a HAD AMVP candidate. Alternatively, the at least one motion vector predictor may be a NAD AMVP candidate.

At block 2720, the motion vector predictor is inserted into a candidate list in at least one position. In some embodiments, the candidate list may comprise a merge candidate list. Alternatively, the candidate list may comprise an AMVP candidate list.

At block 2730, the conversion is performed based on the candidate list. In some embodiments, the conversion may comprise ending the target block into the bitstream. Alternatively, the conversion may comprise decoding the target block from the bitstream. Compared with the conventional solution, some embodiments of the present disclosure can advantageously improve improving the coding efficiency, coding performance, and flexibility.

Implementations of the present disclosure can be described in view of the following clauses, the features of which can be combined in any reasonable manner.

In some embodiments, as mentioned above, the candidate list may be a merge candidate list. In this case, the merge candidate list may be used for at least one of: a regular merge mode, or a variance of merge mode. For example, the variance of merge mode may comprise at least one of: a template matching (TM) mode, a CIIP mode, a geometric (GEO) mode, or a MMVD mode. In some embodiments, the merge candidate list may be a merge based additional hypothesis motion candidate list for multiple hypothesis prediction. In some embodiments, the merge candidate list may be a constructed/virtual candidate list which contains at least one merge candidate. For example, the constructed/virtual candidate list may be one or more of: AMVP-MERGE list or true bi-prediction merge list. In some embodiments, the at least one motion vector predictor may be in a pruning process with at least one other merge candidate.

In some embodiments, as mentioned above, the candidate list may comprise an AMVP candidate list. In some embodiments, the AMVP candidate list may be used for at least one of: a regular AMVP mode, or a variance of AMVP mode. In some embodiments, the AMVP candidate list may be an AMVP based additional hypothesis motion candidate list for multiple hypothesis prediction. In some embodiments, the AMVP candidate list may be a constructed/virtual candidate list which contains at least one AMVP candidate. For example, the constructed/virtual candidate list may comprise one or more of: AMVP-MERGE list or true bi-prediction AMVP list. In some embodiments, the at least one motion vector predictor may be in a pruning process with at least one other AMVP candidate.

In some embodiments, a total number of motion vector predictors may be no greater than a first threshold. The first threshold may be any proper integer. In some embodiments, if the first threshold is 0, the at least one motion vector predictor may not be used. In some embodiments, the first threshold may be indicated from an encoder side to a decoder side. Alternatively, the first threshold may be derived based on coding information of the target block. For example, the first threshold may be derived based on dimension information of the target block. In this case, in some embodiments, if a width of the target block is large than a first width or a height of the target block is larger than a first height, the first threshold may be 0. For example, the first width and the first height may be 16. In some other embodiments, if a width of the target block is large than a first width and a height of the target block is larger than a first height, the first threshold may be 0. For example, the first width and the first height may be 16.

In some embodiments, a first set of the at least one motion vector predictor may be put into the merge candidate list before a k-th spatial merge candidate. The k may be an integer, for example, 0, 1, 2, . . . , or corresponding to the last one.

In some embodiments, a second set of the at least one motion vector predictor may be put into the merge candidate list after a k-th spatial merge candidate in the candidate list. The k may be an integer, for example, 0, 1, 2, . . . , or corresponding to the last one.

In some embodiments, a third set of the at least one motion vector predictor may be put into the merge candidate list before a temporal motion vector prediction (TMVP) merge candidate. In some embodiments, a fourth set of the at least one motion vector predictor may be put into the merge candidate list after a TMVP merge candidate.

In some embodiments, a fifth set of the at least one motion vector predictor may be put into the merge candidate list before a k-th non-adjacent merge candidate. The k may be an integer, for example, 0, 1, 2, . . . , or corresponding to the last one.

In some embodiments, a sixth set of the at least one motion vector predictor may be put into the merge candidate list after a k-th non-adjacent merge candidate. The k may be an integer, for example, 0, 1, 2, . . . , or corresponding to the last one.

In some embodiments, a seventh set of the at least one motion vector predictor may be put into the merge candidate list before a k-th history-based-motion vector prediction (HMVP) merge candidate. The k may be an integer, for example, 0, 1, 2, . . . , or corresponding to the last one.

In some embodiments, an eighth set of the at least one motion vector predictor may be put into the merge candidate list after a k-th merge candidate. The k may be an integer, for example, 0, 1, 2, . . . , or corresponding to the last one.

In some embodiments, a ninth set of the at least one motion vector predictor may be put into the merge candidate list before a k-th zero merge candidate. The k may be an integer, for example, 0, 1, 2, . . . , or corresponding to the last one.

In some embodiments, a first set of the at least one motion vector predictor may be put into the AMVP candidate list before a k-th spatial AMVP candidate. The k may be an integer, for example, 0, 1, 2, . . . , or corresponding to the last one.

In some embodiments, a second set of the at least one motion vector predictor may be put into the AMVP candidate list after a k-th spatial AMVP candidate. The k may be an integer, for example, 0, 1, 2, . . . , or corresponding to the last one.

In some embodiments, a third set of the at least one motion vector predictor may be put into the AMVP candidate list before a temporal motion vector prediction (TMVP) AMVP candidate. In some embodiments, a fourth set of the at least one motion vector predictor may be put into the AMVP candidate list after a TMVP AMVP candidate.

In some embodiments, a fifth set of the at least one motion vector predictor may be put into the AMVP candidate list before a k-th non-adjacent AMVP candidate. The k may be an integer, for example, 0, 1, 2, . . . , or corresponding to the last one.

In some embodiments, a sixth set of the at least one motion vector predictor may be put into the AMVP candidate list after a k-th non-adjacent AMVP candidate. The k may be an integer, for example, 0, 1, 2, . . . , or corresponding to the last one.

In some embodiments, a seventh set of the at least one motion vector predictor may be put into the AMVP candidate list before a k-th history-based-motion vector prediction (HMVP) AMVP candidate. The k may be an integer, for example, 0, 1, 2, . . . , or corresponding to the last one.

In some embodiments, an eighth set of the at least one motion vector predictor may be put into the AMVP candidate list after a k-th AMVP candidate. The k may be an integer, for example, 0, 1, 2, . . . , or corresponding to the last one.

In some embodiments, a ninth set of the at least one motion vector predictor may be put into the AMVP candidate list before a k-th zero AMVP candidate. The k may be an integer, for example, 0, 1, 2, . . . , or corresponding to the last one.

In some embodiments, whether to and/or how to use the at least one motion vector predictor that is inserted into the candidate list depends on coding information of the target block. For example, the candidate list may comprise at least one of: a merge list, an AMVP list, a subblock-based merge list, or a regular merge list. In some embodiments, the coding information may indicate dimension information of the target block. For example, if a width of the target block is large than a first width or a height of the target block is larger than a first height, no motion vector predictor may be used. In some embodiments, the first width and the first height may be 16 or 8.

In some embodiments, if a width of the target block is large than a first width and a height of the target block is larger than a first height, no motion vector predictor may be used. For example, the first width and the first height may be 16 or 8.

In some embodiments, the coding information indicates temporal layer information of the target block. For example, if the number of temporal layers of the target block is higher than a second threshold, no motion vector predictor may be used. Alternatively, if the number of temporal layers of the target block is less than the second threshold, no motion vector predictor may be used. In some embodiments, the second threshold may be 2.

In some embodiments, the coding information may indicate whether all reference pictures are before a current picture associated with the target block in a displaying order. For example, if all the reference pictures are before the current picture in the displaying order, no motion vector predictor may be used. In some other embodiments, the coding information may indicate whether all reference pictures are after a current picture associated with the target block in a displaying order. In this case, in some embodiments, if all the reference pictures are after the current picture in the displaying order, no motion vector predictor may be used.

In some embodiments, the coding information may indicate a syntax element indicating whether MVD of reference list 1 is 0. For example, the syntax element may be ph_mvd_11_zero_flag. In some embodiments, if the syntax element is equal to a specific value, no motion vector predictor is used. In this case, for example, the specific value may be 1.

In some embodiments, the coding information may indicate the number of reference lists. In this case, in some embodiments, if the number of reference lists is equal to a specific value, no motion vector predictor may be used. For example, the specific value may be 1.

In some embodiments, the coding information may indicate a picture order count (POC) of at least one reference picture. In this case, in some embodiments, if the POC of reference picture 0 in reference list 0 is in a predetermine range, no motion vector predictor may be used. In some embodiments, the predetermined range may be [POCcur– k1, POCcur+k2]. In this case, POCcur may be a POC of a current picture associated with the target block. The k1 and k2 may be integers. For example, k1 and k2 may be equal to 1.

In some embodiments, an indication of whether to and/or how to insert the at least one motion vector predators into the candidate list in at least one position may be indicated at one of the followings: sequence level, group of pictures level, picture level, slice level, or tile group level.

In some embodiments, an indication of whether to and/or how to insert the at least one motion vector predators into the candidate list in at least one position may be indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to insert the at least one motion vector predators into the candidate list in at least one position may be included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to insert the at least one motion vector predators into the candidate list in at least one position may be determined based on coded information of the target block. The coded information may include at least one of: a block size, a colour format, a single and/or dual tree partitioning, a colour component, a slice type, or a picture type.

In some embodiments, at least one motion vector predictor derived with an affine model for a target block of the video is determined. The motion vector predictor is inserted into a candidate list in at least one position. A bitstream of the video unit is generated based on the candidate list.

In some embodiments, at least one motion vector predictor derived with an affine model for a target block of the video is determined. The motion vector predictor is inserted into a candidate list in at least one position. A bitstream of the video unit is generated based on the candidate list. The bitstream is stored in a non-transitory computer-readable recording medium.

Embodiments of the present disclosure can be implemented separately. Alternatively, embodiments of the present disclosure can be implemented in any proper combinations. Implementations of the present disclosure can be described in view of the following clauses, the features of which can be combined in any reasonable manner.

Clause 1. A method of video processing, comprising: deriving, during a conversion between a target block of a video and a bitstream of the target block, a motion vector predictor for the target block from a parameter table that stores a set of affine parameters from at least one previously coded block, the target block being a non-affine coded block; and performing the conversion based on the motion vector predictor.

Clause 2. The method of clause 1, wherein the motion vector predictor comprises one motion vector or two motion vectors for both inter-prediction directions.

Clause 3. The method of clause 1 or 2, wherein the parameter table comprises a history-based affine parameter table or a history-based affine parameter list.

Clause 4. The method of any of clauses 1-3, wherein the motion vector predictor is a history-affine-derived (HAD) candidate.

Clause 5. The method of any of clauses 1-4, wherein if the target block is coded with a translational inter-mode, the motion vector predictor is used as a motion vector prediction (MVP) candidate in a MVP candidate list.

Clause 6. The method of clause 5, wherein the motion vector predictor is applicable to a target inter mode.

Clause 7. The method of clause 6, wherein the target inter mode is without hypothesis prediction.

Clause 8. The method of clause 5, wherein the motion vector predictor is used to derive an advanced motion vector prediction (AMVP) based additional hypothesis for a multiple hypothesis prediction mode.

Clause 9. The method of any of clauses 1-4, wherein if the target block is coded with a merge mode, the motion vector predictor is used as a merge candidate in a MVP candidate list.

Clause 10. The method of clause 9, wherein the motion vector predictor is applicable to a target merge mode.

Clause 11. The method of clause 10, wherein the target merge mode is a regular merge mode, and wherein the target merge mode is not a merge with motion vector difference (MMVD) mode or a combination of intra and inter predication (CIIP) mode.

Clause 12. The method of clause 9, wherein a part of motion information of the motion vector predictor is applicable to a target merge mode.

Clause 13. The method of clause 12, wherein the target merge mode comprises at least one of: a geometric partition mode (GPM) mode or a variance of the GPM mode.

Clause 14. The method of clause 9, wherein the motion vector predictor is used to derive a merge based additional hypothesis for a multiple hypothesis prediction mode.

Clause 15. The method of any of clauses 1-4, wherein the motion vector predictor is derived based on an inter-coded neighboring block.

Clause 16. The method of clause 15, wherein a first coordinate of a first position of the inter-coded neighboring block is represented as (x0, y0), a second coordinate of a second position of the target block is represented as (x', y'), a third coordinate of an arbitrary point in the target block is represents (x", y"), a width of the target block is represented as M and a height of the target block is N.

Clause 17. The method of clause 16, wherein the motion vector predictor is calculated as $(mv^h(x,y), mv^v(x, y))$ from $$
\begin{cases}
mv^h(x,\,y)=ax-by+e=\dfrac{\left(mv_1^h-mv_0^h\right)}{w}x-\dfrac{(mv_1^v-mv_0^v)}{w}y+mv_0^h \\[4mm]
mv^v(x,\,y)=bx-ay+f=\dfrac{(mv_1^v-mv_0^v)}{w}x+\dfrac{\left(mv_1^h-mv_0^h\right)}{w}y+mv_0^v
\end{cases},
$$

wherein x is equal to (x"–x0), y is equal to (y"–y0) with a 4-parameter affine model retrieved from the parameter table.

Clause 18. The method of clause 16, wherein the motion vector predictor is calculated as (mv$^h$(x,y), mv$^v$(x,y)) from $$
\begin{cases}
mv^h(x,\,y)=ax-cy+e=\dfrac{\left(mv_1^h-mv_0^h\right)}{w}x+\dfrac{\left(mv_2^h-mv_0^h\right)}{h}y+mv_0^h \\[4mm]
mv^v(x,\,y)=bx-dy+f=\dfrac{(mv_1^v-mv_0^v)}{w}x+\dfrac{(mv_2^v-mv_0^v)}{h}y+mv_0^v
\end{cases},
$$

wherein x is equal to (x"–x0), y is equal to (y"–y0) with a 6-parameter affine model retrieved from the parameter table.

Clause 19. The method of clause 16, wherein the third coordinate is based on at least one of: the second coordinate, the width or the height.

Clause 20. The method of clause 19, wherein the third coordinate (x", y") is one of:

$$
(x',\,y'),\,(x'+M/2,\,y'),\,(x'+M/2+1,\,y'),\,(x'+M-1,\,y'),
$$
$$
(x'+M,\,y'),\,(x',\,y'+N/2),\,(x'+M/2,\,y'N/2),
$$
$$
(x'+M/2+1,\,y'+N/2),\,(x'+M-1,\,y'+N/2),
$$
$$
(x'+M,\,y'+N/2),\,(x',\,y'+N/2+1),\,(x'+M/2,\,y'+N/2+1),
$$
$$
(x'+M/2+1,\,y'+N/2+1),\,(x'+M-1,\,y'+N/2+1),
$$
$$
(x'+M,\,y'+N/2+1),\,(x',\,y'+N-1),\,(x'+M/2,\,y'+N-1),
$$
$$
(x'+M/2+1,\,y'+N-1),\,(x'+M-1,\,y'+N-1),
$$
$$
(x'+M,\,y'+N-1),\,(x',\,y'+N),\,(x'+M/2,\,y'+N),
$$
$$
(x'+M/2+1,\,y'+N),\,(x'+M-1,\,y'+N),\,\text{or }(x'+M,\,y'+N).
$$

Clause 21. The method of any of clauses 1-4, wherein whether to apply the motion vector predictor is determined dynamically, or wherein whether to apply the motion vector predictor is determined based on coding information of the target block.

Clause 22. A method of video processing, comprising: determining, during a conversion between a target block of a video and a bitstream of the target block, at least one motion vector predictor derived with an affine model for the target block; inserting the motion vector predictor into a candidate list in at least one position; and performing the conversion based on the candidate list.

Clause 23. The method of clause 22, wherein the at least one motion vector predictor is a history-affine-derived (HAD) merge candidate or a neighbor-affine-derived (NAD) merge candidate, or wherein the at least one motion vector predictor is a HAD AMVP candidate or a NAD AMVP candidate.

Clause 24. The method of clause 22 or 23, wherein the candidate list comprises a merge candidate list.

Clause 25. The method of clause 24, wherein the merge candidate list is used for at least one of: a regular merge mode, or a variance of merge mode.

Clause 26. The method of clause 25, wherein the variance of merge mode comprises at least one of: a template matching (TM) mode, a CIIP mode, a geometric (GEO) mode, or a MMVD mode.

Clause 27. The method of clause 24, wherein the merge candidate list is a merge based additional hypothesis motion candidate list for multiple hypothesis prediction.

Clause 28. The method of clause 24, wherein the merge candidate list is a constructed/virtual candidate list which contains at least one merge candidate.

Clause 29. The method of clause 24, wherein the at least one motion vector predictor is in a pruning process with at least one other merge candidate.

Clause 30. The method of clause 22 or 23, wherein the candidate list comprises an AMVP candidate list.

Clause 31. The method of clause 30, wherein the AMVP candidate list is used for at least one of: a regular AMVP mode, or a variance of AMVP mode.

Clause 32. The method of clause 30, wherein the AMVP candidate list is an AMVP based additional hypothesis motion candidate list for multiple hypothesis prediction.

Clause 33. The method of clause 30, wherein the AMVP candidate list is a constructed/virtual candidate list which contains at least one AMVP candidate.

Clause 34. The method of clause 30, wherein the at least one motion vector predictor is in a pruning process with at least one other AMVP candidate.

Clause 35. The method of any of clauses 22-34, wherein a total number of motion vector predictors is no greater than a first threshold.

Clause 36. The method of clause 35, wherein if the first threshold is 0, the at least one motion vector predictor is not used.

Clause 37. The method of clause 35, wherein the first threshold is indicated from an encoder side to a decoder side.

Clause 38. The method of clause 35, wherein the first threshold is derived based on coding information of the target block.

Clause 39. The method of clause 38, wherein the first threshold is derived based on dimension information of the target block.

Clause 40. The method of clause 39, wherein if a width of the target block is large than a first width or a height of the target block is larger than a first height, the first threshold is 0.

Clause 41. The method of clause 40, wherein the first width and the first height are 16.

Clause 42. The method of clause 39, wherein if a width of the target block is large than a first width and a height of the target block is larger than a first height, the first threshold is 0.

Clause 43. The method of clause 42, wherein the first width and the first height are 16.

Clause 44. The method of any of clauses 24-29, wherein a first set of the at least one motion vector predictor is put into the merge candidate list before a k-th spatial merge candidate, and wherein k is an integer.

Clause 45. The method of any of clauses 24-29, wherein a second set of the at least one motion vector predictor is put into the merge candidate list after a k-th spatial merge candidate in the candidate list, and wherein k is an integer.

Clause 46. The method of any of clauses 24-29, wherein a third set of the at least one motion vector predictor is put into the merge candidate list before a temporal motion vector prediction (TMVP) merge candidate.

Clause 47. The method of any of clauses 24-29, wherein a fourth set of the at least one motion vector predictor is put into the merge candidate list after a TMVP merge candidate.

Clause 48. The method of any of clauses 24-29, wherein a fifth set of the at least one motion vector predictor is put into the merge candidate list before a k-th non-adjacent merge candidate, and wherein k is an integer.

Clause 49. The method of any of clauses 24-29, wherein a sixth set of the at least one motion vector predictor is put into the merge candidate list after a k-th non-adjacent merge candidate, and wherein k is an integer.

Clause 50. The method of any of clauses 24-29, wherein a seventh set of the at least one motion vector predictor is put into the merge candidate list before a k-th history-based-motion vector prediction (HMVP) merge candidate, and wherein k is an integer.

Clause 51. The method of any of clauses 24-29, wherein an eighth set of the at least one motion vector predictor is put into the merge candidate list after a k-th merge candidate, and wherein k is an integer.

Clause 52. The method of any of clauses 24-29, wherein a ninth set of the at least one motion vector predictor is put into the merge candidate list before a k-th zero merge candidate, and wherein k is an integer.

Clause 53. The method of any of clauses 30-34, wherein a first set of the at least one motion vector predictor is put into the AMVP candidate list before a k-th spatial AMVP candidate, and wherein k is an integer.

Clause 54. The method of any of clauses 30-34, wherein a second set of the at least one motion vector predictor is put into the AMVP candidate list after a k-th spatial AMVP candidate, and wherein k is an integer.

Clause 55. The method of any of clauses 30-34, wherein a third set of the at least one motion vector predictor is put into the AMVP candidate list before a temporal motion vector prediction (TMVP) AMVP candidate.

Clause 56. The method of any of clauses 30-34, wherein a fourth set of the at least one motion vector predictor is put into the AMVP candidate list after a TMVP AMVP candidate.

Clause 57. The method of any of clauses 30-34, wherein a fifth set of the at least one motion vector predictor is put into the AMVP candidate list before a k-th non-adjacent AMVP candidate, and wherein k is an integer.

Clause 58. The method of any of clauses 30-34, wherein a sixth set of the at least one motion vector predictor is put into the AMVP candidate list after a k-th non-adjacent AMVP candidate, and wherein k is an integer.

Clause 59. The method of any of clauses 30-34, wherein a seventh set of the at least one motion vector predictor is put into the AMVP candidate list before a k-th history-based-motion vector prediction (HMVP) AMVP candidate, and wherein k is an integer.

Clause 60. The method of any of clauses 30-34, wherein an eighth set of the at least one motion vector predictor is put into the AMVP candidate list after a k-th AMVP candidate, and wherein k is an integer.

Clause 61. The method of any of clauses 30-34, wherein a ninth set of the at least one motion vector predictor is put into the AMVP candidate list before a k-th zero AMVP candidate, and wherein k is an integer.

Clause 62. The method of clause 22 or 23, wherein whether to and/or how to use the at least one motion vector predictor that is inserted into the candidate list depends on coding information of the target block.

Clause 63. The method of clause 62, wherein the candidate list comprises at least one of: a merge list, an AMVP list, a subblock-based merge list, or a regular merge list.

Clause 64. The method of clause 62, wherein the coding information indicates dimension information of the target block.

Clause 65. The method of clause 64, wherein if a width of the target block is large than a first width or a height of the target block is larger than a first height, no motion vector predictor is used.

Clause 66. The method of clause 62, wherein the first width and the first height are 16 or 8.

Clause 67. The method of clause 64, wherein if a width of the target block is large than a first width and a height of the target block is larger than a first height, no motion vector predictor is used.

Clause 68. The method of clause 67, wherein the first width and the first height are 16 or 8.

Clause 69. The method of clause 62, wherein the coding information indicates temporal layer information of the target block.

Clause 70. The method of clause 69, wherein if the number of temporal layers of the target block is higher than a second threshold, no motion vector predictor is used, or wherein if the number of temporal layers of the target block is less than the second threshold, no motion vector predictor is used.

Clause 71. The method of clause 70, wherein the second threshold is 2.

Clause 72. The method of clause 62, wherein the coding information indicates whether all reference pictures are before a current picture associated with the target block in a displaying order.

Clause 73. The method of clause 72, wherein if all the reference pictures are before the current picture in the displaying order, no motion vector predictor is used.

Clause 74. The method of clause 62, wherein the coding information indicates whether all reference pictures are after a current picture associated with the target block in a displaying order.

Clause 75. The method of clause 74, wherein if all the reference pictures are after the current picture in the displaying order, no motion vector predictor is used.

Clause 76. The method of clause 62, wherein the coding information indicates a syntax element indicating whether MVD of reference list 1 is 0.

Clause 77. The method of clause 76, wherein the syntax element is ph_mvd_11_zero_flag.

Clause 78. The method of clause 76, wherein if the syntax element is equal to a specific value, no motion vector predictor is used.

Clause 79. The method of clause 78, wherein the specific value is 1.

Clause 80. The method of clause 62, wherein the coding information indicates the number of reference lists.

Clause 81. The method of clause 80, wherein if the number of reference lists is equal to a specific value, no motion vector predictor is used.

Clause 82. The method of clause 81, wherein the specific value is 1.

Clause 83. The method of clause 62, wherein the coding information indicates a picture order count (POC) of at least one reference picture.

Clause 84. The method of clause 83, wherein if the POC of reference picture 0 in reference list 0 is in a predetermine range, no motion vector predictor is used.

Clause 85. The method of clause 84, wherein the predetermined range is [POCcur-k1, POCcur+k2], wherein POCcur is a POC of a current picture associated with the target block, and k1 and k2 are integers.

Clause 86. The method of clause 85, wherein k1 and k2 are equal to 1.

Clause 87. The method of any of clauses 1-86, wherein the conversion includes encoding the video unit into the bitstream.

Clause 88. The method of any of clauses 1-86, wherein the conversion includes decoding the video unit from the bitstream.

Clause 89. An apparatus for processing video data comprising a processor and a non-transitory memory with instructions thereon, wherein the instructions upon execution by the processor, cause the processor to perform a method in accordance with any of clauses 1-88.

Clause 90. A non-transitory computer-readable storage medium storing instructions that cause a processor to perform a method in accordance with any of clauses 1-88.

Clause 91. A non-transitory computer-readable recording medium storing a bitstream of a video which is generated by a method performed by a video processing apparatus, wherein the method comprises: deriving a motion vector predictor for a target block of the video from a parameter table that stores a set of affine parameters from at least one previously coded block, the target block being a non-affine coded block; and generating a bitstream of the target block based on the motion vector predictor.

Clause 92. A method for storing bitstream of a video, comprising: deriving a motion vector predictor for a target block of the video from a parameter table that stores a set of affine parameters from at least one previously coded block, the target block being a non-affine coded block; generating a bitstream of the target block based on the motion vector predictor; and storing the bitstream in a non-transitory computer-readable recording medium.

Clause 93. A non-transitory computer-readable recording medium storing a bitstream of a video which is generated by a method performed by a video processing apparatus, wherein the method comprises: determining at least one motion vector predictor derived with an affine model for a target block of the video; inserting the motion vector predictor into a candidate list in at least one position; and generating a bitstream of the target block based on the candidate list.

Clause 94. A method for storing bitstream of a video, comprising: determining at least one motion vector predictor derived with an affine model for a target block of the video; inserting the motion vector predictor into a candidate list in at least one position; generating a bitstream of the target block based on the candidate list; and storing the bitstream in a non-transitory computer-readable recording medium.

Example Device

Figure 28:
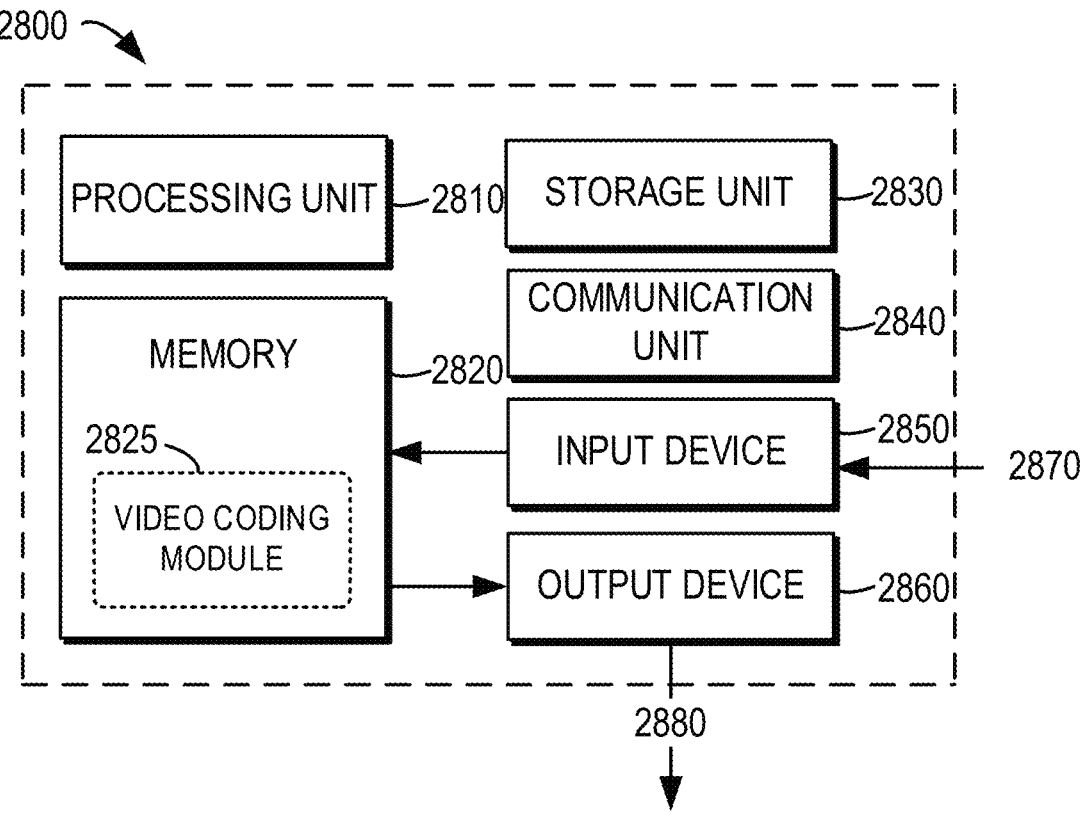
FIG. 28 illustrates a block diagram of a computing device in which various embodiments of the present disclosure can be implemented.

FIG. 28 illustrates a block diagram of a computing device 2800 in which various embodiments of the present disclosure can be implemented. The computing device 2800 may be implemented as or included in the source device 110 (or the video encoder 114 or 200) or the destination device 120 (or the video decoder 124 or 300).

It would be appreciated that the computing device 2800 shown in FIG. 28 is merely for purpose of illustration, without suggesting any limitation to the functions and scopes of the embodiments of the present disclosure in any manner.

As shown in FIG. 28, the computing device 2800 includes a general-purpose computing device 2800. The computing device 2800 may at least comprise one or more processors or processing units 2810, a memory 2820, a storage unit 2830, one or more communication units 2840, one or more input devices 2850, and one or more output devices 2860.

In some embodiments, the computing device 2800 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2800 can support any type of interface to a user (such as "wearable" circuitry and the like).

The processing unit 2810 may be a physical or virtual processor and can implement various processes based on programs stored in the memory 2820. In a multi-processor system, multiple processing units execute computer executable instructions in parallel so as to improve the parallel processing capability of the computing device 2800. The processing unit 2810 may also be referred to as a central processing unit (CPU), a microprocessor, a controller or a microcontroller.

The computing device 2800 typically includes various computer storage medium. Such medium can be any medium accessible by the computing device 2800, including, but not limited to, volatile and non-volatile medium, or detachable and non-detachable medium. The memory 2820 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2830 may be any detachable or non-detachable medium and may include a machine-readable medium such as a memory, flash memory drive, magnetic disk or another other media, which can be used for storing information and/or data and can be accessed in the computing device 2800.

The computing device 2800 may further include additional detachable/non-detachable, volatile/non-volatile memory medium. Although not shown in FIG. 28, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2840 communicates with a further computing device via the communication medium. In addition, the functions of the components in the computing device 2800 can be implemented by a single computing cluster or multiple computing machines that can communicate via communication connections. Therefore, the computing device 2800 can operate in a networked environment using a logical connection with one or more other servers, networked personal computers (PCs) or further general network nodes.

The input device 2850 may be one or more of a variety of input devices, such as a mouse, keyboard, tracking ball, voice-input device, and the like. The output device 2860 may be one or more of a variety of output devices, such as a display, loudspeaker, printer, and the like. By means of the communication unit 2840, the computing device 2800 can further communicate with one or more external devices (not shown) such as the storage devices and display device, with one or more devices enabling the user to interact with the computing device 2800, or any devices (such as a network card, a modem and the like) enabling the computing device 2800 to communicate with one or more other computing devices, if required. Such communication can be performed via input/output (I/O) interfaces (not shown).

In some embodiments, instead of being integrated in a single device, some or all components of the computing device 2800 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2800 may be used to implement video encoding/decoding in embodiments of the present disclosure. The memory 2820 may include one or more video coding modules 2825 having one or more program instructions. These modules are accessible and executable by the processing unit 2810 to perform the functionalities of the various embodiments described herein.

In the example embodiments of performing video encoding, the input device 2850 may receive video data as an input 2870 to be encoded. The video data may be processed, for example, by the video coding module 2825, to generate an encoded bitstream. The encoded bitstream may be provided via the output device 2860 as an output 2880.

In the example embodiments of performing video decoding, the input device 2850 may receive an encoded bitstream as the input 2870. The encoded bitstream may be processed, for example, by the video coding module 2825, to generate decoded video data. The decoded video data may be provided via the output device 2860 as the output 2880.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising:

determining, during a conversion between a target block of a video and a bitstream of the video unit target block, at least one motion vector predictor derived with an affine model for the target block;

inserting the motion vector predictor into a candidate list in at least one position, wherein a total number of motion vector predictors is no greater than a first threshold, if a width of the target block is larger than a first width or a height of the target block is larger than a first height, the first threshold is 0, or wherein if a width of the target block is larger than a first width and a height of the target block is larger than a first height, the first threshold is 0; and performing the conversion based on the candidate list.

2. The method of claim 1, wherein the at least one motion vector predictor is a history-affine-derived (HAD) merge candidate or a neighbor-affine-derived (NAD) merge candidate, or wherein the at least one motion vector predictor is a HAD AMVP candidate or a NAD AMVP candidate.

3. The method of claim 1, wherein the candidate list comprises a merge candidate list.

4. The method of claim 3, wherein the merge candidate list is used for at least one of:

a regular merge mode, or a variance of merge mode, or wherein the merge candidate list is a merge based additional hypothesis motion candidate list for multiple hypothesis prediction, or wherein the merge candidate list is a constructed/virtual candidate list which contains at least one merge candidate, or wherein the at least one motion vector predictor is in a pruning process with at least one other merge candidate.

5. The method of claim 1, wherein the candidate list comprises an AMVP candidate list.

6. The method of claim 5, wherein the AMVP candidate list is used for at least one of:

a regular AMVP mode, or a variance of AMVP mode, or wherein the AMVP candidate list is an AMVP based additional hypothesis motion candidate list for multiple hypothesis prediction, or wherein the AMVP candidate list is a constructed/virtual candidate list which contains at least one AMVP candidate, or wherein the at least one motion vector predictor is in a pruning process with at least one other AMVP candidate.

7. The method of claim 1, wherein a total number of motion vector predictors is no greater than a first threshold.

8. The method of claim 7, wherein if the first threshold is 0, the at least one motion vector predictor is not used, or wherein the first threshold is indicated from an encoder side to a decoder side.

9. The method of claim 7, wherein the first threshold is derived based on coding information of the target block.

10. The method of claim 9, wherein the first threshold is derived based on dimension information of the target block.

11. The method of claim 3, wherein a first set of the at least one motion vector predictor is put into the merge candidate list before a k-th spatial merge candidate, and wherein k is an integer, or wherein a second set of the at least one motion vector predictor is put into the merge candidate list after a k-th spatial merge candidate in the candidate list, and wherein k is an integer, or wherein a third set of the at least one motion vector predictor is put into the merge candidate list before a temporal motion vector prediction (TMVP) merge candidate, or wherein a fourth set of the at least one motion vector predictor is put into the merge candidate list after a TMVP merge candidate, or wherein a fifth set of the at least one motion vector predictor is put into the merge candidate list before a k-th non-adjacent merge candidate, and wherein k is an integer, or wherein a sixth set of the at least one motion vector predictor is put into the merge candidate list after a k-th non-adjacent merge candidate, and wherein k is an integer, or wherein a seventh set of the at least one motion vector predictor is put into the merge candidate list before a k-th history-based-motion vector prediction (HMVP) merge candidate, and wherein k is an integer, or wherein an eighth set of the at least one motion vector predictor is put into the merge candidate list after a k-th merge candidate, and wherein k is an integer, or wherein a ninth set of the at least one motion vector predictor is put into the merge candidate list before a k-th zero merge candidate, and wherein k is an integer.

12. The method of claim 5, wherein a first set of the at least one motion vector predictor is put into the AMVP candidate list before a k-th spatial AMVP candidate, and wherein k is an integer, or wherein a second set of the at least one motion vector predictor is put into the AMVP candidate list after a k-th spatial AMVP candidate, and wherein k is an integer, or wherein a third set of the at least one motion vector predictor is put into the AMVP candidate list before a temporal motion vector prediction (TMVP) AMVP candidate, or wherein a fourth set of the at least one motion vector predictor is put into the AMVP candidate list after a TMVP AMVP candidate, or wherein a fifth set of the at least one motion vector predictor is put into the AMVP candidate list before a k-th non-adjacent AMVP candidate, and wherein k is an integer, or wherein a sixth set of the at least one motion vector predictor is put into the AMVP candidate list after a k-th non-adjacent AMVP candidate, and wherein k is an integer, or wherein a seventh set of the at least one motion vector predictor is put into the AMVP candidate list before a k-th history-based-motion vector prediction (HMVP) AMVP candidate, and wherein k is an integer, or wherein an eighth set of the at least one motion vector predictor is put into the AMVP candidate list after a k-th AMVP candidate, and wherein k 1s an integer, or wherein a ninth set of the at least one motion vector predictor is put into the AMVP candidate list before a k-th zero AMVP candidate, and wherein k is an integer.

13. The method of claim 1, wherein whether to and/or how to use the at least one motion vector predictor that is inserted into the candidate list depends on coding information of the target block.

14. The method of claim 13, wherein the candidate list comprises at least one of:

a merge list, an AMVP list, a subblock-based merge list, or a regular merge list, or wherein the coding information indicates dimension information of the target block, or wherein the first width and the first height are 16 or 8, or wherein the coding information indicates temporal layer information of the target block, or wherein the coding information indicates whether all reference pictures are before a current picture associated with the target block in a displaying order, or wherein the coding information indicates whether all reference pictures are after a current picture associated with the target block in a displaying order, or wherein the coding information indicates a syntax element indicating whether MVD of reference list 1 is 0, or wherein the coding information indicates the number of reference lists, or wherein the coding information indicates a picture order count (POC) of at least one reference picture.

15. The method of claim 1, wherein the conversion includes encoding the target block into the bitstream, or wherein the conversion includes decoding the target block from the bitstream.

16. An apparatus for processing video data comprising a processor and a non-transitory memory with instructions thereon, wherein the instructions upon execution by the processor, cause the processor to perform acts comprising:

determining, during a conversion between a target block of a video and a bitstream of the video unit target block, at least one motion vector predictor derived with an affine model for the target block, wherein a total number of motion vector predictors is no greater than a first threshold, if a width of the target block is larger than a first width or a height of the target block is larger than a first height, the first threshold is 0, or wherein if a width of the target block is larger than a first width and a height of the target block is larger than a first height, the first threshold is 0;

inserting the motion vector predictor into a candidate list in at least one position; and performing the conversion based on the candidate list.

17. The apparatus of claim 16, wherein the at least one motion vector predictor is a history-affine-derived (HAD) merge candidate or a neighbor-affine-derived (NAD) merge candidate, or wherein the at least one motion vector predictor is a HAD AMVP candidate or a NAD AMVP candidate, or wherein the candidate list comprises a merge candidate list, or wherein the candidate list comprises an AMVP candidate list, or wherein a total number of motion vector predictors is no greater than a first threshold, or wherein whether to and/or how to use the at least one motion vector predictor that is inserted into the candidate list depends on coding information of the target block.

18. A non-transitory computer-readable storage medium storing instructions that cause a processor to perform acts comprising:

determining, during a conversion between a target block of a video and a bitstream of the video unit target block, at least one motion vector predictor derived with an affine model for the target block, wherein a total number of motion vector predictors is no greater than a first threshold, if a width of the target block is larger than a first width or a height of the target block is larger than a first height, the first threshold is 0, or wherein if a width of the target block is larger than a first width and a height of the target block is larger than a first height, the first threshold is 0;

inserting the motion vector predictor into a candidate list in at least one position; and performing the conversion based on the candidate list.

19. A method for storing bitstream of a video comprising:

determining at least one motion vector predictor derived with an affine model for the target block, wherein a total number of motion vector predictors is no greater than a first threshold, if a width of the target block is larger than a first width or a height of the target block is larger than a first height, the first threshold is 0, or wherein if a width of the target block is larger than a first width and a height of the target block is larger than a first height, the first threshold is 0;

inserting the motion vector predictor into a candidate list in at least one position;

generating a bitstream of the video based on the candidate list; and storing the bitstream in a non-transitory computer-readable recording medium.

\* \* \* \* \*